(12) United States Patent
Iannacci

(10) Patent No.: US 7,318,049 B2
(45) Date of Patent: Jan. 8, 2008

(54) SYSTEM AND METHOD FOR AN AUTOMATED BENEFIT RECOGNITION, ACQUISITION, VALUE EXCHANGE, AND TRANSACTION SETTLEMENT SYSTEM USING MULTIVARIABLE LINEAR AND NONLINEAR MODELING

(76) Inventor: Gregory Fx Iannacci, 30 Keene St., Stoneham, MA (US) 02180

( * ) Notice: Subject to any disclaimer, the term of this patent is extended or adjusted under 35 U.S.C. 154(b) by 1340 days.

(21) Appl. No.: 09/932,808

(22) Filed: Aug. 17, 2001

(65) Prior Publication Data

US 2002/0062249 A1 May 23, 2002

Related U.S. Application Data

(60) Provisional application No. 60/263,251, filed on Jan. 22, 2001, provisional application No. 60/249,746, filed on Nov. 17, 2000.

(51) Int. Cl.
*G06Q 40/00* (2006.01)
(52) U.S. Cl. .......................................... 705/39; 705/41
(58) Field of Classification Search .................. 705/37, 705/39, 41
See application file for complete search history.

(56) References Cited

U.S. PATENT DOCUMENTS

| | | | |
|---|---|---|---|
| 5,383,113 A | 1/1995 | Kight et al. | |
| 5,440,634 A | 8/1995 | Jones et al. | |
| 5,477,040 A * | 12/1995 | Lalonde | 235/380 |
| 5,530,438 A | 6/1996 | Bickham et al. | |
| 5,649,118 A | 7/1997 | Carlisle et al. | |
| 5,915,244 A | 6/1999 | Jack et al. | |
| 5,945,653 A | 8/1999 | Walker et al. | |
| 5,963,924 A | 10/1999 | Williams et al. | |
| 5,999,596 A | 12/1999 | Walker et al. | |
| 6,009,412 A | 12/1999 | Storey | |
| 6,014,634 A | 1/2000 | Scroggie et al. | |
| 6,061,660 A | 5/2000 | Eggleston et al. | |
| 6,129,274 A | 10/2000 | Suzuki | |
| 2002/0069122 A1 * | 6/2002 | Yun et al. | 705/26 |

OTHER PUBLICATIONS

Turner, Wayne C.; Mize, Joe H.; Case, Kenneth E.; Nazemetz, John W. Introduction to Industrial and Systems Engineering, 3rd editon. 1993. Prentice-Hall, Inc. p. 228.*
Business Wire. "Biztravel.com: Biztravel .com delivers hot travel news direct to desktop; free service gives road warriors fast, personalized access to key industry data." Aug. 19, 1997.*
Bloom, Jennifer Kingson. Financial product menu service being expanded. American Banker. New York, N.Y.: Oct. 14, 1997. vol. 162, Iss. 198. (4 pages).*

* cited by examiner

*Primary Examiner*—Kambiz Abdi
*Assistant Examiner*—Jennifer Liversedge

(57) ABSTRACT

A system and process that provides an on-line, interactive, and fully integrated benefit-driven value exchange and settlement program that monitors, evaluates, and manages economic and personal benefits and executes functions to produce and acquire the maximum or preferred benefit items for users by guiding and automating appropriate payment and settlement actions. The present invention finds useful patterns in data; produces conclusions based on rules and experience; responds to environmental changes with or without human intervention; and, may evolve through selecting the best results from random mutations all of which are intended to maximise user value.

27 Claims, 23 Drawing Sheets

| UNIVERSAL ACCOUNT NUMBER | OWNER NAME | OWNER ADDRESS | OWNER TELEPHONE | DEVICE ACCESS | PREFERENCES |
|---|---|---|---|---|---|
| 1313-3333-4444-5555 | GREGORY FXI | 3 LAKEVIEW AVENUE CONCORD, MA 01771 | 781-555-3456 | 781-555-2233 | LOWEST RATE |
| 1313-4444-5555-6666 | LINDA JEAN | 5 OCEAN DRIVE STOW, MA 01775 | 978-555-5678 | 617-555-4578#9804 | CASH BACK |
| 1313-5555-6666-7777 | PAUL JAMES | 7 TELECOM WAY GROTON, MA 01650 | 978-555-7890 | 010.136.067.256 | SYSTEM DEFAULTS |

FIG. 3

| | MERCHANT ACCOUNT NUMBER | MERCHANT NAME | MERCHANT ADDRESS | MERCHANT TELEPHONE | DEVICE ACCESS | ACCEPTED PAYMENTS |
|---|---|---|---|---|---|---|
| RM1 → | 4444-5555 | TOP SOFTWARE | 101 MAIN STREET CONCORD, MA 01776 | 781-555-9876 | 781-555-9998 | MC, VISA, DISCOVER |
| RM2 → | 8888-9999 | LINENS ETC. | 202 COMMERCE WAY ACTON, MA 01818 | 617-555-3334 | 617-555-1324#9954 | AMEX, MC, MYPOINTS |
| RM3 → | 5555-7777 | PHONES PLUS | 303 STORE LANE BOSTON, MA 03838 | 617-555-7713 | 010.186.066.256 | ALL EXCEPT DINERS |
| | | | | | | |

| 610 | | | 630 | 625 | 600 |
|---|---|---|---|---|---|

PDI PLANET - MERCHANT DISPLAY      ? _ ▢ X

615

620 ACCOUNT NUMBER: 4444-5555     PREFERENCES: SORTED BY RANK:

| NAME: | TOP SOFTWARE | ☒ VISA | 1 |
|---|---|---|---|
| ADDRESS: | 101 MAIN STREET CONCORD, MA 01776 | ☒ MASTERCARD | 2 |
| | | ☒ AMERICAN EXPRESS | 3 |
| TELEPHONE NO.: | 781-555-9876 | ☒ DISCOVER | 4 |
| DEVICE ACCESS: | 781-555-9998 | ☒ MYPOINTS REWARDS | 5 |
| | | ☐ DINERS CLUB | |
| ☒ AUTO-ENROLLMENT FOR OPT-IN | | ☐ LOWEST PROCESSING FEES | |

635

MERCHANT PROCESSING ACCOUNTS:

640

| ISSUER NAME: | TYPE: | ACCOUNT NUMBER: | STATUS: |
|---|---|---|---|
| AMERICAN EXPRESS | MERCHANT 2.5% | 2222-3333-444 | ACTIVE |
| DISCOVER FIN'L SRVC | MERCHANT 2.4% | PROVISIONAL | PRE-APPVD |
| MASTERCARD | MERCHANT 2.0% | 3333-6666-7777 | ACTIVE |
| MERRILL LYNCH | MERCHANT | PROVISIONAL | PRE-APPVD |
| MYPOINTS REWARDS | MERCHANT | PROVISIONAL | PRE-APPVD |
| VISA | MERCHANT 1.5% | 445445-44 | ACTIVE |

645

RULES AND CONDITIONS:

650 OFFER NO MORE THAN 2.5 DELTA AIRLINE MILES FOR PURCHASE AMOUNTS UNDER $5,000.00 THRU 31 DECEMBER 2001 PAID WITH A VISA ACCOUNT.

655

ACTIVE AND AVAILABLE OPTION OFFERS:

660 1 ADMISSION PASS TO HOYT'S MOVIE THEATERS PER PURCHASE ON 14 FEB 2001

20% DISCOUNT ON ALL PURCHASES VALID ONLY ON THE DAY OF 21 JUNE 2001

665 FREE SHIPPING ON ALL INTERNET ORDERS, EXPIRATION 30 JUNE 2001

$10.00 UNIVERSAL GIFT ALLOWANCE ON PURCHASES OVER $100.00 WHEN PAID BY VISA, EXPIRATION 15 APRIL 2001

FIG. 6

| OPTION SUPPLIER ACCOUNT NUMBER | SUPPLIER NAME | SUPPLIER ADDRESS | SUPPLIER TELEPHONE | DEVICE ACCESS | OPTION STRUCTURES |
|---|---|---|---|---|---|
| 987654 | VISA | 777 PLAZA AVENUE NEW YORK, NY 10010 | 203-555-7373 | 203-555-7327 | AIRLINE MILES |
| 876543 | MASTERCARD | 555 CREDIT LANE NEW YORK, NY 10015 | 203-555-5723 | 203-555-4231#5363 | MYPOINTS, CASHBACK |
| 765432 | SHAW'S MARKET | 444 SUPER WAY HARTFORD, CT 10191 | 605-555-8384 | 010.036.067.256 | 10% DISCOUNT |

FIG. 7

| | 800 |
|---|---|

810 — PDI PLANET - OPTION SUPPLIER DISPLAY  [?][_][□][X]

815

820 ACCOUNT NUMBER: 987654

NAME: VISA

ADDRESS: 777 PLAZA AVENUE
NEW YORK, NY 10010

TELEPHONE NO.: 203-555-7373

DEVICE ACCESS: 203-555-7327

830 / 825

OPTION STRUCTURES: / SORTED BY RANK:

- [X] AIRLINE MILES — [1]
- [X] 0% INTRO INTEREST RATE — [2]
- [X] DELAYED INTEREST RATE — [3]
- [X] CASH BACK — [4]
- [X] MYPOINTS REWARDS — [5]
- [ ] DOLLAR OFF DISCOUNT
- [ ] PERCENTAGE OFF DISCOUNT

[X] AUTO-ENROLLMENT FOR OPT-IN

835 — OPTION SUPPLIER ASSOCIATE ACCOUNTS:

840

| ASSOCIATE NAME: | OPTION TYPE: |
|---|---|
| AMES DEPT STORE | MYPOINTS |
| BARNES AND NOBLE | MYPOINTS |
| DELTA AIRLINES | AIRLINE MILES |
| NFL.COM | AIRLINE MILES |
| SPRINT PCS | AIRTIME MINUTES |
| TICKETMASTER | CASH DISCOUNT |

845 — RULES AND CONDITIONS:

850 — OFFER NO MORE THAN 3.0 DELTA AIRLINE MILES FOR INDIVIDUAL PURCHASE AMOUNTS GREATER THAN $5,000.00 AND LESS THAN $1,000,000.00

OFFER NO MORE THAN 4.0 DELTA AIRLINE MILES FOR AGGREGATE PURCHASE AMOUNTS OVER $5,000,000.00 - OFFER EXPIRATION 31 DECEMBER 2001

855 — ACTIVE AND AVAILABLE OPTION STRUCTURES:

860 — 20% DISCOUNT ON ALL PURCHASES VALID ONLY ON THE DAY OF 21 JUNE 2001

865 — FREE SHIPPING ON ALL INTERNET ORDERS, EXPIRATION 30 JUNE 2001

FIG. 8

| OPTION IDENTIFIER | AWARD NAME | AWARD TYPE | AWARD MINIMUM | AWARD MAXIMUM | AWARD START DATE | AWARD END DATE | SUPPLY FUNCTION OPERATION |
|---|---|---|---|---|---|---|---|
| AIRMILES-DELTA1 | DELTA AIRLINE MILES 2.5 | DELTA AIRLINE MILES | 1.0 | 2.5 | 1 JUNE 2000 | 30 JUNE 2000 | IF TRANSAMT <= 500000 ... |
| AIRMILES-DELTA2 | DELTA AIRLINE MILES 3.75 | DELTA AIRLINE MILES | 1.0 | 3.75 | 1 JAN 2001 | 30 JUNE 2001 | IF TRANSAMT > 1000000 ... |
| CASHBACK-1 | CASH BACK AWARD 12 | CASH BACK | 1.0% | 2.0% | 1 DEC 2000 | 31 DEC 2000 | TRANSAMT * .01 ... |

RA1 → (row 1)
RA2 → (row 2)
RA3 → (row 3)

| TRANSACTION IDENTIFIER | TRANSACTION TYPE | DATE | TIME | AMOUNT $ | AWARD TYPE | CURRENT AWARD | CURRENT OPTION SUPPLIER | OPTION IDENTIFIER |
|---|---|---|---|---|---|---|---|---|
| 122900-0020222 | CONSUMER | 29 DEC 2000 | 11:23 AM | 829.00 | CASH BACK | 1.25% | VISA | CASHBACK-1 |
| 122900-0020223 | CONSUMER | 29 DEC 2000 | 11:24 AM | 299.74 | AIR MILES | 2.25 MILES FOR EACH $ | AMEX | FFAM732-2 |
| 122900-0020224 | UNIVERSAL | 29 DEC 2000 | 11:25 AM | 98274.65 | 0% APR | 0% FOR 3 MONTHS | DISCOVER | APR726H1 |

1610
PDI PLANET
UNIVERSAL SERVER

ACCOUNT: 1313-3333-4444-5555
DATE: 14 FEBRUARY 2000
TIME: 7:52 A.M. EST

1615
QUERY: BEST BENEFITS FOR MEN'S DRESS SHIRTS
LOCATION: ZIP CODE 01890 = WINCHESTER, MA

PROFILE IN USE:
☐ BUSINESS 1
☒ PERSONAL 1 — 1630
☐ PERSONAL 2

1620
FIRST PREFERENCE: AIRLINE MILES
   MACY'S - BURLINGTON    2.00 PER $ PLUS 1.50 EXTRA USING MASTERCARD
1625   FILENE'S - CHERRY HILL   1.75 PER $ PLUS 1.25 EXTRA USING VISA
SECOND PREFERENCE: GREATEST DISCOUNT
   FILENE'S - CHERRY HILL   15% STOREWIDE PLUS EXTRA 10% MEN'S DEPT
1635   MEN'S WEARHOUSE - BOS   10% STOREWIDE
REDEEMABLE OPTION ITEMS:
   1 - FILENE'S GIFT CERT / FROM PAUL   $50.00 NO EXPIRATION
   2 - MASTERCARD FIRST USE BONUS   $15.00 UNRESTRICTED - EXPIRES 12/31/01
   3 - MYPOINTS REWARDS   ACCEPTED AT ALL DISPLAYED STORES

PLEASE PRESS THE "CONTACT" BUTTON IF YOU REQUIRE ADDITIONAL ASSISTANCE.

CONTACT

1810 — PDI PLANET UNIVERSAL SERVER

ACCOUNT: 1313-3333-4444-5555
DATE: 29 NOVEMBER 1999
TIME: 12:02 P.M. EST

1815 — EXCHANGE: 5,000 AMERICAN AIR MILES FOR DELTA MILES
CONDITIONS: ACCEPT NOT LESS THAN 1-FOR-1

1820 — ALTERNATE: MYPOINT REWARD POINTS
CONDITIONS: ALL OR NONE EXCHANGE

1830 — STD. VAL OR RANK

1825 — FIRST EXCHANGE PREFERENCE: AIRLINE MILES
   (1) ANONYMOUS - FL   1.2 DELTA MILE FOR EACH 1.0 AMERICAN MILE   28.95
1835 — (2) PAUL JAMES - MA   1.0 DELTA MILE FOR EACH 1.0 AMERICAN MILE   24.49

SECOND - ALTERNATE: MYPOINT REWARDS
   (1) LINDA JEAN - MA   275 MYPOINTS FOR 5,000 AMERICAN MILES   26.13
   (2) KATHYB - MA   210 MYPOINTS FOR 5,000 AMERICAN MILES   19.74

PLEASE SELECT OPTIONS FOR FURTHER DETAILS
OR
PRESS THE "PROCESS" BUTTON TO COMPLETE THE TRANSACTION WHICH WILL SETTLE THE EXCHANGE WITH THE FIRST LISTING IN YOUR FIRST PREFERENCE.

[ PROCESS ] — 1840

SYSTEM AND METHOD FOR AN AUTOMATED BENEFIT RECOGNITION, ACQUISITION, VALUE EXCHANGE, AND TRANSACTION SETTLEMENT SYSTEM USING MULTIVARIABLE LINEAR AND NONLINEAR MODELING

CROSS REFERENCE TO RELATED APPLICATIONS

This application is based upon U.S. Provisional Patent Application No. 60/249,746, entitled System and Method for Establishing and Executing a Payment, Discount, and Incentive Transaction System, filed 17 Nov. 2000, naming Gregory Fx Iannacci as inventor, and U.S. Provisional Patent Application No. 60/263,251, entitled System and Method for a Universal Incentive and Award Acquisition, Value Exchange, and Payment System, filed 22 Jan. 2001, naming Gregory Fx Iannacci as inventor. The entirety of both such provisional patent applications is incorporated by reference herein.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to an on-line, interactive, and fully integrated benefit-driven value exchange and settlement program that monitors, evaluates, and manages economic and personal benefits and executes functions to produce and acquire the maximum or preferred benefit items for users by guiding and automating appropriate payment and settlement actions.

More particularly, the present invention relates to the fields of payment and settlement processing systems and incentive award processing systems and, more exactly, to payment, discount, and incentive supply and acquisition functions that may be established and executed to produce, identify, compare, determine, select, acquire, and utilise available and preferred incentives and awards and, consequently, produce related payment or redemption instructions, options, or accounts, and such other relevant account items, for delivery to related parties to affect actions, transactions, and also user, consumer, merchant, award supplier, and payment and award issuer accounts.

2. Description of the Prior Art

Payment and settlement processing systems and incentive award processing systems are well known. For example, the conventional credit card transaction systems and incentive award processing systems involve a cardholder, a merchant, a credit card processor, a credit card issuer, and an incentive or benefit award provided by a payment, discount, or incentive award supplier. Generally, the cardholder presents goods or services to a merchant at a point-of-sale workstation where the merchant determines a purchase price and requests payment or settlement from the cardholder. The cardholder then selects one of the credit cards in their possession that will earn an incentive award, such as frequent flier airline miles. The cardholder then delivers the credit card to the merchant in order to make a payment for the products and receive the airline miles.

The merchant then processes the cardholder's credit card through a point-of-sale workstation which is configured to transmit transaction information such as the amount of the transaction, the credit card number, etc., to the credit card issuer either directly through a network connection or indirectly through a credit card processing service. If the cardholder's account is in a state that is sufficient to accept charges contemplated by the transaction, the credit card issuer will authorise the transaction by generating and transmitting an authorisation code to the merchant.

After receipt of the authorisation code, the point-of-sale workstation often prints a sales draft or receipt. Thereafter, the cardholder signs the draft acknowledging their obligation to reimburse the credit card issuer for the amount of the transaction. At this point, the merchant, through their acquiring financial institution, can collect payment for goods or services from the credit card issuer and the cardholder will receive their purchased items as well as being issued the frequent flier airline miles according to the "then" prevailing incentive award terms and conditions. An example of such an incentive processing program is disclosed in U.S. Pat. No. 6,009,412.

The aforementioned payment and settlement processing system and incentive award processing system approach is functionally limited in that: (a) making a payment is the primary goal while maximising the incentive benefits acquired or utilised is a secondary or ignored undertaking, (b) the selection of incentives and awards is generally based on a static "best award recalled" by the consumer instead of reference to a dynamic and extensive "best awards available" catalog of benefits with meaningful valuations and rankings, (c) only "in-possession" payment or settlement mechanisms may be used at the time of a transaction (e.g., the need for pre-established and signed credit cards, paper-based discount coupons, downloaded electronic mail messages with digital-based coupon codes in the consumer's physical possession), and (d) there is an absence of customised, standardised, and competitive benefit information based on consumer preferences, equivalent valuations, and the most current overall terms and conditions available from various and multiple incentive and award suppliers aggregated at the time of an action or transaction.

Accordingly, consumers seldom, if ever, receive the maximum or best incentives and awards available when using the prior art due to such reasons as a lack of consumer interest in managing incentives, a lack of easy and effective benefit rankings, and the consequences of a forgetful memory.

As such, the prior art has the disadvantage that the selection and use of benefits is limited by the amount of time and effort a consumer wants to invest in managing their incentive and award undertakings. An additional disadvantage is that consumers have no way of comparing and determining the best benefits when different awards are available. For example, a consumer may be presented with obtaining either 750 frequent flier airline miles or 425 bonus points and not be able to readily compare the values of such different awards.

Consumers face a growing assortment of incentives, rewards, coupons, and marketing promotions. In general, consumers are unable or unwilling to review the range of benefits, identify which ones apply to them, and then determine and remember how to pay to get the best values. People prefer to save money and would consider using incentives to do so, but a comprehensive and convenient method does not exist. Shoppers demonstrate their coupon-clipping avoidance behaviour by redeeming only 2% of available coupons. This "benefit bypass" causes the consumer to pay more and get less.

Another disadvantage is that benefit acquisition and utilisation is dependent on the consumer knowing about benefit opportunities and then remembering to use a particular credit card or to prepare earned awards, such as converting points into certificates, for benefit redemption in order to receive any utility value. For example, if a consumer knows about and remembers to use their American Express credit card account, assuming they have one, to pay for a rental car then the consumer can decline the additional collision insurance coverage since it is a benefit provided by American Express.

The consumer is further limited in that they can only make use of conventional incentive award search and discovery methods (e.g., reviewing bulk mail ads, television, print media, Internet ads, Internet incentive sites such as DealTime and ValPak.com, reading verbose "fine-print" account contracts that explain benefits, word-of-mouth) to piece together a juxtaposition of bewildering information. After such discovery, the consumer must then employ undependable reminders (e.g., sticky notes) to use the appropriate payment card or discount coupon for a particular transaction and then according to an incentive award's specific terms and conditions. A representative sample of Internet incentive and coupon search sites include: DealTime Incorporated available at http://www.dealtime.com; uBid Incorporated available at http://www.ubid.com; SalesHound.com Incorporated available at http://www.saleshound.com; ClipACoupon.com Incorporated available at http://www.clipacoupon.com; CoolSavings.com Incorporated available at http://www.coolsavings.com; ValPak at http://www.valpak.com; MasterCard International Incorporated providing the MasterCard Exclusives program available at http://www.mastercard.com/exclusives; and American Express Company providing the Offer Zone program available at http://americanexpress.com.

A further disadvantage is that a consumer needs to have credit cards, coupons, or other awards "in-hand" for presentation at the time of a transaction. For example, the prior art punishes a consumer who forgets their merchant loyalty card by making them pay a non-discounted price.

In addition, the prior art deals with consumers in a singular fashion and provides only generic incentive awards (e.g., two airline miles for every dollar spent) to every individual instead of personalising or aggregating consumer transactions for "strength-in-numbers" and soliciting competitive and customised benefits that may exceed the generic incentive awards.

Furthermore, consumers and incentive award suppliers are significantly limited in their ability to interact with each other during a transaction in ways that would enhance value to both parties. While consumers may know of and might use conventional incentive award search and discovery mechanisms to review incentive awards, such methods provide virtually no value to the consumer during a transaction since conventional methods only reflect historically published incentive awards and related terms and, more importantly, allow no interaction with the incentive award supplier's current zone of possible agreement, best negotiable alternatives, or dynamic business objectives as they relate to performance achievement goals and award concession limits at the time of an action or transaction. Although portable and pervasive personal digital assistants and computing devices (e.g., Palm's Series VII, Research In Motion's Blackberry, Sprint's Internet-enabled cellular telephones) may provide convenient access to review incentive awards while standing in a check-out line, such ultra mobile devices and systems simply provide information to the consumer without providing any additional functionality. Consumers suffer burdens due to this limitation since they cannot easily, conveniently, and effectively filter, evaluate, and avail themselves of the pertinent and extensive opportunities and benefits that incentive award suppliers are willing to provide to them.

For example, the Internet World Wide Web site of Quicken.com (i.e., http://www.quicken.com) provided by Intuit Incorporated allows consumers to search and display comparative information regarding credit cards and their associated incentive award programs. The Quicken system allows a consumer to identify credit cards that are offering various incentive awards ranging from the "lowest" introductory APR to the "best" frequent flyer airline mile program. With the aid of the Quicken site, a consumer can request comparative product data and then receive further information regarding the specific details of a credit card and its incentive award program. While helpful, such information retrieval systems do not allow the consumer to interact with the incentive award suppliers, either in individual or aggregate transaction forums, to enhance the available incentive awards, to mix-and-match various award combinations, or to create custom incentive awards. In addition, the consumer must manually review and evaluate each award program's terms and conditions, such as topics of fixed versus variable interest rates. This system merely supplies information to the consumer without providing any additional functionality. For example, a consumer is not able to utilise any "Quicken-identified" advantages when they move through a checkout line if a more desirable benefit program requires obtaining a new credit card in order to settle their purchase with the cashier.

Furthermore, the prior art is limited in that its conventional payment and settlement processing systems, incentive award processing systems and methods, and incentive award search and discovery mechanisms provide, at best, a simple "got it, don't got it" comparison of benefit features, and as such they do not provide active and dynamic benefit competitions. The difference being that the former provides information for review while the latter provides reviewed information.

Another limitation is that while organisations, such as eCredit.com Incorporated, offer methods to connect businesses to financing partners in order to provide real-time credit to consumers, the financing of a purchase at the time of the purchase is generally based on a financier's acceptance of risk, and such related conditions. Such methods do not evaluate the consumer's desire for preferred incentives and awards and the commensurate means (e.g., payment accounts, award redemptions) available to acquire such incentives and awards. Although the purchase is financed, the consumer acquires no additional benefits since there is no knowledge of the consumer's benefit preferences.

Previously proposed enhancements have not allowed consumers to expose, transmit and have their incentive award preferences and conditions considered at the time of an action or transaction to the payment or incentive award suppliers using the conventional credit card transaction system, payment and settlement processing system, and incentive award processing system infrastructures such as credit card stations, point-of-sale workstations, personal computers, or portable computing devices using any processing or connection means such as payment networks or the Internet. More particularly, previously proposed enhancements to credit card, payment, settlement, and incentive award systems have not allowed consumers and incentive award suppliers to directly adjust incentive award parameters at the time of an action or transaction that may affect the determination and production of settlement solutions, actions, and related payment or redemption accounts, and such other relevant account items, for delivery to related parties to affect actions and transactions and also user, consumer, merchant, award supplier, and payment and award issuer accounts.

Each of the aforementioned systems and processes require considerable time and effort on the part of the consumer if they seek to obtain benefits. As such, the need for a consumer to search for incentive awards either manually or using additional systems and processes can be costly, can diminish the intended value of the incentive awards requiring such additional time, effort, systems and processes, and can limit the intended benefits to consumers.

It is the goal of the inventor to make incentives, awards, and payments adaptto people, instead of the other way around, and to integrate them into our transaction surroundings so we may take advantage of their economic power and satisfaction without really thinking about them.

Accordingly, the shortcomings associated with the prior art have heretofore not been adequately addressed. The present invention addresses such limitations by providing a system and processing approach that have not previously been proposed.

Prior Art Examples and Associated Limitations

Various proposals have been made to enhance the credit card transaction systems, payment and settlement processing systems, and incentive award processing systems and, in particular, to enhance the abilities of credit card, payment, settlement, and incentive award systems to provide benefits to parties such as credit cardholders, credit card issuers, credit card processors, payment processors, settlement processors, award suppliers, incentive award processors, banks, financiers, consumers, affinity groups, and merchants. However, no proposals to date have enabled award suppliers and consumers to interact with related actions and transactions, in either a singular or aggregate transaction format, in conjunction with a plurality of incentive awards (i.e., benefit options and condition structures) at the time of an action or transaction in order to affect the supplied and acquired incentive awards, the determination of benefits and consequent selection of actions, payment or redemption accounts and relevant account items, transactions, and also user, consumer, merchant, award supplier, and payment and award issuer accounts.

As an example, the Microsoft Passport web site describes a typical scenario of a consumer shopping in a store. The Passport site describes how " . . . you enter a retail shop and [when] you see something you want to buy, you pull out your wallet and choose the appropriate credit card and hand it to the merchant." This process is typical of the prior art whether in bricks-and-mortar establishments or electronic-commerce settings. The responsibility of determining the "appropriate" credit card to use always rests with the uninformed or under-informed buyer. The payment method selection usually is performed with reference to what the merchant will accept and not to any wide-ranging and meaningful information about the universe of benefit opportunities or reference to an up-to-date understanding of economic "appropriateness" at the time of a payment choice. The Microsoft Corporation Passport Internet World Wide Web site is available at http://www.passport.com with the previous referenced quotation published on 5 Oct. 2000 and located at Internet address http://memberservices.passport-.com/HELP/MSRV_HELP_whatiswallet.ASP. Furthermore, on the date of 2 Aug. 2001, the Microsoft Passport World Wide Web site provided a white paper concerning the Passport product stating the following about the Passport wallet express purchase option: "On the wallet profile page, the user can add new credit card or billing/shipping address information, or select from the information already stored there. After the user has selected or entered the card, billing address, and shipping address to use for the current transaction, those pieces of information are sent (using the HTTP POST method) over SSL back to the merchant using data field names compliant with the Electronic Commerce Modeling Language (ECML) standard." This is continuing evidence that the prior art only embraces "non-benefit-driven manual user-selection settlement options," and this as promulgated by one of the leading software companies in the world. The previous white paper information appeared on the Microsoft Corporation Internet World Wide Web site located at http://passport.com/Business/WhitePaper.asp?lc=1033.

Amazon.com Incorporated offers a further example of non-benefit-driven manual users election settlement options. Amazon offers on their Internet web site on the of 16 Aug. 2001 a method referred to as their 1-Click ordering process. This method provides for a specific credit card to be associated with a specific shipping address, among other elements. While such a method may offer convenience and also speed the order settlement process, the user is still required to manually review the benefits they desire to acquire, identify available benefit suppliers and terms, and select the appropriate credit card to associate with a shipping address and ultimately submit for payment.

As another example, the Aria Visa Portrait credit card offered by Providian National Bank (PNB), a credit card issuer, makes available certain incentive awards redeemable via credit card payment at a point of sale. The Aria Portrait card provides awards such as an introductory annual percentage rate (APR) charge of zero percent for purchases, and a reward "points" program (i.e., MyPoints awards) that grants points which may be exchanged for goods or services. PNB provides its cardholders with various incentive award terms and conditions based on the cardholder's credit card classification (e.g., Platinum card, Portrait card, Persona card). While all the various PNB Visa card classifications benefit from both overall and individual advantages, the incentive awards within a certain classification are uniform (e.g., Portrait cardholders receive zero percent APR for the first two monthly billing periods, Platinum cardholders receive zero percent APR for the first three monthly billing periods). After the consumer applies for and receives an Aria Portrait credit card account, they may select to pay for purchases with the credit card and then have the appropriate class of incentive awards applied to qualifying transactions.

At the time of a point-of-sale transaction, the buyer selects and provides the merchant with the Aria Portrait card (e.g., in-person) or the account number (e.g., mail, telephone, or Internet order). The merchant submits the transaction information including the cardholder's account number to PNB, the credit card issuer. If the cardholder's account is in good standing and can accept the charges, an authorisation code and payment approval is sent to the merchant. PNB then distinguishes and designates the transaction purchase amount to be processed with an incentive APR and issues the MyPoints reward points to the cardholder's incentive collection account maintained by PNB or its agent.

As indicated above, when using the conventional credit card transaction systems, payment and settlement processing systems, and incentive award processing systems, the buyer manually selects and submits a payment account identifier (e.g., Aria Visa card, Fleet MasterCard Debit card, Delta Airlines SkyMiles card, personal check) to settle a transaction. The limitations of such manual selection and use of a "non-benefit-qualified" payment account identifier does not furnish the buyer with the best incentives and awards available at the time of purchase. The buyer is incapable of knowing, with any degree of certainty, that they have made the best possible selection and delivery of a payment account identifier in terms of how the selected payment account and associated awards relate to a broad set of available benefits and preferred incentive awards at that moment in time.

More particularly, buyers who are seeking the maximum duration for a zero percent APR may use their Aria Portrait credit card but would probably upgrade their account, if they were informed and qualified, to an Aria Platinum card. The Platinum APR extends coverage to the first three monthly billing periods instead of just two billing periods. At the same time, the buyer, if informed and qualified, would probably obtain and use a Discover Platinum credit card, offered by Discover Financial Services, since it offers an introductory APR charge of zero percent for the first five monthly billing periods. This same escalation-of-opportunity exists for consumers seeking to maximise their receipt of frequent flier airline miles, reward points, cash-back bonuses, purchase discounts, free shipping, or other incentives, awards, and benefits.

Benefit Discovery

Conventional incentive award discovery and usage methods involve a substantial expenditure of time and effort on the part of the consumer related to discovering, applying for, remembering, possessing, and presenting the appropriate payment or redemption account identifier during a transaction in order to obtain a single, sought-after, time-dated, static, "best award recalled" incentive award or benefit. Unfortunately, the consumer's laborious endeavours do not end there since they must also compare disparate values among incentive awards, such as determining the equivalence and assessed value of one Aria reward point versus two Delta SkyMiles frequent flier miles. The consumer also is burdened to comply with other "fine print" terms and conditions such as determining qualifying purchases and initiating incentive award claims prior to expiration dates.

Presently, the consumer may not learn or be told about better settlement or exchange actions to perform that will introduce benefits that reduce the price of items or that acquire beneficial incentives and awards. For example, only rarely does a sales clerk produce a discount coupon for a customer when such customer is unaware of recently bulk-mailed sales promotion materials or if the customer did not remember to take their member loyalty card or coupons to the marketplace. A traveler is at a significant disadvantage since they may be in an unfamiliar area and need to purchase goods or services yet have no exposure to the local newspaper or other information sources to become aware of discount coupons or other vicinity benefits. Consumer unawareness and forgetfulness are punished with the penalty being non-discounted prices or lost incentives and awards. For that reason, the burden is on the consumer to look, learn, and provide for his or her own well being by having someone, or something, perform such benefit-management tasks for them.

Viewpoint of the Benefit Recipient

From the buyer's perspective, the conventional credit card transaction systems, payment and settlement processing systems, and incentive award processing systems are not capable of providing the buyer the abilities to easily, conveniently, and effectively identify, compare, determine, select, acquire, and utilise preferred and superior incentive awards on a strategic, ad hoc, or post hoc basis and then guide actions and deliver the appropriate payment or redemption account identifier, or multiple payment or redemption account identifiers, and such other relevant account items to the related payment and award issuers in order to acquire selected incentive awards for the buyer and, in addition, to settle the transaction with the merchant. Such ability would help buyers to receive and utilise superior benefits and incentive awards adapted to a buyer's preferences based on an enhanced awareness of current opportunities, an improved knowledge and better understanding of incentive award values, and active competition between incentive award suppliers.

For example, while the previously mentioned PNB MyPoints awards that accrue in a buyer's incentive collection account maintained by PNB may be utilised within any PNB sponsored redemption environment, there is limited ability to compare and redeem such points outside the boundaries of the MyPoints program or affiliated redemption networks and venues. Improving such ability would assist buyers in assessing the value and use of limited portability incentive awards, or permit the barter or exchange of limited portability incentive awards for other incentive awards best matching specific buyer preferences and economic utility relationships.

Viewpoint of the Benefit Supplier

From the award supplier's perspective, the conventional credit card transaction systems, payment and settlement processing systems, and incentive award processing systems restrict the award supplier's ability to introduce enhanced or competitive incentive award assertions at the time of an action or payment or settlement determination, such as during a purchase transaction, in order to persuade consumers to acquire their particular incentive awards and thus use the corresponding payment or redemption account. Incentive award suppliers generally rely upon passive marketing campaigns to solicit account usage by offering awards that may be ineffective for many reasons including such causes as: (a) the consumer does not become aware of incentive awards or otherwise understand the award supplier's collateral material (e.g., non-subscription to targeted media channels, language barriers), (b) consumers are not informed of awards due to discriminatory practices, (c) the consumer does not physically carry all of their payment or redemption account identifiers with them (e.g., credit cards, debit cards, smart cards, loyalty cards, discount coupons) and thus, may not have the appropriate account identifier card in their possession at the time of a purchase, (d) the consumer may have access to their payment or redemption accounts by electronic methods and thus not require a physical card (e.g., the telematic use of cellular telephones to authorise payment at vending machines), but the telematic linkage with and use of a payment or redemption account is statically configured and does not offer dynamic payment or redemption account allocations based on benefits and incentive awards, (e) the consumer becomes aware of the incentive awards but forgets to use the appropriate payment or redemption account identifier at the time of a purchase, or (f) the consumer is a creature of habit and presents the same payment account identifier (e.g., Fleet Visa credit card) for all purchases ignoring available benefits and incentive awards based on reasons such as not wanting to spend time and effort searching for incentive awards or remembering the diverse awards, terms, conditions, and usage requirements. Improving such an ability would help incentive award suppliers attract consumers with dynamic incentive awards at critical opportunities during the lifetime of an action or transaction such as when consumers are preparing to initiate or consummate a purchase, payment, or transaction, and especially when buyers select and authorise the submission of a payment or redemption account identifier, or multiple payment or redemption account identifiers, and such other relevant account items, to settle a purchase, payment, exchange, or transaction.

For example, a buyer concerned with the longest time extension for an introductory zero percent APR may use a different payment or redemption account if they become aware of an incentive award supplier providing a better extension of zero percent APR billing months. Without the ability to introduce enhanced or competitive incentive award assertions at the time of a transaction, the incentive award supplier is constrained to use limited conventional marketing tactics to attract consumer business, such as television ads and bulk mail marketing. While such conventional methods promote incentive awards to the consumer, the awareness level only extends to the limited television or mail coverage area, and then, unfortunately, such promotions usually arrive either in advance of, or too late after, a transaction's critical decision intervals. Such conventional incentive award marketing methods ultimately may not reach, or the awards may not be used by, the consumer regardless of how well the incentive awards match a consumer's award preferences or even if the awards provide the best available benefits to the consumer.

The use of an open and interactive benefit-recipient-to-benefit-supplier interface also would provide a level playing field for consumers in that all payment and award issuers could interact with all consumers based on action and transaction activity and focus on the consumer's ability to qualify for payment and award offers without regard to discriminatory biases.

As an example of consumer-biased disadvantages, Carey Goldberg wrote an article entitled "Accused of Discrimination, Clothing Chain Settles Case" in the 22 Dec. 2000 edition of The New York Times on the Web (http://www.nytimes.com/2000/12/22/national/22MASS.html). The original story was taken from a press release from the Office of the Massachusetts Attorney General dated 21 Dec. 2000 entitled "Attorney General Tom Reilly and MCAD Settle Discrimination Allegations Against The Children's Place After Racial Profiling Investigation in Massachusetts Stores." The complaint alleged, in part, that employees were instructed to refrain from inviting black customers to apply for store credit cards, telling minority customers about sales, and store managers denying discounts to minority customers. The present invention contemplates that its "blind" application for new payment accounts (e.g., credit card accounts) based on an individual's creditworthiness and other factors along with its unbiased utilisation of discounts will help to alleviate discriminatory practices that may occur in the marketplace.

The prior art further limits the incentive award suppliers since the award supplier's attention must be, and is, focused on attracting customer business at the consumer awareness and "mindshare" level while it would be more effective if the incentive award suppliers could focus their attention on attracting customer business at the action and transaction service processing level.

The prior art's focus on "mindshare" also inherently limits the flexibility of incentive award suppliers with respect to their incentive award metrics. Most incentive awards are quoted in whole integer values (e.g., 2 airline miles, 3 months of delayed APR interest, 100 reward points) with interest rates being one of the few items that use fractional numbers (e.g., 2.9% APR). Since incentive award suppliers focus on the consumer awareness level, and the average consumer readily understands integer values better than fractional values, most incentive award marketing programs will publish how, for example, their airline mile award program offering 2 miles for every transaction dollar spent is better than a competitor's award program offering only 1 mile for every dollar. While the marketing claim is true in fact that 2 is greater than 1 at the mathematical level, if instead the marketing focus was directed to a computing system's transaction processing level and if incentive award suppliers had the flexibility to modify their program metrics during a transaction, then a benefit competitor could best the psychological 2 mile integer offer with a non-integer numeric proposal of 2.00017 airline miles. Future benefit and incentive award metrics will require dynamic and floating numeric flexibility especially with the micro-payment strategies envisioned for the upcoming global marketplace. Metric changes will be brought on by the Internet and other communication and commercial transaction revolutions and thus require associated micro-awards to be available to consumers.

Limited Competition

Overall, the prior art of conventional credit card transaction systems, payment and settlement processing systems, and incentive award processing systems does not provide either the consumers with the ability to coordinate their actions and ascertain and utilise the most advantageous benefits and incentive awards and then exchange or deliver related payment or redemption accounts, or the incentive award suppliers with the ability to compete for customer actions and business at the time of an action or transaction, such as planning for or engaging in a purchase transaction.

While there may be a limited ability for sales clerks and cashiers to manually enter discounts or alternative awards using conventional payment and settlement processing systems and incentive award processing systems at the time of a transaction, such ability is grievously lacking additional functionality since there is no incentive award supplier competition introduced into said transaction environment from outside the merchant's and consumer's immediate boundaries.

As an example, the American Express Company provides their Membership Rewards program for American Express cardholders. This system uses credit card transaction systems to deliver enhanced value to their cardholders. With these systems, a cardholder's purchase behaviour is tracked and then cardholders are rewarded for their loyalty based on that behaviour. A cardholder earns Membership Rewards "points" with every purchase they make. When a cardholder wants to make use of their accumulated points, they manually search and select their reward items from those offered by the American Express Company. The cardholder can manually order certificates or merchandise with their points. These certificates then can be used with the cardholder's next purchase in order to affect the transaction amount. It should be noted that this system of accruing points is based on a cardholder's competition with himself meaning that in order to get additional value (e.g., more points), he must commit to spending more of his money. This system does not provide the consumer with the ability to institute rivalry among and between incentive award suppliers at the time of an action or transaction and thus have the incentive award suppliers compete to provide additional points for the same dollars. Consequently, the "points" program offers static incentive awards, is benefit supplier driven, and thus is not capable of responding to any consumer preferences or competing incentive awards available from other benefit suppliers at the time of an action or transaction. It is well known that competition is a precursor to the delivery of better products, and the consumer is at a disadvantage if active benefit competition is not introduced into incentive award transactions at various and significant transaction decision opportunities.

Terminology and Terms Related to the Present Invention

It should be noted that in the following descriptions, explanations, and examples the generic word "universal" will be applied and joined with such words as card, account, system, processor, issuer, and other vocabulary. The use of the word "universal" merely refers to the general embodiment of the present invention and should be considered and interpreted as a convenient representation for reading purposes only.

As is usual in systems employing payment and award processing and computer systems and software, there is a great deal of terminology involved, including acronyms, which is specific to the field. Familiarity with some basic terms is helpful to later discussions of the invention, thus the following simplified terms relating to payment systems, award systems, and relational database modeling in general, and to the present universal award access and payment invention in particular, are introduced in the partial glossary below for general reference purposes.

GLOSSARY

Account identifier—An identification code assigned to any type of account for reference purposes. The identification code may be indicated on various mediums such as, for example, a credit card account having an assigned number and the number imprinted on a plastic card and also embedded as electronic data in a magnetic stripe on the plastic card. In addition, a personal identifier may be used to refer to a person or entity and not particularly to an account and may use, for example, a digital signature or biometric indicator as a person's or entity's identifier. In general, any type of unique personal identification that allows a one-to-one correlation with any of various personal account identifiers when considered in a mutually agreed and appropriate context.

Action—Instructions produced and/or operations performed by at least one of a user or system involved with transactions such as, for example, querying a list of goods or services for related benefits, reviewing benefits offered by merchants in a geographic location prior to commencing a shopping session, selecting a product for purchase based on available benefits and instantiating such purchase with a merchant based on available benefits, or acquiring benefits by authorising payments. Actions may also encompass instructions being advanced or delivered to parties for operation, for example, delivering the instruction to decline additional rental car insurance as an action for the user to perform. In addition, actions may involve calculating operations.

Acquisition function—One or more actions, possibly including arguments and conditional expressions, that may be executed to acquire, or otherwise obtain, goods and services. Also includes derivatives thereof.

Award account—An account used to accumulate objects such as, for example, frequent flier airline miles, points, discounts, available interest rates, standing in a queue, reduction of delays, discount coupons or identifier codes, benefit access codes, etc., that also may involve certain object terms and conditions, which may be offered or redeemed as valuable consideration in a transaction or exchange. See also Collection Account and Redemption Account.

Award Supplier—Refer to Option Supplier.

Buyer—Refer to Debtor.

Calculating operations—Arithmetic or some limited logic operations performed upon or with signals representing numbers or values.

Collection account—An award or incentive account such as, for example, a frequent flier airline mileage account and into which various acquired awards such as frequent flier airline miles are accrued. A collection account may be the same as, or an integral part of, a Redemption Account and such combination of both accounts is referred to as an Award Account.

Computer system—A machine that inputs data, processes data, performs calculating operations, stores data, and outputs data.

Consumer—Refer to Debtor.

Consumer transaction—An individual transaction event consisting of information related to a particular creditor and debtor.

Creditor—A person or entity to whom something of value is owed for goods or services. Depending on context, a creditor may also refer to a transaction initiator or otherwise indicate a participant in an exchange. See also Debtor.

Data processing system—Also referred to as an "automatic data processing system" or a "computer system." Refer to Computer System.

Debtor—A person or entity that has incurred a liability and owes, or otherwise is required to produce, consideration to a creditor for goods and services. Depending on context, a debtor may also refer to a transaction respondent or otherwise indicate a participant in an exchange. See also Creditor.

Exchange—A swap or trade made among creditors and debtors or made among peers involving goods, services, and consideration transactions such as, for example, bartering various types and quantities of incentives and awards between parties for collection purposes or purchasing airline tickets with a combination of currency and discount awards.

Function identifier—Functions may be specified either by the specific and underlying computer programmed and mathematical operations (i.e., the detailed instructions executed or run to effectuate the intended task) or by labels or pointers referred to herein as "function identifiers."

Incentive award processing system—A data processing system that manages or interfaces with all aspects of various incentives and awards, and such related systems, and the associated collection and redemption accounts.

Incentive redemption account—Refer to Redemption Account

Incentives and awards—Benefits offered for using a particular payment method or account, buying a certain product, shopping at a particular store, or objects of value available for exchange. For example, cash rebates, frequent flier airline miles, dollars-off or percentage-off discounts, interest rates, standing in a queue, etc.

Instant messaging—Any conventional or state-of-the-art communication system that allows available data or entries made on one computer system or telecommunications device to appear virtually simultaneously or contemporaneously on another computer system or telecommunications device, or on a plurality of such systems and devices.

Instant-In™—An arrangement whereby a user authorises certain information to be automatically supplied to an opt-in membership program based on an evaluation of associated benefits in order to create, for example, a payment or award account and derive benefits from such account. Instant-In is a trademark and service mark of Talisman Research Corporation.

Linkage—Correlated references used to connect items including, for example, visual indicators and embedded links such as those used in the Hypertext Markup Language prevalent in the Internet. In general, a linkage provides the user with a type of connection between one item and at least one of another item.

Merchant—Refer to Creditor.

Messaging—Refer to Instant Messaging.

Option—Refer to Option Structure.

Option description—Descriptive text illustrating the option structure.

Option directives—Specific terms, conditions, requirements, metrics, and provisions associated with the supply or acquisition of the option items that must be applied to an action or transaction and the related parties.

Option identifier—An identification code assigned to an option structure for reference purposes. Such reference identifier may include labels and pointers.

Option items—Benefit elements that are included in an option offer, e.g., interest rates, delayed payment dates, airline miles, memorial advantages, placement in a queue, reduction of waiting time. See also Option Structure.

Option offer—Refer to Option Structure.

Option preferences—A person or entity's catalog of desired option items, possibly with related acquisition priorities and conditions.

Option structure—The total arrangement of an available benefit, such as a payment, discount, incentive, or award offer's various details. Such structure will include, for example, an identifier, description, items, directives, and supplier. Also referred to as an Option or a Master Option Structure.

Option supplier—A person or entity, or combination of such, that establishes a commitment to provide option items that may be supplied, acquired, and exchanged among parties. An option supplier may also be, for example, a Payment or Award Issuer, Merchant, or universal account owner.

Payment account—An account possessing value and from which disbursements or transfers of value may occur. For example, a financial institution may provide a user with a credit card account for the payment of purchases or for cash advances. Also includes, for example, debit card accounts, stored value cards or such devices, smart electronic cards or such devices, electronic transfer accounts, investment and bank accounts, liens, currency, personal service time, equity loan accounts, tax accounts, etc.

Payment and settlement processing system—A data processing system that manages or interfaces with all aspects of various payments and settlements, and such related systems, and the associated payment and redemption accounts.

Payment and/or award issuer—A person or entity, or combination of such that endorse, guarantee, and effect contractual obligations between parties. Issuers generally create and administer payment or award accounts for a user. A payment issuer need not also be an award issuer, nor an award issuer need be a payment issuer, but integrated combinations may exist. A payment or award issuer also may be, for example, a creditor or an Option Supplier.

Payment and redemption accounts—Refer to Payment Account and Redemption Account.

Payment incentives and awards—Refer to Incentives and Awards.

Payment or settlement or exchange request—An appeal by one party for another party to deliver or trade valuable consideration to satisfy the conditions of a transaction.

Payment/award issuer—Refer to Payment and Award Issuer.

Payment/award offer—An intent to provide valuable items that will satisfy a consumer demand for, or produce a supply of, incentives and awards. A payment/award offer consists of at least one, and may include multiple, option structures.

Payment/award provider—Refer to Option Supplier.

Provisional shell account—An account consisting of anticipatory information such as a payment or award issuer (e.g., MasterCard International Inc.) and a status code or identifier code pre-qualifying the universal account owner or merchant account owner to obtain a payment or award or processing account, such as a Fleet Visa credit card account. For example, no actual credit card account would exist until such time as an advantageous option offer required the use of such a payment or award account.

Redemption account—An award or incentive account such as, for example, a frequent flier airline mileage account and from which various accrued awards, such as frequent flier airline miles, may be redeemed and converted to valuable consideration in order to affect a transaction. A redemption account may be the same as, or an integral part of, a Collection Account and such combination of both accounts is referred to as an Award Account.

Seller—Refer to Creditor.

Supply function—One or more actions, possibly including arguments and conditional expressions, that may be executed to produce, or otherwise make available, goods and/or services. Also includes derivatives thereof.

Transmission—The act and means of delivering information including, for example, verbal, visual, manual, wireless, and wired methodologies using speech, physical delivery, and electronic networks (e.g., VisaNet, Internet).

Universal—A convenient and generic textual description of the present invention as joined in numerous vocabulary phrases such as, for example, universal card, universal cardholder, universal account, universal account owner, universal server. The word is used for convenient reading purposes only and no claim is made or any intent to infringe the trademark rights or claims held by any legal owner.

Universal transaction—An aggregation of consumer transactions with additional information related to the combined attributes of the data.

User—Any person, entity, or combination thereof that uses or becomes involved with the present invention.

REFERENCE PUBLICATIONS

"Palm Ushers In New Way for Consumers to Make Purchases, Get New Services With eWallet Technology"; PR Newswire press release available from http://news.moneycentral.msn.com/ticker/article.asp?Symbol=US:PALM&Feed=PR&Date=2001 0106&ID=454447 (Microsoft Corporation Money Central World Wide Web site) on 6 Jan. 2001.

"VeriFone and Palm Demonstrate eWallet Technology at CES"; BusinessWire press release available from http://news.moneycentral.msn.com/ticker/article.asp?Symbol=US:PALM&Feed=BW&Date=200 10106&ID=454448 (Microsoft Corporation Money Central World Wide Web site) on 6 Jan. 2001.

"Ingenico and Palm Plan to Develop Secure Infrastructure for Virtual Card Payment"; PR Newswire press release available from http://news.moneycentral.msn.com/ticker/article.asp?Symbol=US:PALM&Feed=PR&Date=20010106&ID=454449 (Microsoft Corporation Money Central World Wide Web site) on 6 Jan. 2001.

"MasterCard Exclusives Online"; MasterCard International Incorporated company information available from http://www.mastercard.com/exclusives/(MasterCard International Incorporated World Wide Web site) on 15 Jan. 2001.

"M-Wallets: Not Ready Yet"; Peter Rysavy; M-Business Magazine (ISSN# 1532-3137); April 2001; p. 85.

"M-Payments Meet Point-of-Sale"; Ellen Jensen; M-Business Magazine (ISSN# 15323137); May 2001; pp. 7677.

"Snaz Commerce Solutions"; Shopnlist, Incorporated company information available from http://www.snaz.com/corp/products/products_wallet.jsp (Snaz.com World Wide Web site) on 9 Jun. 2001 regarding the Snaz wallet service. Specific reference is made to the statement "Once the user executes the m-wallet, he can choose the credit card he wants to use . . . "

SUMMARY OF THE INVENTION

In view of the deficiencies of the prior art discussed before, the present invention is advantageous in that it provides an on-line, interactive, and fully integrated benefit-driven value exchange and settlement program that monitors, evaluates, and manages economic and personal benefits and executes functions to produce and acquire the maximum or preferred benefit items for users by guiding and automating appropriate payment and settlement actions. It is a system and method for evaluating a catalog of payment, marketing, and incentive benefits; determining benefit valuations according to a user's profile; and, producing the instructions, actions, and means of acquiring and utilising determined benefits that provide maximised and preferred value to the user.

Furthermore, the present invention finds useful patterns in data; produces conclusions based on rules and experience; responds to environmental changes with or without human intervention; and, may evolve through selecting the best results from random mutations all of which are intended to maximise user value.

The present invention can quickly master the intricacies of all suppliers' benefits plans, as well as possible combined benefits packages. All a consumer has to know in order to maximise their acquired benefits is how to use just one transaction benefit and payment management account.

The present invention's key advantage is that it offers personalised benefit-driven settlement solutions to consumer transactions by producing value determinations according to a user's configured benefit profile. The present invention integrates with conventional payment, settlement, and incentive systems.

In addition, the present invention functions with any benefit provisioning or service publishing system and extracts and exposes benefit structures that enable the present invention system to evaluate and determine linkages from an extensive catalog of benefit items and linked data that will provide individualised benefit solutions.

Operational Overview

The present invention combines a user's benefit preferences with their payment and award accounts in order to review, assemble, and deliver optimal benefit acquisition solutions on which to base decisions, perform instructions and actions, and settle transactions.

Users create an account profile like the one shown in FIG. 4. Not only are preferred incentives and payment strategies listed, but also payment and redemption accounts that may be introduced and processed during a transaction.

Once the user creates a profile, they can make settlements with the present invention the same way they use any other credit card or payment account. Merchants continue processing transactions in a conventional manner, except the transaction information will first be transmitted to the present invention (e.g., a computer server). After receiving the transaction data at the server and authenticating the user account, the user's preferred benefits are retrieved and reviewed.

The particular user highlighted in FIG. 4 has set a preference to use low interest rate financing offers. While a Visa promotional offer may provide the lowest rate, it could be that another offer, such as a $25 cash rebate from MasterCard, is more valuable. This is where the present invention makes smarter settlements for the user by reviewing the preferred incentives in a cascading fashion and by evaluating all available offers. Once the best offers are identified, the present invention may negotiate with award suppliers for improved benefits. The present invention, in one embodiment, then will automatically select the best benefits according to user preferences, directives, and latitudes and consequently advance the appropriate payment accounts to use that will acquire the benefits and settle the transaction.

In addition, limits can be set to get only the awards the user wants. This user wants to accumulate a maximum of 25,000 airline miles after which, the next priority benefits would be obtained.

After selecting the best offers, the present invention determines if the user has the required payment account as determined, such as a MasterCard credit card account. If there is a MasterCard account available, the information needed to settle the transaction is delivered to the payment processors, banks, and the merchant. If the member does not have a MasterCard account, the system will automatically apply for an account in order to get the best benefits. In addition, all user information may be listed on one activity report sparing the user from being flooded with numerous monthly statements if a new payment account is added.

It is also possible to use multiple credit cards to settle one transaction. For example, a purchase may involve shipping charges that Visa would pay if the user submitted their Visa card to charge at least $50. Meanwhile, MasterCard is offering five airline miles per dollar. On a $200 purchase, Visa may be allocated $51 in order to eliminate the shipping charges and $149 is allocated to a MasterCard account in order to get the airline miles.

The present invention eliminates the possibility of lost, misplaced, or stolen payment options, providing consumers greater flexibility in making their benefit arrangements, eliminating the waiting period for coupon deliveries, simplifying changes to a benefit strategy, and enabling the consumer to request benefit changes over a connected device.

A further advantage of the present invention is that it provides identity management and authentication services to facilitate transactions in commerce. Such benefits will help reduce identity theft and economic losses attributed to the fraudulent use of credit cards and other payment and benefit instruments.

These present invention services and conveniences, along with many more, are available to the user anytime and anywhere by using wired and wireless mediums (e.g., the Internet, cellular networks) and such appropriate devices.

General Benefit-Centric Overview

The present invention creates a loyalty provider network that matches benefits and the means to acquire benefits with payments, queries, and exchanges. Users complete a personal profile listing benefits by priority to them, e.g. airline miles, cash discounts, lowest fees, etc. All purchases, queries, and exchanges are then matched against this profile to automatically select the best benefit-driven settlement solution.

As one example, when making a payment, the user provides their present invention card or other account identifier to a merchant who enters it into the existing credit card payment network (e.g., VisaNet). A present invention server, online with the payment network, finds the member's appropriate benefits and ranks them in terms of preference and value. The present invention then selects the payment methods that will acquire the maximum benefits according to the member's profile. Visa, MasterCard, bank debit, Delta SkyMiles, MyPoints, Macy's and any other existing or immediately available user accounts are all contenders with the best account being automatically selected and transmitted for each transaction. The server also may be accessed and queried anytime from a variety of wireless access methods and devices, including voice, wireless phones, and personal digital assistants (PDAs).

The present invention automates acquisition of the best benefits for the consumer. Presently, shoppers select a way to pay (e.g., AmEx) and then get whatever static benefits are offered to them (e.g., 3.9% APR, 2:1 airline miles). There is no value comparison or external intelligence serving the consumer's interests. With the present invention, getting the best benefits will direct the way to pay, act, or exchange.

The present invention will be connected with credit card issuers, vendor house account programs, commercial payment plans, and others. Incentives and benefits offered by these companies and more will be continuously updating the present invention. Users always receive the best selection among benefit options available at the time of transaction.

Transaction System Overview Elementary System Operation

In one embodiment, after selecting goods or services at a marketplace (e.g., brick-and-mortar, virtual storefront, exchange forum), a subscriber in good standing being equipped with the present invention's unique membership account identifier mechanism (e.g., magnetic stripe credit card, bar code key tag, electronic transponder, wireless device, biometric trait) will present such account identifier to the merchant (e.g., point-of-sale terminal, credit card entry pad, Internet web site screen, sales order form) to make payment for the goods.

The merchant will enter the account identifier and other transaction information into the conventional electronic payment network (e.g., VisaNet, Automated Clearing House system) by whatever means (e.g., Internet connection, wireless broadcast, dedicated data Ine) for transmission and routing to the present invention's central processor system.

The central processor will identify, authenticate, and validate the unique membership account identifier. Invalid accounts will cause the transaction to be terminated and appropriate notice communicated to the originating merchant. Authenticated accounts will be reviewed for their benefit preferences as well as other member account information.

Once a member's preferred benefit is identified (e.g., frequent flier airline miles), the central processor will review the available benefits as maintained in its inventory of benefit structures for appropriate benefit offers. All such appropriate benefit offers will be grouped for review and analysis. The central processor will determine the highest value benefit offer from among all grouped offers and then resolve which payment option (e.g., MasterCard, Visa, bank debit) or actions must be used to acquire the highest value and preferred benefit offer. The central processor also will determine if the resolved payment option (e.g., a Visa account) is acceptable to the originating merchant otherwise a recursive processing loop will continue until a determined highest value benefit offer generates a resolved payment option acceptable to the merchant.

After establishing a payment option acceptable to the merchant, the central processor will review the member's account information to determine if the resolved payment option (e.g., Visa) currently exists in the member's profile. If the payment option determined as acceptable to the merchant does not exist in the member's profile and if the member is not able to immediately secure such payment option with the assistance of the central processor, then a recursive processing loop will continue until a determined highest value benefit offer generates a payment option both acceptable to the merchant and also available for use by the member.

Once a final payment option has been established (e.g., Visa), the central processor will retrieve, for example, the credit card account number from the member's financial data and enter the account identifier and other transaction information, with possible amendments, into the conventional electronic payment network (e.g., VisaNet) using any available connection means for transmission and routing of information to the destination payment processing system.

Such conventional payment processing system will then perform appropriate operations and eventually communicate an acceptance or denial acknowledgement to the originating merchant for transaction settlement. It is possible that the conventional payment processing system may communicate information back to the central processor for further interaction.

In another considered embodiment, all of the previous features are operational with the further options that a user may initiate a query as to the best benefits available for a Sony 36" colour television prior to a purchase transaction. The present invention would review its catalog of available benefits and produce a ranked listing of incentives and awards according to user preferences and directives. Such ranked listing will be communicated to an appropriate form and thus displayed to the user. The user will then be able to engage such linked benefit items in order to commence a further processing activity, or otherwise proceed with such produced linkage instructions and actions as required to acquire the displayed benefits and consequently the product.

Various Interactions Involved with the Present Invention Subscriber Interactions The present invention has operative involvement with the subscriber (i.e., user, universal account owner, consumer) in many ways such as, for example, the following situations: receiving and processing membership applications; accepting, denying, maintaining, or terminating subscriber accounts; issuing and maintaining a unique payment account identifier; providing authenticated confirmation of account existence and validity; providing the subscriber with access to review and modify their personal account data; providing the subscriber with access to review benefit offers and benefit suppliers; providing the subscriber with access and notification of transaction and account activity; providing a contact point and storage medium for benefit awards and information; and, providing a statement of account or summary information.

Merchant Interactions

The present invention has operative involvement with the merchant (i.e., seller, exchange party) in many ways such as, for example, the following situations: providing the merchant with a unique payment account identifier; providing authenticated confirmation of account existence and validity; assembling a payment data packet and directing the merchant's transaction information to the appropriate payment provider; attempting to resolve errors or limitations in subscriber payment options to best complete a transaction (e.g., insufficient balance on one credit card so payment is cascaded to other options); resolving operational issues of benefit applicability (e.g., applying discounts only during valid time periods); and, negotiating differences between the merchant, payment providers, and benefit providers (e.g., multiple credit cards may be used with the need to combine multiple authorisation codes from the payment providers in order to supply the merchant with a single authorisation code accepted by the merchant's equipment or software).

Benefit Provider Interactions

The present invention has operative involvement with benefit providers in many ways such as, for example, the following situations: establishment of a marketplace for benefits; conducting system queries and requests related to maintaining and exposing benefits; engaging in collaborative activities with other parties (e.g., LL Bean Inc. offers free shipping on orders from the LL Bean store if a MasterCard credit card is used to settle the transaction); providing a data warehouse that can be reviewed and analysed according to user-specified criteria (e.g., producing all benefit structures providing American Airline air miles); and, providing an organised benefit structure specification for providers to follow so that information may be stored in a logical, complete, and relational format.

Payment Provider Interactions

The present invention has operative involvement with the payment providers (i.e., banks, credit card companies, telephone carriers) in many ways such as, for example, the following situations: establish connections with their processing operations in order to forward a subscriber's payment option and transaction information for settlement; maintain connections with their processing operations to authenticate a subscriber's related accounts; query their data storage systems about a member's activity or transaction history; maintain connections and execute queries to update benefit information, payment information, terms, and conditions; create collaborative promotional activities and benefit offers in conjunction with subscribers, merchants, benefit providers, and other parties; request a review and consideration of a subscriber's information for a pre-approval confirmation or denial of a payment provider's request for a new account; and request activation of a payment provider's provisional account for a subscriber.

Credit Agency Interactions

The present invention has operative involvement with credit agencies (i.e., credit rating bureaus, transaction authentication services) in many ways such as, for example, the following situations: establish connections with their processing operations in order to facilitate the pre-approval or activation of a payment provider's provisional account; and provide a conduit for subscriber's to query and review their account information.

Telecommunication Carrier Interactions

The present invention has operative involvement with the telecommunication carriers (i.e., telephone operators, cellular telephone operators) in many ways such as, for example, the following situations: establish and maintain a communication account for the subscriber to receive notifications; providing the subscriber with access to account and transaction information by means of such telecommunication carriers and appropriate devices; providing the subscriber with notifications of transactions and account queries (e.g., real-time notification of transactions to reduce fraudulent payment account use or identity theft); and providing various services to enhance the subscriber's lifestyle (e.g., using geopositioning services to observe travel locations and recommend purchases at unknown yet local merchants offering personalised benefits).

Internet and Network Interactions

The present invention has operative involvement with the Internet and other data networks in many ways such as, for example, the following situations: providing subscribers with a means to access their account and benefit information; providing merchants with a means to access and maintain their account and benefit information; providing users and benefit providers with an exchange marketplace; and, providing payment providers with a venue in which to solicit and conduct business.

It should be noted that whenever and wherever the present invention is referred to as a payment card, such reference is meant to encompasses any system access and identification device. A transaction may be conducted with a merchant (e.g., seller) in a buy/sell arrangement, also in a peer-to-peer exchange/swap manner whether between individuals and virtual communities, and even in a transfer method whereby a benefit secured by one party is delivered by the benefit provider to another party (e.g., a charitable contribution). The present invention will not only determine what payment option to use that will secure the best benefits for the user, but also determine if there are any earned awards that may be redeemed during a transaction (e.g., redemption of points or e-coupons). The present invention will determine if there are additional discounts available during a transaction by opening new accounts for the subscriber (e.g., merchant loyalty memberships like the CVS discount program, low interest rate credit accounts). The present invention will be operatively connected to appropriate sources of data and information to enable both the review of available benefits and the ability to subscribe to such requirements as needed to acquire such benefits. The present invention will review whether a merchant may take advantage of additional benefit values by having complementary benefits added to their benefit offerings or if other account options would provide more value to them (e.g., have the present invention open a new merchant account with a lower discount rate). More than one benefit may be acquired for a user during a transaction. More than one payment or settlement option may be used to consummate a transaction.

Operational Details

The present invention determines, exposes, and produces linkages between benefit items and the means to acquire those benefits by, for example, linking an award of five airline miles per dollar spent with a Delta SkyMiles credit card. As a further example of linkage extensions, 10,000 MyPoints bonus points may be linked to purchasing a Sony 36" colour television which may be further linked to a Bank of America Visa credit card account which may be further linked to a Sears retail outlet. It is contemplated that the present invention may combine, produce, or otherwise expose linkages between and among at least one benefit item and the means of acquiring such benefit item as may be established by a benefit supplier, or multiple suppliers, all according to user-defined rankings and directives. The present invention also provides valuations for any benefit offered to consumers and ranks such benefit valuations according to user preferences and directives. In addition, the present invention may display such ranked benefit items, or other linked objects, to the user for further action, or it may automatically deliver linked settlement methods for further action and processing that will satisfy a transaction.

To operate the present invention, a user defines and stores their payment and award accounts along with their benefit preferences and directives such as, for example, to acquire Delta airline miles or to use the lowest interest rate credit account. The invention, when engaged during an action or transaction, reviews and analyses an extensive catalog of available benefits and calculates the value of the appropriate benefits along with producing a link to the means of acquiring the benefits (e.g., 5 airline miles for every dollar spent may be acquired by using a Fleet MasterCard account). The present invention then transfers the data to the appropriate form or transaction processor for further action. The data can also be stored so that users can return later to update it.

The present invention interpolates between benefit values and user preferences making for more useful and applicable valuations. For example, a user may provided a benefit handicap by recording a weighted value for use in calculations that apply to bonus airline miles with a blackout usage period while another weighted value may be provided and used for airline miles without a blackout usage period. As another example, a user may provide benefit handicap or premium ratings for credit card interest rates according to whether they involve fixed or variable rates, or involve introductory rate periods covering 3 months or 6 months. Users can choose to enter their own preferences or use the present invention's available default benefit tables.

Users also can override and modify processing operations and actions. For example, various benefit strategies may be established by the user (e.g., personal benefit strategy, business benefit strategy), then stored with the present invention system, and then engaged by an appropriate user action.

Basic System Requirements for Member Accounts

To become a subscriber of the present invention, an individual must make an application for membership. Applications may be submitted in a multitude of ways including, for example, paper forms mailed to a processing site, telephone applications with customer service representatives, and application forms presented on Internet web sites. After review and acceptance of the individual, a unique member account structure will be initialised in a storage and retrieval database system along with a corresponding unique membership account identifier being issued to the new subscriber.

The new subscriber will populate their personal member account structure (i.e., personal profile) either automatically or manually with information including, but not limited to, personal data (e.g., name, address, social security number), financial data (e.g., wages, credit card accounts, bank accounts, life insurance policies, cellular phone account), benefit preferences (e.g., seek lowest interest rates, obtain frequent flier airline miles), and benefit data (e.g., reward point accounts, balance of accrued airline miles).

The subscriber will be able to make use of various methods to review and modify their account information including, but not limited to: delivery of documents by the United States Postal Service; verbal communications with customer service representatives using in-person, telephone, or facsimile telecommunications; or electronic access by any means such as the use of the Internet.

Basic System Requirements for Benefit Data

A data warehouse of benefit and reward structures will be created and maintained. Such data warehouse will consist of benefit and reward structures that are comprised of information such as, but not limited to, descriptive titles, award metrics, validity dates, provider name, category, terms, and acquisition and redemption conditions.

The data warehouse will consist of a storage and retrieval database system along with communication channels (e.g., Internet, wireless transmissions) that provide the means to access and query remote data storage systems and other command and computing services that may provide operational information. Benefit data will be supplied by benefit providers and may be reviewed and modified by various methods similar to those described above in the "Basic System Requirements for Member Accounts" section.

Basic System Requirements for System Connections

The present invention requires appropriate physical, electronic, and telecommunication connections to conventional payment networks, financial institutions, merchants, benefit suppliers, and all other parties and systems typically involved in user transactions and processing.

The After Setup Operations of Moving Beyond the Best Price and Getting the Best Benefits While shoppers save money everyday by searching for the best price, they may not take the next step and save even more by searching for the best benefits, performing appropriate instructions or actions, and making the best payment. In general, everyone wants to stretch their money, but most can't be bothered with the tedious work of "coupon-clipping." That is why only 2% of all coupons are redeemed. Consumers that do not use valuable cost-saving offers, or earn value-added awards like cash back or airline miles, are either paying more or getting less.

Simple price searching or electronic bill payment services cannot match the present invention's easy, effective, and automatic benefit analysis and settlement system. The present invention finds and evaluates the best user-preferred benefits and then produces, exposes, and may select payment and award accounts and the means that will get consumers valuable is benefits.

Present Invention Highlights

It is an advantage of the present invention that consumer value is maximised by monitoring, evaluating, managing, and utilising an extensive catalog of benefit items.

Another advantage of the present invention is that benefit items can be discovered, analysed, and ranked according to user preferences and directives. In addition, rankings may be assembled according to standardised value metrics.

The present invention also is advantageous in that it provides on-line and distributed access to ranked benefit, incentive, and award information. Such access is available by electronic means and using telecommunication networks such as the Internet.

Yet another advantage of the present invention is that benefit items will incorporate linkages between the benefit items and any of payment options, frequency and award redemption options, product items, real or virtual locations, and other objects that may include or be associated with incentives and awards.

A further advantage of the present invention is that benefit supply and acquisition functions may be created, modified, and managed by appropriate users to interact with benefits and transactions.

An additional advantage of the present invention is that benefit suppliers may institute preferences and directives to establish awards and incentives to accommodate user interests.

A further advantage of the present invention is that when functions are executed and benefit solutions determined, the linked payment or settlement options may be automatically forwarded to appropriate parties to satisfy a transaction. In addition, benefit solutions and such linked options may be displayed to the user for review and further actions.

Another advantage of the present invention is that all of a user's payment and award accounts are available for immediate use regardless of physical location. This allows for a rollover effect that may, for example, employ all of a user's combined available credit balance or otherwise maximise benefits by using multiple accounts to settle a transaction. The user is not limited to only "in-possession" credit cards and coupons, for example. In addition, the present invention will provide the ability to automatically activate new payment or award accounts (e.g., credit card or member loyalty accounts) if authorised to do so and necessary to obtain desired benefits.

A further advantage of the present invention is that only acceptable settlement options will be produced for use. For example, an American Express account will not be produced if the merchant does not accept such a payment method. In addition, the present invention will provide the ability to automatically activate a new acceptance account (e.g., credit card merchant account) if authorised to do so.

It should be understood that the present invention may be used, for example, whenever a consumer has the option of settling a transaction by utilising any payment method and related items of value (e.g., credit cards, debit cards, checks, discounts, coupons, awards) or performing actions to acquire benefits and the consumer desires to identify and rank specific payment and value identifiers, products, or other items according to their associated benefits.

Further Advantages of the Present Invention

With the present invention, one account and access mechanism (e.g., magnetic stripe card, smart card, personal digital device) gives consumers convenient access to all their payment, award, and loyalty accounts offering such practical improvements as a thinner physical wallet. Such convenient and universal access also can be employed as an authentication methodology to confirm the existence and validity of certain account elements for interactions between the user and other parties.

The present invention automatically reviews all available discounts, incentives, and awards from benefit suppliers that provide valuable offers. Another feature is the automatic selection of the appropriate payment or award accounts that will obtain the best or maximum user-preferred benefits. In addition, the present invention uses up-to-date incentives and awards since benefit suppliers may be reviewed in real-time and also requested to update and improve their benefit offers during actions and transactions.

A further feature is the automatic redemption of earned and saved discounts and awards eliminating the disadvantage of forgetting to use accrued points or airline miles. An additional feature is that the consumer may set benefit strategies to get only what they want such as, for example, to accumulate a maximum of 25,000 air miles and then get cash back awards. One more aspect is the ability to filter the advertising material consumers receive to reduce "offer overload" yet still be able to use all available offers when paying.

Another feature is that all account activity can be sent to a user's wireless device in real-time or delayed-time for notification and review to help reduce and eliminate fraud and identity theft.

A further aspect is the ability to use conventional payment-processing systems such as, for example the VisaNet credit card system, to enjoy the abilities made available by the present invention.

Supply and Acquisition Functions

Consumer benefits may include any conceivable value awards that may be introduced to the marketplace and are associated with an action or product involved in a consumer transaction. For example, benefits may consist of airline miles, bonus points, discounts, cashback rebates, baseball cards, or paper clips. Associations may consist of, for example, a 2% cash rebate linked with the use of a Discover credit card account, rental car collision insurance linked with an American Express credit card account further linked with the action of declining the optional insurance coverage when completing the rental agency forms, or receiving two free movie passes linked with completing a survey.

Award option supply functions may, for example, evaluate consumer demands and requests for benefits, create and configure award option structures, negotiate option parameter modifications, accept and deliver commitments for option offers involving such items as interest rates, delayed charges or billing dates, dollar or percentage off discounts, points, price-matches, random value grants, currency, etc., all as specified by benefit option suppliers in order to encourage consumer transactions and attract customer business.

Award option acquisition functions may, for example, discover award option items, compare option offers, negotiate option parameter modifications, rank, determine and select option offers according to consumer preferences and rule settings and then deliver appropriate payment and redemption accounts, or such relevant account objects and items, for use in actions and transactions.

Supply and acquisition functions consist of one or more stored or ad hoc actions, or combinations thereof. Supply and acquisition functions operate, at a minimum, with benefit option directives that also may provide arguments and conditional expressions that provide additional information for actions. Further arguments and conditional expressions, or modifications to operative arguments and conditional expressions, may occur on an ad hoc basis along with the inclusion of further actions.

User Communications

Both interactive and one-way messages may be transmitted for account owner use at the time of, or prior to, an action or transaction. Such information may be sent to an account owner's designated destination (e.g., Internet e-mail address, personal digital assistant, telephone number) for review or batch processing.

To accommodate the various forms or mechanisms of payment or settlement and the various payment, discount, or incentive option structures, the present invention incorporates messaging services in order to adapt to conventional payment and value exchange mechanisms, such as stored value cards or such devices, by notifying consumers of option offers requiring the use of such payment or redemption account mechanisms or performance of such actions that physically exist outside of the direct interaction and delivery by the present invention.

In addition, messaging services may provide the means for informing the consumer to execute certain actions such as, for example, declining the collision damage coverage on a rental car contract because the selected payment method automatically provides insurance that covers any such damage that may occur to the rental car.

It should be noted that such message notifications may be communicated to the account owner, merchant, and other parties as may be involved in a transaction.

As such, the system and process are adapted to allow conventional messaging services (e.g., Internet, wireless) to be utilised by consumers, merchants, and option suppliers before, during, or after an action or transaction thus allowing interactions, such as the review and modification of option offers and related information, to be performed by associated parties (FIG. 14).

Planned Transactions

The ability for consumers to pre-select options for use in a planned, but deferred, action, payment, or settlement is also contemplated. For example, a benefit option identifier may be obtained from an award supplier for two free movie passes valid for one year from the date of issue when the universal account owner completes a task such as, for example, answering questions in a marketing survey. In addition, the present invention may accommodate consumer preferences by committing to execute future actions in order to acquire current awards such as, for example, committing to use a particular Visa credit card account for the next three consumer purchases in order to receive two months of free Internet access with a current transaction.

Automatic Account Creation when Required to Obtain Benefits

In addition, the ability for the present invention to provide various transaction and consumer information to a benefit option supplier or payment/award issuer, as authorised by related parties, at the time of an action or transaction in order to obtain a benefit item is also contemplated. For example, an "Instant-In" account enrollment system and process would automatically and immediately enroll a universal account owner in a membership program by supplying approved owner information to the option supplier or payment/award issuer if such action was required to obtain beneficial option offers and if the owner permited such Instant-In functions. It should be noted that the "Instant-In" feature also is available for merchants to use in order to open new payment processing or incentive award accounts.

Involvement with other Parties

It is still another object of the present invention to enable conventional credit card transaction systems, payment and settlement processing systems, authentication systems, and incentive award processing systems and those employing other state-of-the-art communication systems, such as the Internet, to achieve, derive, and process data received at the point-of-sale, universal server central controller, or such other data site as may exist, during a transaction and to utilise that data to affect the transaction.

It is still a further object of the present invention to allow parties acquiring or possessing benefit options to redirect and transfer such options to other designated parties. It is contemplated that the present invention may operate in a peer-to-peer communication and processing arrangement such that groups of universal account owners may communicate between each other (e.g., wireless network connections) to exchange options according to preferences and needs. In such an embodiment, peer-to-peer exchanges involving the exchange of accrued or available option items among account owners will utilise self-contained universal server processing systems. For example, the present invention will exist in each exchange participant's connected (i.e., wired or wireless) portable or ultra mobile electronic device. The participant's self-contained universal account owner record may serve the functionality of a universal account database, merchant database, option supplier database, option structure database, and transaction database with all the functionality of the described supply and acquisition functions similarly operative in the devices with due regard to the peer-to-peer nature of the exchange environment. The application of the present invention with the use of peer-to-peer communications and processing arrangements will be readily understood by those skilled in the art of computers and telecommunications.

It is also contemplated that the present invention may be constructed in a master-subordinate account arrangement such that a subordinate member may be allowed access to the master member's payment or redemption accounts and acquired options, and such other relevant account items, along with any terms and conditions, and the master member may be allowed access to the subordinate member's payment or redemption accounts and acquired options, and such other relevant account items, along with any terms and conditions.

Application and Use of Benefits

It is yet a further object of the present invention to determine and satisfy benefit options on a post hoc basis involving delayed transaction settlements related to certain option structures that contain effective dates or survivorship conditions that extend beyond the original option item acquisition or original transaction settlement date.

It is another object of the present invention to allow multiple supply and acquisition functions to be executed to affect an action or transaction in multiple ways.

It is a further object of the present invention to cause multiple supply and acquisition functions to be executed in any order to realise combined effects.

It is yet another object of the present invention to allow anonymous transactions and to shield the identity of participants in a transaction as requested and accepted by associated parties.

The present invention achieves the aforementioned objects by providing systems and methods for establishing and executing appropriate system, supply, and acquisition functions adapted to affect supplied and acquired benefit options, determinations, selections, and consequent delivery of actions and related payment or redemption account identifiers, and such other relevant account items, transactions, and also user, consumer, merchant, award supplier, and payment and award issuer accounts. The use of supply and acquisition functions to trigger effects on transactions and accounts and, in particular, effects on incentive awards and, possibly, transaction amounts via conventional credit card transaction systems, payment and settlement processing systems, and incentive award processing systems will provide significant benefits to users, consumers, merchants, award suppliers, and payment and award issuers.

Consumers will be able to take advantage of better and easier-to-obtain benefit options before, during, and after the time of an action or transaction using the present invention. In addition, consumers also will benefit from establishing option preferences regarding the acquisition priorities of their most desired benefits. In particular, a consumer may utilise the present invention to plan an option acquisition strategy that allows multiple option item goals to be listed with associated priorities and conditions and then the option item goals would be appropriately cascaded and put into effect upon completion of a previous option item goal during the determination and selection of suitable options and the related delivery of payment or redemption accounts.

Transaction Management

It is yet another object of the present invention to provide a process for establishing and executing functions to create individual and aggregate transaction volume information including, for example, transaction amounts, option preferences, and consumer credit evaluations. For example, instead of a single consumer transaction acquiring a benefit, an aggregation of transactions may be offered to a financier to attract better benefits (e.g., lower interest rates) than any single transaction could obtain.

The consumer transaction (i.e., an individual transaction event) request includes such relevant transaction and processing information as, for example, the transaction identifier, universal account identifier, merchant identifier, and transaction amount. It is also contemplated that a consumer transaction request could originate from a consumer, option supplier, or payment/award issuer, such as MasterCard International Incorporated, with such appropriate and corresponding consumer, option supplier, or payment/award account identifier and transaction information. Thus, two universal account owners may be involved in an exchange transaction and thus, no merchant identifier would be present.

The universal transaction (i.e., an aggregation of consumer transactions) includes such relevant transaction and processing information as, for example, the universal transaction identifier, option preferences, supply and acquisition functions or function identifiers as derived from universal account and option structure database table records, and differentiated (e.g., classifications by preferences) and aggregate transaction volume data including such items as transaction amounts. The process also includes the step of processing the universal transaction in accordance with supply and acquisition functions, aggregation functions, and the selected option structures in order to affect the consumer transactions, universal transaction, related accounts, or any combination thereof.

The present invention additionally provides a system and method for establishing and executing system functions to create and aggregate universal transaction volumes from consumer transactions that includes a data processing system establishing universal transaction volume aggregation functions and universal transaction volumes, identifying a universal transaction volume having a universal transaction volume identifier, and a communication unit coupled to the data processing system. The communications unit receives requests and relevant information to process and instantiate universal transaction volumes, to include a predetermined number of consumer transactions or a number of consumer transactions over a predetermined period of time, from various points of origin such as, for example, point-of-sale workstations, credit card transaction systems, payment and settlement processing systems, incentive award processing systems, option supplier systems, universal server central controllers, or other transaction processing systems as may exist.

The requests may include such transaction and processing information as, for example, consumer transaction information, supply and acquisition functions or function identifiers, option supplier information, and option structures or identifiers. The data processing system establishes and executes universal transaction volume aggregation functions in accordance with such items as, for example, acquisition functions and related parameters and option structures in order to create differentiated and aggregate universal transaction volumes classified and identified by such information as preferred options, consumer credit evaluations, and transaction amounts.

Benefit-Driven Item Linkages and Services

The present invention also provides a process for processing consumer transactions such as, for example, point-of-sale transactions, that includes the steps of receiving transaction information including product identifiers related to goods and services (e.g., UPC and SKU product identifiers, product descriptions) involved with an action or transaction. The transaction information may include such items as, for example, a transaction identifier, a universal account identifier corresponding to a universal account, a transaction amount, and product or service identifiers. The method involves identifying and executing supply and acquisition functions corresponding to the product or service identifier that provide specific option offers.

The method also involves executing acquisition functions corresponding to the product or service identifier in order to acquire the option offer and to affect, possibly in an ad hoc or post hoc manner, the consumer transaction and related accounts, and possibly the transaction amount. For example, if a UPC product identifier is submitted along with the consumer transaction information, it may be reviewed for such incentive awards as manufacturer rebates or in-store discounts and if there are available rebates or discounts, the present invention will execute the related acquisition functions and option directives to acquire the rebates or discounts for the universal account owner, and possibly affect the transaction. It is also contemplated that such acquisition functions may be performed in advance of a purchase transaction. For example, digital coupon codes could be accrued into a member's universal account for later use.

It is also contemplated that such product identifiers may be determined and utilised on a post hoc basis involving delayed transaction settlements related to certain option structures that contain effective dates or survivorship conditions that extend beyond the original option item acquisition or original transaction settlement date such as price-matching options. It is further contemplated that benefit rankings that are linked to goods or services may operate to direct consumers to particular actual or virtual locations which may provide preferred benefits.

The present invention furthermore provides an activity statement issued by a universal server processing system, a payment and settlement processing system, or an incentive award processing system or such transaction activity system as may exist to a universal account owner that includes such items as a transaction section for indicating transaction details related to a consumer transaction involving a universal account owned by a universal account owner, an account detail section for indicating account details related to the universal account, and a message section including an indication of benefit options or option identifiers either used or available for use by the universal account owner. The option identifiers are adapted for use by the universal account owner to cause a payment and settlement processing system, or an incentive award processing system, to affect a future transaction in which the universal account owner may use their universal account.

Further Invention Objectives and Operations

It is therefore the object of the present invention to provide a system and process for maximising consumer benefit value according to consumer preferences. This will be accomplished by obtaining incentives and awards through establishing and executing payment, discount, and incentive supply functions and payment, discount, and incentive acquisition functions. Such functions will produce, identify, compare, determine, and select available and preferred benefit incentives and awards and then automatically determine appropriate actions and payment and redemption accounts for use to acquire and utilise said incentives and awards.

The present invention also is advantageous in that it may produce relevant items of said determined payment and redemption accounts for delivery to related parties in a transaction. As a consequence of obtaining incentives and awards, good and valuable consideration is delivered to a creditor or multiple creditors, or an exchange partner or multiple exchange partners, thus affecting and concluding a transaction and also affecting user, consumer, merchant, award supplier, and payment and award issuer accounts.

Value to the Consumers

The present invention enables consumers to request, review, select, publish, and establish, for example, incentive award proposals, decision factors, requirements, conditions, and priorities related to option preferences, and to establish rule settings and benefit decision policy tactics and long-term acquisition strategy formulations, and to identify, compare, rank, negotiate, determine, select, acquire, and utilise available and preferred option items and, consequently, to produce actions and related payment or redemption accounts, and such other relevant account items, for delivery to related parties in a transaction all of which accommodates the consumer's option preferences and rule settings and as part of the acquisition formulations on a strategic, ad hoc, or post hoc basis.

Value to the Benefit Suppliers

The present invention enables option suppliers to request, review, select, publish, and establish, for example, incentive award proposals, decision factors, requirements, conditions, and priorities related to option offers, and to establish rule settings and benefit decision policy tactics and long-term supply strategy formulations, and to produce, compare, negotiate, determine, commit, and provide option items and, consequently, to issue the proceeds of the option offers to related payment or collection accounts for utilisation by the account owner in a transaction, all of which accommodates the option supplier's option offers and rule settings and as part of the supply formulations on a strategic, ad hoc, or post hoc basis.

Extended Benefit Options

It is also contemplated that options and related conditions may be determined and utilised on a post hoc basis involving delayed transaction settlements related to certain option structures which contain effective dates or survivorship conditions that extend beyond the original option item acquisition or original transaction settlement date. For example, some option structures may provide for product price-matching contingencies that require a transaction's original merchant to return a dollar amount to the consumer if an original purchase item is offered for sale by another qualified merchant at a lower price within a certain number of days after the original purchase transaction date. The present invention may monitor such price schedules and execute a post hoc option structure action to satisfy the agreed terms.

Terms and Conditions of Benefits

Each benefit option offer consists of a master option structure comprising multiple components. These include, for example, an option identifier, option description, option award item or items, option award directives, and an option supplier. The option identifier is an identification code assigned to an option structure for reference purposes. The option description provides descriptive text explaining the option structure. The option award item section details the benefit elements that are included in an offer (e.g., interest rates, airline miles). The option award directive section includes the specific terms, conditions, requirements, metrics, and provisions associated with the supply or acquisition of the option items that must be applied to a transaction and the related parties before the option items may be issued to a recipient. For example, terms and conditions may stipulate that the option items are available only between certain dates. The option supplier may be a person or entity, or combination of such, that establishes a commitment to provide option items that may be supplied, acquired, and exchanged among parties according to option directives. It should be understood that option structures are interrelated with supply and acquisition functions during the processing of transactions.

Supply and Acquisition Function Elements

Supply and acquisition functions consist of one or more stored or ad hoc actions, or combinations thereof. Supply and acquisition functions operate, at a minimum, with option directives that also may provide arguments and conditional expressions which provide additional information for actions. Further arguments and conditional expressions, or modifications to operative arguments and conditional expressions, may occur on an ad hoc basis along with the inclusion of further actions.

Processing Operations

As applied in the present invention, a master option structure may be stored in a database table or memory and the option structure is usually created, maintained, and modified by various parties such as, for example, option suppliers. Included in the option structure may be a supply function operation which incorporates the option directives in order to establish an option offer. An ad hoc supply function may be created according to new option structure parameters, but an ad hoc supply function may also be established based on a stored supply function and master option structure with appropriate modifications made to the stored option directive parameters in order to accommodate the prevailing requirements at a particular moment in time (e.g., an airline mile award issuer may want to keep all conditions of a stored supply function intact except to increase the mileage metric from 2.0 to 3.25 miles per transaction dollar for one particular transaction at one moment in time). A post hoc supply function operation is usually stored in a database table along with an option structure that includes option directive parameters related to legacy conditions applicable to transactions that have occurred in the past (e.g., a merchant's offer to match any competing merchant's lower product price for thirty days from the original product purchase date).

An example of a supply function operation may include an option structure with such option directives as: Hilton Hotels will provide triple HHonors points and double airline award miles when the universal owner's account provides payment using an American Express card account to charge one Double Dip stay between 15 Nov. 2000 and 28 Feb. 2001 at any Hilton HHonors hotels in the State of Washington and thereafter during the promotion period at any HHonors hotel worldwide. To receive the award, the universal account owner must have an American Express credit card account and a Hilton HHonors award account. To enroll for a Hilton HHonors award account, the universal account owner must be at least 18 years of age and provide a name, address, telephone number, e-mail address, and preferred airline used for business travel. If the universal account owner does not already have a Hilton HHonors award account and they allow immediate signup for an award account and they are approved, the universal account owner will receive 1,000 HHonors bonus points.

It should be understood that a computer program may be compiled to address all the various actions of the above supply function operation and a data processing system may activate and execute said program when, for example, a travel agent submits a universal account owner's account identifier as payment for Hilton hotel accommodations or when a universal account owner reviews the various option offers available for selection in the universal server's option structure database (FIG. 2 reference numeral 280). The operations, processing, and logic of said computer program will be readily apparent to those skilled in the art of computer programming and database management system programming.

As applied in the present invention, acquisition functions are generally created from universal account owner database table records, but ad hoc creations may also exist. A universal account record may be stored in a database table or memory and the account items are usually created, maintained, and modified by various parties such as, for example, the account owner. Included in the account record may be preferred option items along with rules and accrued option items. An acquisition function may incorporate any or all account items in order to establish which option offers to acquire. An ad hoc acquisition function may be created according to new account record parameters, but an ad hoc acquisition function may also be based on a stored account record with appropriate modifications made to the stored preferences, rules, and accrued option items in order to accommodate the prevailing conditions at a particular moment in time (e.g., an airline mile award issuer may want to know the account owner's favourite business airline before increasing the mileage metric from 2.0 to 3.25 miles per transaction dollar for one particular transaction at one moment in time). A post hoc acquisition function link is usually stored in the account owner's record with an appropriate linkage identifier to an option structure database table record that will provide option directive parameters related to legacy conditions applicable to transactions that have occurred in the past (e.g., a merchant's offer to match any competing merchant's lower product price for thirty days from the original product purchase date).

An example of an acquisition function may include a universal account owner record with such preferences, rules, and accrued option items as: Universal account owner Gregory Fxi seeks to obtain 25,000 frequent flier airline miles redeemable at Delta Airlines during 1 Jan. 2001 and 30 Jun. 2001 from option suppliers providing the highest airline mile option offer per transaction dollar during the acquisition period and for such offer the universal account owner will commit to use, or make effort to open an option supplier's preferred payment or incentive collection account. The universal account owner will provide only the following information to open such preferred payment or incentive collection account: account owner name, address, telephone number, fax number, e-mail address, gender, date of birth, social security number, annual income, years at current residence, favourite sport, favourite hobby.

It should be understood that a computer program may be compiled to address all the various actions of the above acquisition function and a data processing system may activate and execute said program when, for example, a universal account owner delivers their universal account identifier to a travel agent as payment for hotel accommodations or when a universal account owner selects an option offer available in the universal server's option structure database (FIG. 2 reference numeral 280) or when modifications are made to the universal account preferences, rules, or accrued option items (FIG. 4 reference numerals 425, 445, and 455 respectively). The operations, processing, and logic of said computer program will be readily apparent to those skilled in the art of computer programming and database management system programming.

To continue with the above example, the consumer prefers to obtain 25,000 frequent flyer airline miles that will be accepted by Delta Airlines for a free domestic travel ticket and designates this as the highest priority item. The consumer establishes such option preferences and priorities in their universal account. The consumer also establishes a rule setting specifying that the acquisition of said airline miles is to begin on 1 Jan. 2001 and is to terminate at the end of 30 Jun. 2001. For this example, the consumer has decided that if the goal of 25,000 miles is not achieved by 30 Jun. 2001, no further efforts to acquire airline mile options should be made and other preferred option items with next-in-line priority, for example the acquisition of cash-back incentives, should be advanced for processing. In addition, the consumer has authorised the automatic application for a payment or incentive collection account as may be needed to acquire the best airline mile option offers. Account limitations have been set as to what owner information will be provided in order to open a new payment or incentive collection account. It should be noted that if during a transaction that no airline mile offers are available, the next-in-line priority item would automatically be advanced for processing, as will the other preferences, in a cascading manner. This listing of preferences not only benefits consumers since it finds options specifically targeting what is wanted by the consumer in a priority order, and optionally during a specific time frame, but also benefits option suppliers since they may better understand what is required to attract the consumer's business. In addition, the establishment of preferences and optional time frames may rearrange the concept and use of expiration dates such that instead of option suppliers stating when an option item is no longer useful to the marketplace the situation will become one in which consumers decide when option items are no longer useful to them.

When the above consumer initiates, for example, a shopping event, the consumer may select several products to purchase from a merchant and then deliver their universal card (i.e., one representation of the present invention) when requested to make payment. In a unique and novel approach, the use of a universal card (i.e., universal account identifier) will not only provide convenient access to all the consumer's payment and redemption accounts and such provisional shell accounts as may be automatically established, but also, and more importantly, it will provide access to their option preferences, rule settings, accrued option items, and benefit decision policy tactics and long-term acquisition strategy formulations as well as enable an easy, convenient, and effective means to establish and execute option supply and acquisition functions in order to acquire incentives and awards and then guide their actions and settle the merchant's payment request by selecting and delivering the appropriate payment and redemption accounts.

By employing the universal server system (i.e., the present invention), the consumer is not required, for example, to remember their preferred option items; physically carry all of their credit cards or such material identifiers; manually discover, compare, negotiate, determine, rank, select and deliver the preferred option item's particular credit card for use at the time of the purchase; or, be concerned with the limited payment methods a merchant may accept (e.g., the National Football League Internet World Wide Web site at http://NFL.com will accept the Visa credit card but will not accept the American Express credit card).

To continue the example, the merchant then processes the cardholder's universal account identifier through a conventional point-of-sale workstation or terminal device which is configured to transmit transaction information such as the transaction identifier, universal account identifier, merchant identifier, amount of the transaction, etc., to the universal card issuer or a universal server either directly through a network connection or indirectly through a payment processing service. It is also contemplated that the consumer may input and be presented with transaction data and optional data input requests using portable and ultra mobile electronic devices (e.g., RIM Blackberry) that allow entry, notifications, and interactions during a transaction by means of messaging using wired, wireless, or other state-of-the-art communication systems. Messages may be transmitted for account owner use at the time of a transaction or such information may be sent to an account owner's designated destination (e.g., Internet e-mail address) for later review or batch processing.

To go on with the example, the universal card issuer or universal server receives the transaction information and identifies the universal cardholder and merchant. The universal server processing system establishes and executes appropriate system and supply and acquisition functions, for example, to: (a) retrieve the universal cardholder's information including option preferences, rule settings, accrued option items, and benefit decision policy tactics and long-term acquisition strategy formulations, (b) retrieve the merchant's information including accepted forms of payment, (c) aggregate individual and multiple universal cardholder transactions and classify them by preferences, (d) compare the universal cardholder's option preferences to a collection of option items and select suitable option offers, (e) retrieve option structure information and the associated option supplier information, (f) compare suitable option offers and calculate and produce ranking values based on established value standards, (g) expose, solicit and negotiate enhanced or competitive option offers from option suppliers for the individual and aggregate transaction amounts, (h) select the most advantageous option offers according to preferences, rule settings, and ranking values and identify associated merchant payment and award processing accounts and consumer payment and redemption accounts, (i) determine that the merchant either has existing, or may obtain, such associated payment and award processing accounts, j) determine that the universal cardholder either has existing, or may obtain, such associated payment and redemption accounts, (k) select the universal cardholder's associated payment and redemption accounts that are acceptable by the merchant, (l) provide messaging services to the universal cardholder involving notification of and interaction with the option offers, and (m) transmit or otherwise deliver the universal cardholder's associated payment and redemption account identifier, or multiple account identifiers, and such other relevant account items, to the appropriate conventional payment and settlement processing systems and merchant. It is contemplated that the acquisition of the associated option items may be accomplished either using the conventional payment and settlement processing systems or conventional incentive award processing systems. It is also contemplated that the present invention may acquire, accrue, and utilise option items in a universal account owner's database table structure.

Consolidated Accounts and Multiple Account Usage

It is further contemplated that more than one of the universal cardholder's payment or redemption accounts may be selected for use in order to settle one consumer transaction. For example, both a MasterCard account and a Visa account could be used simultaneously to complete one payment transaction if one credit card provided the best incentives and awards but had an insufficient balance of funds available to fully satisfy the required transaction amount. It is additionally contemplated to provide a system and method to coordinate multiple payment/award issuer or option supplier authorisation codes and transmit or otherwise deliver a single authorisation code and relevant transaction information to the originating merchant and related parties for use by conventional processing systems.

To carry on the example, it may be that the universal server processing system determines that the best available option structure requires the use of the buyer's MasterCard credit card account and the best offer will provide 2.35 frequent flier airline miles for every dollar of the transaction amount. This payment account was determined and selected after performing applicable supply and acquisition functions and reviewing available option offers with the buyer's existing American Express, Delta SkyMiles, Aria Visa, Discover Card, and a provisional shell Fleet Visa account. The selected MasterCard payment account identifier, and such other relevant account items, is transmitted to the conventional payment and settlement processing systems along with other related transaction information. If the universal cardholder's MasterCard account is in a state that is sufficient to accept charges contemplated by the transaction, the MasterCard credit card issuer will authorise the transaction by generating and transmitting an authorisation code to the merchant and possibly to the universal server processing system.

To complete the example, if the cardholder's MasterCard account cannot accept the charges, the universal server processing system would be notified and the process of finding another payment or redemption account, and such other relevant account items, to attempt to acquire the option items and settle the transaction would be re-initiated along with either modifying or eliminating the currently selected payment or redemption account's availability status. For example, if the MasterCard account could accept a portion of the transaction amount for the best option offers, then such portion amount would be assigned to the MasterCard account and the balance of the transaction amount would be assigned to another payment or redemption account that was involved with either the same or the next best option offer, thus cascading payment amounts until the total transaction amount was settled. In this manner, a consumer could use their entire credit limit to maximise option benefits instead of foregoing the use of a credit card having a $75.00 available balance during a $100.00 transaction. It is also contemplated to incorporate real-time data access that will enable determination of the associated payment or redemption account status as being sufficient to accept contemplated charges prior to transmitting the payment or redemption account and transaction information to the conventional payment and settlement processing systems.

Provisional Use Accounts

It is also contemplated that in addition to having pre-established payment or redemption accounts, a universal account also may have provisional payment or redemption shell accounts available for immediate activation. A provisional shell account would consist of information such as a payment or award issuer and a status code or identifier code pre-qualifying the universal account owner to obtain a payment or award account, such as a Fleet Visa credit card account. No actual credit card account would exist until such time as an advantageous option offer required the use of such a payment or award account. At such an advantageous time when the Fleet Visa account may be used to acquire the best option items, the pre-qualification information would be transmitted to Fleet in order to immediately create and activate a Visa credit card account for the universal account owner. Upon activation, Fleet would transmit a payment account identifier, and such other relevant account items, for use by the universal account owner and, consequently, by the universal server processing system and the related transaction in order to acquire the best option offers. Such an arrangement would be similar for merchant processing provisional shell accounts.

While the above example uses a consumer's available credit card accounts, it is additionally contemplated that supply and acquisition functions may involve any acceptable form or mechanism of payment or settlement such as credit card accounts, debit card accounts, stored value cards or such devices, smart electronic cards or such devices, member loyalty accounts, purchase cards and accounts, incentive redemption accounts, discount coupons or identifier codes, benefit access codes and related accounts, electronic transfer accounts, investment and bank accounts, ACH (Automated Clearing House) system accounts, Internet checks and accounts, digital currency (e.g., beenz, Cybergold), liens, currency, personal service time, property service time, telephone or utility accounts, equity loan accounts, tax accounts, etc. with which benefit options and linked payments and value exchanges can be integrated. It is just as possible that the previous example may have been satisfied by an amount charged to a wireless cellular telephone account or by the use of a stored value card rather than by the buyer's MasterCard credit card account. It is also contemplated that users may deliver and exchange commitments for personal service time (e.g., time to perform gardening, carpentry, or dance lesson services) or property service time (e.g., time to use an automobile, a computer, or a ladder) as an acceptable form or mechanism of payment, settlement, incentive, or award.

Benefit Marketing Considerations

By employing the present invention, benefit option suppliers do not need to rely on conventional advertising programs, such as television and newspaper ads, since they can interact directly with consumer transactions. For example, option suppliers may vigorously compete with other option suppliers on a real time basis at critical opportunities during the lifetime of a transaction such as when consumers are preparing to initiate a transaction, consummate a purchase, payment, or transaction, and especially when buyers select and authorise the submission of a payment or redemption account identifier, or multiple payment or redemption account identifiers, and such other relevant account items, to settle a purchase, payment, or transaction.

The option supplier's advertising funds could be channeled into enhancing and extending their available option offers because of the present invention's ability to allow option suppliers to target and fine-tune their marketing and competitive strategies directly at the critical point-of-payment or point-of-settlement timeframe, and, in particular, to specific consumer option preferences. In addition, should option suppliers direct less funds into their conventional advertising campaigns and more resources into their universal transaction option offer campaigns, the consumer would realise even greater benefits from the present invention. More importantly, consumers are not bothered with searching for the "best" historical option offers from option suppliers and then remembering all of the required terms and conditions.

Further Advantages of the Invention

It is further contemplated that the present invention will be useful in obviating discriminatory practices that may deny or restrain certain consumers from having open access to, or knowledge of, available payment accounts, incentives, and awards. In addition, the present invention may facilitate the assurance of consumers receiving their due benefits such as, for example, senior citizens being allowed all associated entitlements and discounts.

It is also contemplated that the present invention may provide for a reduction or elimination of incentive and award application errors since incentive and award offers would be instantiated in real-time thus avoiding any errors that could result from point-of-sale workstations such as, for example, pricing errors that occur at merchant check-out scanner terminals. Such improvements will avail consumers of a more accurate application of incentives and awards.

It should be understood that the present invention not only incorporates any standard incentives and awards associated with, for example, a credit card account (e.g., Aria Visa Portrait credit card), but also allows account owners to achieve non-uniform account classification incentive and award offers based on such items as, for example, inclusion in a universal transaction volume, efforts by merchants to attract consumer business, and efforts by payment and award issuers to attract customer business.

Enhancements to Transaction Processing

The present invention changes the conventional payment and settlement processing environment from one in which all payment or redemption account identifiers are required to be placed in front of the merchant to a system and process in which the payment or redemption account identifiers may be located dynamically "behind" the transaction's front-end or point-of-sale workstation and are contained within the processing network system thus making the option structures and payment or redemption accounts, and such other relevant account items, available to consumers, merchants, and option suppliers at all transaction times and, consequently, yield the greatest benefits to consumers.

It is also contemplated that option suppliers may be allowed to input a payment, or execute some form of direct value deposit, into a consumer's liability or debt accounts using the present invention. For example, an option supplier may provide an incentive award whereby twenty-five cents will be applied to the consumer's cable television account for every large-sized coffee purchased at Dunkin' Donuts by the consumer. In addition, the value depository arrangements may extend to constructions that include mechanisms such as, for example, holding or storage accounts involving, for example, music merchandising whereby a song or a portion of an album (e.g., thirty seconds of audio and/or video) would be deposited in a consumer's e-mail account for every $10.00 purchase of gasoline at a Mobil petrol station.

The present invention also uses and enhances the existing relationships between the consumer, merchant, award suppliers, and payment and award issuers, providing benefits to all related parties. The consumer benefits by easily, conveniently, and effectively obtaining benefits they seek which increases the value of not only their purchases but also the associated payment and settlement activities. The option suppliers benefit by having an opportunity to interact with buyers at critical opportunities during the lifetime of a transaction such as when payment mechanisms are being determined, selected, and delivered and by enjoying the ability to offer preferred and superior incentive awards to the consumer that will enhance the possibility of attracting customer business. The merchants benefit since the consumer will be able to obtain such incentive awards as, for example, discounts, rebates, frequent flier airline miles from option suppliers, possibly including the merchant, which will yield extra value and possibly lower product prices to the consumer thus encouraging and assisting in the sale of additional goods or services.

It should be understood that, depending on context and situation, consumers and merchants may act like option suppliers, merchants may act like consumers, consumers may act like merchants, or any combination of entities and roles is possible.

It is another object of the present invention to allow consumers to use and access the benefits of the universal server processing system and related options with conventional, easy-to-use, and familiar equipment and communication mediums as well as simplified user training and system instruction requirements.

It is yet another object of the present invention to permit consumers, merchants, award suppliers, and payment and award issuers to make the most of conventional credit card transaction systems, payment and settlement processing systems, and incentive award processing systems and functions through the use of corresponding transaction and incentive award identifiers which may easily identify payment or redemption account identifiers to be used during payment, settlement, or exchange requests to affect transactions and related accounts.

It is still a further object of the present invention to provide a process for allowing benefit option structures to be established by any party wanting to provide option structures that may be utilised by consumers, merchants, award suppliers, payment and settlement processors, and payment and award issuers utilising conventional credit card transaction systems, payment and settlement processing systems, and incentive award processing systems, and other communication systems.

It is still another object of the present invention to allow option suppliers to provide option structures that are acquired from other option suppliers, consumers, or other sources.

It is yet a further object of the present invention to provide a process for allowing supply functions to be established and executed by users, consumers, merchants, award suppliers, payment and settlement processors, and payment and award issuers utilising conventional credit card transaction systems, payment and settlement processing systems, and incentive award processing systems, and other communication systems.

It is still a further object of the present invention to provide a process for allowing acquisition functions to be established and executed by consumers, merchants, award suppliers, payment and settlement processors, and payment and award issuers utilising conventional credit card transaction systems, payment and settlement processing systems, and incentive award processing systems, and other communication systems.

It is still another object of the present invention to implement actions that avoid disincentives and penalties such as, for example, making a payment from a certificate of deposit account that has not matured and thus would incur an early withdrawal penalty charge if the account was used to make a payment. Although, if an account owner stipulates to "always make payment to avoid interest charges over 12% APR," then the certificate of deposit may be used to accommodate the account owner's instructions in a particular transaction where such conditions may occur and no other alternatives exist.

It is yet another object of the present invention to allow merchants that accept option items and consumers using option items to enjoy added benefits associated with establishing and executing supply and acquisition functions that not only enhance the utility of payment, settlement, and incentive functions and methods, but also promote the supply and acquisition of option items along with the commensurate utilisation of the corresponding benefits.

It should be noted that the present invention contemplates some type of user-paid subscription and transaction service to pay the costs of operations, but alternate arrangements are certainly possible.

It is still a further object of the present invention to make incentives, awards, and payments adapt to people, instead of the other way around, and to integrate them into our transaction surroundings so we may take advantage of their economic power and satisfaction without really thinking about them.

It should be understood that the present invention may receive and deliver information either between users and centralised sites in a client/server arrangement, or directly between users and users or centralised sites and centralised sites in a peer-to-peer arrangement, or any combination thereof.

In addition, the present invention will put in place indispensable incentive award standards that will permit the fair valuation of awards regardless of the commodities involved and allow consumers to enjoy an open exchange of incentives and awards that allow consumers to acquire incentives and awards most useful to them based on their lifestyle and objectives. Incentives and awards are valuable assets either available to a consumer or possessed by a customer. As such, incentives and awards require appropriate security and asset management in the same fashion as does a consumer's cash (i.e., able to be readily accessed and delivered, able to be deposited and tracked in a bank account). Incentives and awards are similar to cash in that a $1.00 manufacturer's coupon presented to a cashier during checkout is accepted as settlement of a transaction just as readily as a $1.00 Federal Reserve note. The security issue also relates to asset management. Consumers need to be able to track their awards along with such sensitive personal information as the corresponding reason why they received the awards (i.e., consumer profiling). Asset management also is a significant issue in determining a consumer's return on investment (ROI) when contemplating the use of the present invention. The present invention contemplates such issues along with the use of state-of-the-art software, hardware, and communication systems to address such needs and concerns.

Further Efforts of the Invention

A further advantage is that composite acquisitions may be established and employed. A cascading option acquisition strategy may be, for example, that a universal account owner first seeks to obtain 25,000 frequent flyer airline miles for a free domestic travel ticket. After accumulating the desired airlines miles, the account owner then seeks to acquire incentive awards to reduce or eliminate the cost of a rental car for a weekend time period. After satisfying these top priority preferences, the account owner then indicates that all other transactions should obtain the maximum number of reward points acceptable by Barnes and Noble booksellers. It is also contemplated that the present invention would provide system defaults for account owners not selecting any preferences as well as providing combination preference packages. For example, selecting a combination preference package, such as a "Disney World Florida vacation for two," may seek to obtain any and all benefits applicable for such a vacation trip extending from the acquisition of frequent flier airline miles for free travel tickets to discount and upgrade awards for car rentals and lodging.

Furthermore, as the systems and processes of the present invention may be effectively coupled with the use of conventional forms and mechanisms of payment or settlement such as, for example, credit cards and debit cards, consumers will not be hindered by such matters as special credit card or payment account application forms, rebate forms, coupons, certificates, remembering various awards to obtain or in what amounts, or the physical delivery of the appropriate payment or redemption accounts, and such other relevant account items, at the time of a transaction in order to acquire the preferred options associated with their established option acquisition strategy.

It should be noted that the present invention is based on conventional technologies used in a unique and unobvious manner in order to allow consumers to realise their economic and personal goals of getting the most benefit from every transaction exchange or dollar they spend.

Loyalty Enhancements

The present invention also benefits merchants by enabling them to offer option structures that may be coupled with various business partner option structures. Merchant loyalty programs that use the present invention can be established to enhance conventional loyalty programs whereby a merchant adds incremental option items and metrics (i.e., competitive fine-tuning) to a customer's purchase if a particular payment or redemption account, and such other relevant account items, is delivered as payment.

For example, Barnes and Noble booksellers may establish an option structure that will add 0.75 frequent flier airline miles for every transaction dollar if the customer's universal account selects and delivers a Discover credit card to pay for a purchase amount. The Barnes and Noble airline mile offer would be in addition to any airline mile award metric already provided by the Discover card. With such a dynamic and integrated option structure arrangement, Barnes and Noble may be able to obtain lower transaction processing costs from Discover Financial Services if Barnes and Noble produces a higher number of paid transactions using a Discover credit card.

It is also contemplated that option suppliers and payment and award issuers may establish similar conditional arrangements with a selected community of merchants or others (e.g., a loyalty membership account with Shaw's Markets also would provide benefits at a Supreme Dry Cleaners shop and a Pets About You store).

It is further contemplated that options can include both interrelated and disparate option combinations from multiple option suppliers. For example, Barnes and Noble may provide free shipping by United Parcel Service on orders over $50.00 when paid with a MasterCard. With regard to such a free shipping opportunity, the present invention may process a $100.00 Barnes and Noble transaction by charging $51.00 to a universal account's MasterCard account in order to acquire the free shipping and then charge the remaining $49.00 to a Visa account offering two-for-one airline miles in order to maximise value for the universal account owner.

Another example may be that Barnes and Noble transactions may provide a 50% discount award applied to the purchase of a Sears extended appliance warranty with the use of a Visa payment account. One more example would be the elimination of an $18.00 annual MasterCard account membership fee by using a universal account's MasterCard credit card account at least once during the calendar year.

It is also contemplated that options may provide incentive awards based on certain usage dates, such as birthday or anniversary dates, or charitable concerns (e.g., FTD Florists agreeing to donate $1.00 to cancer research in the name of the universal account owner for every order placed between 10 February and 13 February and paid with an American Express account) as well as random assignments of incentive awards based on chance, fortune, or lottery action (e.g., the $500^{th}$ daily transaction at the Internet World Wide Web site of Amazon.com receives a $25.00 unrestricted gift award). In addition, a user could indicate an objective of opening an equity trading account and engage the present invention to monitor and expose that E*Trade offers a $50 incentive for opening a new account and then cause a notification or automatic application to be executed to acquire the $50 benefit.

Benefit Supplier and Merchant Advantages

In addition, option suppliers and payment/award issuers may utilise such systems and processes to create attractive option structures that encourage consumers to use their payment accounts, and thereby increase consumer purchases and related payment processing fees and finance charges. This would effectively increase potential transaction processing fees for the transaction processors and payment providers. It is also contemplated that option structures may employ methods that would serve to reduce the price of goods or services and thus reduce the transaction amount and thereby reduce the consumer's current expenditures and allow the savings to be used for additional purchases. It should also be noted that the acquisition of options by the universal account owner would provide benefits and discounts in future transactions and thus encourage account owners to redeem their available option values by engaging in activities such as additional shopping events. Moreover, option suppliers and payment/award issuers can utilise the systems and processes provided by the present invention to competitively encourage consumers to select the option supplier's offers and then settle transactions using the associated payment or redemption accounts in order for the universal account owners to acquire the incentive awards.

Accordingly, consumers will be more likely to utilise options provided by the present invention since obtaining an option is more convenient, it is less time consuming, and, in particular, it strives to acquire the most preferred and advantageous option items available for the consumer. Option suppliers also have the ability to fine-tune their option structures and metrics. For example, an option supplier may offer 1.71 airline miles per transaction dollar to exceed a competitor's offer of 1.70 airline miles per dollar instead of relying on historically static award rates of one airline mile per dollar and thus miss obtaining the consumer's business. The present invention will assist option suppliers in dynamically adjusting their option structures to achieve equilibrium with the competitive marketplace forces and also permit adjustments based on an option supplier's marginal propensity to acquire consumer transactions if there became a disproportionate consumer demand to obtain the available options compared to anticipated marketing and business projections, or conversely, if there was insufficient consumer demand and demand had to be nurtured to correlate with marketing and business projections.

Therefore, the present invention makes available to benefit suppliers the unique and novel ability to create dynamic option structures using systems and processes that provide option suppliers and payment/award issuers with mechanisms for accomplishing both their incentive award and business goals in a controlled and adjustable environment heretofore unavailable and unknown.

The present invention also provides a method for processing a consumer transaction, such as a point-of-sale, payment, or exchange transaction, that includes the steps of receiving transaction information including, for example, a transaction identifier, a universal account identifier corresponding to a universal account issued by a universal account issuer, a merchant account identifier corresponding to a merchant account, and a transaction amount, transmitting the transaction information from the point-of-sale workstation to the universal account issuer and/or universal server central controller and, determining if the universal account is associated with acquisition functions that correspond to actions to be executed by the universal server central controller to affect the transaction, and possibly the transaction amount. The acquisition functions may have corresponding acquisition function identifiers.

The present invention in addition provides a system for processing a consumer transaction, such as a point-of-sale, payment, or exchange transaction, that includes a communication unit receiving transaction data from other payment and settlement processing systems. The transaction information includes such relevant transaction information as, for example, a universal account identifier corresponding to a universal account and a transaction amount. The system also includes a data processing system identifying acquisition functions associated with the universal account or account identifier and performing the acquisition functions to affect the transaction and the related accounts, and possibly the transaction amount.

It is also contemplated that a system according to the present invention could receive consumer and universal transaction requests and related information from option suppliers and payment and award issuers such as a MasterCard credit card issuer submitting transactions to the present invention on behalf of their cardholders who indicate to the MasterCard issuer that they have, or desire to have, access to a universal server processing system, and such corresponding universal accounts, for the ability to reference and utilise option structures as part of a third-party option structure discovery and acquisition strategy.

Aggregate Transaction Processing

The present invention in addition provides a system and method for establishing and executing supply and acquisition functions to affect a universal transaction volume that includes a data processing system identifying a universal transaction volume having a universal transaction volume identifier and option supplier accounts having option supplier account identifiers and option structures having option structure identifiers and establishing supply and acquisition functions having function identifiers, and a communication unit coupled to the data processing system. The data processing system retrieves, analyses, exposes, solicits, negotiates, and compares available and appropriate option structures according to universal account preferences, rule settings, and acquisition functions in order to produce a ranking value. The communications unit transmits and receives universal transaction volume information and option structure information between universal server processing systems, option suppliers, paymen/award issuers, and universal account owners. The data processing system executes existing or modified supply and acquisition functions and related option directives to affect the universal transaction volumes. It is also contemplated that one universal server processing system's universal transaction volume may be submitted to another universal server processing system and considered and acted upon as a consumer transaction.

The present invention also provides a method for establishing and processing existing and modified option structures from option suppliers during universal transactions that includes the steps of exposing and transmitting option negotiation requests during universal transactions. The universal transaction option negotiation requests include such relevant transaction and processing information as, for example, a universal transaction volume identifier corresponding to the universal transaction volume, differentiated and aggregate transaction information and amounts, and associated and prevailing option structures. The method also involves processing the universal transaction option negotiation requests by affecting the universal transaction volumes based on such items as, for example, option directives and metrics and in accordance with all other option structures along with universal account preferences, rules, and accrued option items.

The present invention in addition provides a process for establishing and executing supply and acquisition functions adapted to be processed during universal transactions involving payment or redemption accounts, and such other relevant account items, and option structures that include the steps of identifying universal transaction volumes having universal transaction volume identifiers and establishing supply and acquisition functions to correspond to a universal transaction. The supply and acquisition functions may have corresponding function identifiers. The process also involves transmitting a universal transaction settlement request from a universal server processing system. The universal transaction settlement request includes such relevant transaction and processing information as, for example, the universal transaction volume identifier, differentiated and aggregate transaction information and amounts, and supply and acquisition functions or function identifiers. The process also involves transmitting to option suppliers various universal transaction volume status information and requests to guarantee and commit option structures, and receiving from option suppliers the results of guaranteed and committed option structures. The process also involves processing the universal transaction volume in accordance with option structures, and particularly option directives, universal account preferences, rules, and accrued option items in order to affect the universal transaction and, consequently, the associated consumer transactions and related accounts.

The present invention additionally provides a system for establishing and executing messaging functions to inform and interact with a universal account owner and possibly affect a transaction that includes a data processing system identifying a universal account owner having an account identifier and establishing and executing messaging functions, and a communication unit coupled to the data processing system. The communications unit transmits to a universal account owner various transaction status information along with options and methods to modify automatic and provisional use determinations related to the acquisition of option structures and the use of payment or redemption accounts, and such other relevant account items. The communications unit receives from said universal account owner the results of any options, methods, or instructions to modify provisional use determinations related to the acquisition of option structures and the use of payment or redemption accounts, and such other relevant account items. The messaging functions include such relevant transaction and processing information as, for example, a universal account identifier and account information, merchant account identifier and account information, consumer transaction identifier, universal transaction identifier, automatic and provisional use payment or redemption accounts and account information, automatic and provisional use option structures, differentiated and aggregate transaction information, and supply and acquisition functions or function identifiers. The data processing system processes the messaging communications and executes actions in accordance with messaging instructions to affect a transaction and related accounts.

The present invention additionally provides a system and method for issuing option structure identifiers adapted to be processed during a universal transaction to affect consumer transactions, possibly the amounts, that includes a data processing system identifying and having a universal account issued by a universal account issuer and which has a universal account identifier and an account owner, and establishing an option structure identifier corresponding to an option structure, and consequently to the option directives, that may be assigned to a universal account owner. The system also includes a distribution system that publishes the option identifiers for review and acquisition by a universal account owner. The option identifiers are adapted to be processed during a universal transaction by the data processing system to identify supply functions. The supply functions are adapted to affect transactions and related accounts, and possibly the transaction amounts during the universal transaction.

The present invention furthermore provides a system for establishing and processing a new payment or redemption account or merchant processing account and related account identifier during a transaction that includes a communications unit transmitting a payment or redemption account or merchant processing account activation request from a universal server processing system during a transaction and receiving the results of a payment or redemption account or merchant processing account activation request from a payment or redemption account or merchant processing account issuer. The payment or redemption account or merchant processing account activation request includes such information as, for example, a payment or redemption account or merchant processing account issuer (e.g. Visa), a transaction amount, and a universal account identifier or merchant account identifier corresponding to a universal account owner or merchant account owner involved with a transaction. Also included in the system is a data processing system for processing the payment or redemption account or merchant processing account activation request and affecting related accounts and the transaction in accordance with option structures, and particularly option directives, universal account preferences, rules, and accrued option items, and merchant account preferences, rules, and available option items.

The present invention also provides a process for establishing and processing a provisional shell or new payment or redemption account or merchant processing account and related account identifier during a transaction that includes the steps of transmitting a payment or redemption account or merchant processing account activation request and receiving the results of such activation request during a transaction. The payment or redemption account or merchant processing account activation request includes such relevant transaction and processing information as, for example, a payment or redemption account or merchant processing account issuer (e.g. Visa), a transaction amount, and a universal account identifier or merchant account identifier corresponding to a universal account owner or merchant account owner involved with a transaction. In one embodiment, the method will process, as needed for activation and usage, a suitable pre-approved payment or redemption or merchant processing issuer status code or identifier code that was proactively established as a provisional shell account and is available in the universal account owner's or merchant account owner's existing account data record. In another embodiment, the method will process, as needed for activation and usage, a new payment or redemption account or merchant processing account and supply such information to the payment or redemption account or merchant processing account issuer as required by the payment or redemption or merchant processing issuer or option supplier and as allowed by the universal account owner or merchant account owner. The method also involves processing the payment or redemption account or merchant processing account activation request and affecting related accounts and the transaction in accordance with option structures, and particularly option directives, universal account preferences, rules, and accrued option items, and merchant account preferences, rules, and available option items.

The present invention in addition provides a process for establishing and processing a universal transaction including supply and acquisition functions adapted for use in payment and settlement processing systems and incentive award processing systems that includes the steps of receiving transaction information such as payment or redemption accounts, and such other relevant account items, corresponding to universal account owners, transaction amounts, and option structures. The option structures provide option directives to be executed by the universal server processing system, and ultimately by payment/award issuers, to affect universal transactions, and consequently consumer transactions, and possibly the amounts and related accounts. The process also involves transmitting such relevant transaction and processing information as, for example, the consumer transaction information and payment or redemption account identifiers, and such other relevant account items, to a clearing authority for clearance against the universal account owner's payment or redemption accounts and receiving an approval or authorisation notice from the clearing authority.

The present invention in addition provides a system for processing the clearance of a consumer transaction, such as a point-of-sale, payment, or exchange transaction, that includes a communication unit transmitting and receiving transaction information between payment and settlement processing systems, and incentive award processing systems. The transaction information includes such relevant transaction information as, for example, transaction identifiers, universal account identifiers, merchant account identifiers, option identifiers, and transaction amounts. The universal account identifier corresponds to a universal account issued by a universal account issuer. The option identifiers correspond to option structures adapted to be processed by the universal server processing system to affect transactions, and possibly amounts, and related accounts. The system also includes a data processing system identifying acquisition functions associated with the universal account or account identifier and performing the acquisition functions to affect the transaction and the related accounts, and possibly the transaction amount.

The present invention furthermore provides a system for establishing and processing an authentication request from a party to confirm the existence and validity of a universal account issued to a universal account owner and such elements of the account.

The present invention also provides a method for executing the clearance of a consumer transaction, such as a point-of-sale, payment, or exchange transaction, that includes the steps of receiving transaction information including such relevant transaction information as, for example, transaction identifiers, universal account identifiers, merchant account identifiers, option identifiers, and transaction amounts. The universal account identifier corresponds to a universal account issued by a universal account issuer. The option identifiers correspond to option structures adapted to be processed by the universal server processing system to affect transactions, and possibly amounts, and related accounts. The method also includes the steps of transmitting relevant transaction information such as option identifiers and option commitments to related payment/award issuers for the acquisition of option offers by universal account owners.

The method further includes the steps of transmitting, for example, the universal account identifier, the consumer transaction amount, payment or redemption accounts and such other relevant account items, and other transaction and processing information to the appropriate payment/award issuer for processing by the payment/award issuer, and receiving an approval or authorisation notice and related transaction information, and possibly an affected transaction amount, to be integrated, transmitted, and resolved by the transaction originator and related parties, and consequently, to accomplish settlement of the transaction.

VARIOUS APPLICATIONS OF THE PRESENT INVENTION

In order to clarify various example applications of the present invention, the following scenarios demonstrate potential operations by users.

APPLICATION EXAMPLE 1

In general, when a consumer initiates, for example, a shopping event, the consumer may select several products to purchase from a merchant and then deliver their universal card (i.e., one representation of the present invention) when requested to make payment. In a unique and novel approach, the use of a universal card (i.e., universal account identifier) will not only provide convenient access to all the consumer's payment and redemption accounts and such provisional shell accounts as may be automatically established, but also, and more importantly, it will provide access to their option preferences, rule settings, accrued option items, and benefit decision policy tactics and long-term acquisition strategy formulations. In addition, the present invention will enable an easy, convenient, and effective means to establish and execute option supply and acquisition functions against a catalog of benefits in order to acquire and utilise benefits and settle the merchant's payment request by selecting and delivering the appropriate payment and redemption accounts.

Consumer: The consumer's shopping cart at a Shaw's Supermarket contains a twelve-ounce can of Dole pineapple, a five-pound box of Tide laundry detergent, one gallon of Garelick 2% milk, and a sixteen-ounce loaf of Pepperidge Farm Canadian bread.

Merchant: A cashier totals the shopping cart items and requests $11.73 as payment.

Consumer: Swipes their universal card through a conventional credit card reader.

Universal Server (in automated processing mode): The payment request is received from the Shaw's Market payment network for $11.73 and the server authenticates and confirms the user account. The universal server determines that there is available for use a $1.00 manufacturer discount coupon for the Tide detergent and a twenty-five cent Shaw's discount coupon for the Dole pineapple. The transaction amount is reduced by $1.25 to produce a $10.48 net due amount. In addition, Shaw's offers a 10% member loyalty discount if the user has a Shaw's Saver card. The universal server obtains a Shaw's Saver account for the consumer (i.e., first time use) and applies a 10% discount to the coupon-adjusted amount to produce a $9.43 net due amount. The consumer prefers to receive the most airline miles and Visa is presently offering 3 miles per dollar, American Express offers 2-for-1, and MasterCard offers 1-for-1. Shaw's will accept payment using a Visa account; therefore, the consumer's Visa account number will be automatically forwarded by the universal server to the conventional payment network for settlement of the $9.43 net amount due.

Merchant: Shaw's payment system records the use of the coupons and frequent shopper discount. The conventional point-of-sale workstation prints a receipt for the consumer to sign indicating settlement of the transaction for $9.43 and possibly indicating other information.

Consumer: Expenditures were reduced by using $1.25 in coupons plus an additional $1.05 by applying a 10% member loyalty discount. At the same time, triple airline miles were acquired.

APPLICATION EXAMPLE 2

In the previous example, the present invention operated to automatically select a payment option based on evaluating at least one ranked benefit item, said benefit items produced and assembled according to user preferences and including a linkage between the benefit item and the payment option.

In another example, the present invention may display a listing of at least one ranked benefit item and/or settlement solution, said benefit items produced and assembled according to user preferences, where such benefit item includes a link from the benefit item to at least one payment option. A user requests from the universal server information regarding rankings of cash-back incentives. The server will display for the user on an appropriate form all cash-back valuations along with a link to the particular payment or award options. The user may then select a payment option for further action. The example may appear as: 2.5% rebate by using a Discover card, 2.0% rebate using Visa, and 1.0% rebate using MasterCard. The display may be affected by other available information; for example, if a transaction amount is known then a dollar amount may also be displayed along with the percentage factor.

In an alternative embodiment, the prior application Example 1 features could be used prior to cashier involvement, in order to evaluate available product discounts and incentives.

Consumer: While standing in the shopping aisle reviewing the various brands of canned pineapple, the consumer enters a product code by means of the user's handheld wirelessly connected personal digital assistant for benefit evaluation by the present invention.

Universal Server (query mode): The product code is received and the related item information is retrieved from a database. The queried product is identified as a ten-ounce can of Del Monte pineapple. The server produces, transmits, and displays for the user, in ranked order, that a twelve-ounce can of Dole pineapple is linked with a twenty-five cent Shaw's discount, a ten-ounce can of Del Monte pineapple is linked with a ten-cent manufacturer's discount, and a twelve-ounce can of Shaw's branded pineapple is linked with no benefits. Other information may also be displayed to the user for reference or comparison purposes.

Consumer: After reviewing the universal server benefit and product information display, the user selects the twelve-ounce can of Dole pineapple to acquire the twenty-five cent Shaw's discount and accumulate such benefit awards in their universal account.

Convenience and Awareness Applications

A further example of the present invention would be as follows. A business traveler from San Francisco arrives in Boston on 21 Jun. 2001 and discovers their luggage has been lost. Needing some clothes, they enter a Macy's department store. After selecting some apparel, they proceed to a cashier to pay for the items. Since they are from San Francisco, they are not aware of the special sales promotions currently in progress at Macy's in Boston. Any other shopper may have paid for the items with their same habitually used Visa card, but this shopper uses their universal card. The cashier swipes the universal card through a conventional credit card device. The consumer has the option of using either the fully automated universal server actions or indicating alternative actions by pressing various credit card device buttons, for example, the "Debit" or "Credit" point-of-sale terminal button to send a signal indicating the activation of pre-set instructions at the universal server (e.g., selecting either a personal or business type of transaction and the use of such related benefit profile). The universal server receives the payment request and reviews the user and merchant accounts. The universal server analyses and determines that although using a MasterCard account could generate airline miles for the shopper, it is advantageous to sign-up and use a Macy's charge card since it will provide the shopper with a 15% discount on their purchase. If permitted, the universal server would establish the Macy card account and then submit the Macy card account identifier to settle the purchase. The value of the present invention is that without reviewing any of the local newspapers, the person from San Francisco was able to determine and maximise their benefits.

It should be noted that the present invention allows the user to preset various benefit strategies and define payment and award account categories. For example, a user may operate a small business. The user establishes two sets of benefit strategies, one that acquires personal benefits (e.g., charitable contributions to Massachusetts General Hospital) and another for business benefits (e.g., points and discounts for use at Staples, Inc.). In addition, the user indicates in their universal account which of the credit card accounts are personal accounts and which ones are business accounts. When the user makes a purchase, they will have the ability to signal to the present invention whether to engage a personal or business benefit strategy and thus the related payment and award accounts.

One more example is that the present invention may display a listing of at least one payment option item produced by evaluating a ranked benefit item listing, where such payment option item includes any type of linkage from the payment option item to at least one benefit item, said benefit items produced and assembled according to user preferences. A user may want to display credit card information assembled according to the best airline mile benefits. The user then may select a displayed item for further action. The example may appear as: (1) American Express offers 5-for-1 miles, (2) Visa offers 3-for-1 miles, (3) Discover offers 2-for-1 miles. Other information may also appear.

A further example is that the present invention may display a listing of at least one product item produced by evaluating a ranked benefit item listing, where such product item includes any type of linkage from the product item to at least one benefit item, said benefit items produced and assembled according to user preferences, where such benefit item includes any type of linkage from the benefit item to at least one payment or settlement option. The example may appear as: (1) 36" Sony television receives a $150.00 manufacturer cash rebate and $25 in-store discount and 2,000 airline miles using a Circuit City charge card, (2) 36" Sony television receives a $150.00 manufacturer cash rebate and 5,000 points using a Visa account, (3) 36" Sony television receives a $150.00 manufacturer cash rebate and 200 Sprint long distance minutes using a MasterCard account and purchased at Best Buy in Peabody.

Intelligent Benefit Planning and Management

New compact smart cards may be handy for storing credit card or account numbers, but simply having one of these electronic devices won't guarantee making smarter payments and settlements. The reason is that smart cards do not make searching for discounts and incentives or remembering to use the right credit card or coupon any easier.

Making smarter payments by taking advantage of cost-saving opportunities requires the use of an easy, effective, and automatic payment analysis and settlement system that not only knows about valuable benefits, but also efficiently selects how to pay by determining which credit card, award account, or e-coupon to use that will get the best personalised benefits.

The present invention advances the art and science of payment systems by automatically obtaining and using valuable benefits whenever and wherever possible.

Advantages of Planning and Management

With the present invention, state-of-the-art analysis engines search for preferred incentives and awards during every payment and exchange transaction. Numerous advantages are created by the present invention including, for example, such items as: just one card and account identifier gives convenient access to all payment, award, and loyalty accounts; automatically reviews all available discounts, incentives, and awards from benefit suppliers that provide valuable offers; automatic selection of the appropriate payment or award accounts that will obtain the best user-preferred benefits; uses up-to-date incentives and awards since benefit suppliers are reviewed in real-time and also requested to update and improve their benefit offers during transactions; automatic redemption of saved discounts and awards so there's no more forgetting to use points or airline miles; set benefit strategies to get only what is wanted such as accumulating a maximum of 25,000 air miles and then getting cash back awards; filter advertising material to reduce "offer overload" yet be able to use all available offers when paying; all account activity can be sent to a user's wireless device in real-time for notification and review to reduce fraud; one convenient activity statement available in print as well as online display using any Internet or wireless device; and, may be used in any conventional or proposed credit card, payment, or settlement system.

Fueled by the needs of a time-starved society, consumers require not only convenience but also personalisation. The present invention automatically creates, produces, and selects benefit-centric solutions to pay, acquire, or exchange that gets the user maximum or preferred benefits.

It should be understood that a computer program may be compiled to address all the various actions of the above function operations and a data processing system may activate and execute said program when, for example, a merchant submits a universal account owner's account identifier as payment for a purchase or when a universal account owner reviews the various option offers available for selection in the universal server's benefit option database (FIG. 2 reference numeral 280). The operations, processing, and logic of said computer program will be readily apparent to those skilled in the art of computer programming and database management system programming.

BRIEF DESCRIPTION OF THE DRAWINGS

The present invention is described in detail below with reference to the following drawing figures of which:

FIG. 3 is a diagram depicting the universal account database illustrated in FIG. 2;

FIG. 5 is a diagram depicting the merchant database illustrated in FIG. 2;

FIG. 6 is an illustration of a merchant's database information as depicted in FIG. 5 and according to the present invention;

FIG. 7 is a diagram depicting the option supplier database illustrated in FIG. 2;

FIG. 8 is an illustration of an option supplier's database information as depicted in FIG. 7 and according to the present invention;

FIG. 9 is a diagram depicting the benefit option structure database illustrated in FIG. 2;

FIG. 11 is a diagram depicting the transaction database as illustrated in FIG. 2;

FIG. 16 is an illustration of an account owner's query messaging display according to the present invention;

FIG. 18 is an illustration of an account owner's exchange messaging display according to the present invention.

DETAILED DESCRIPTION OF THE PREFERRED EMBODIMENTS

Figure 1:
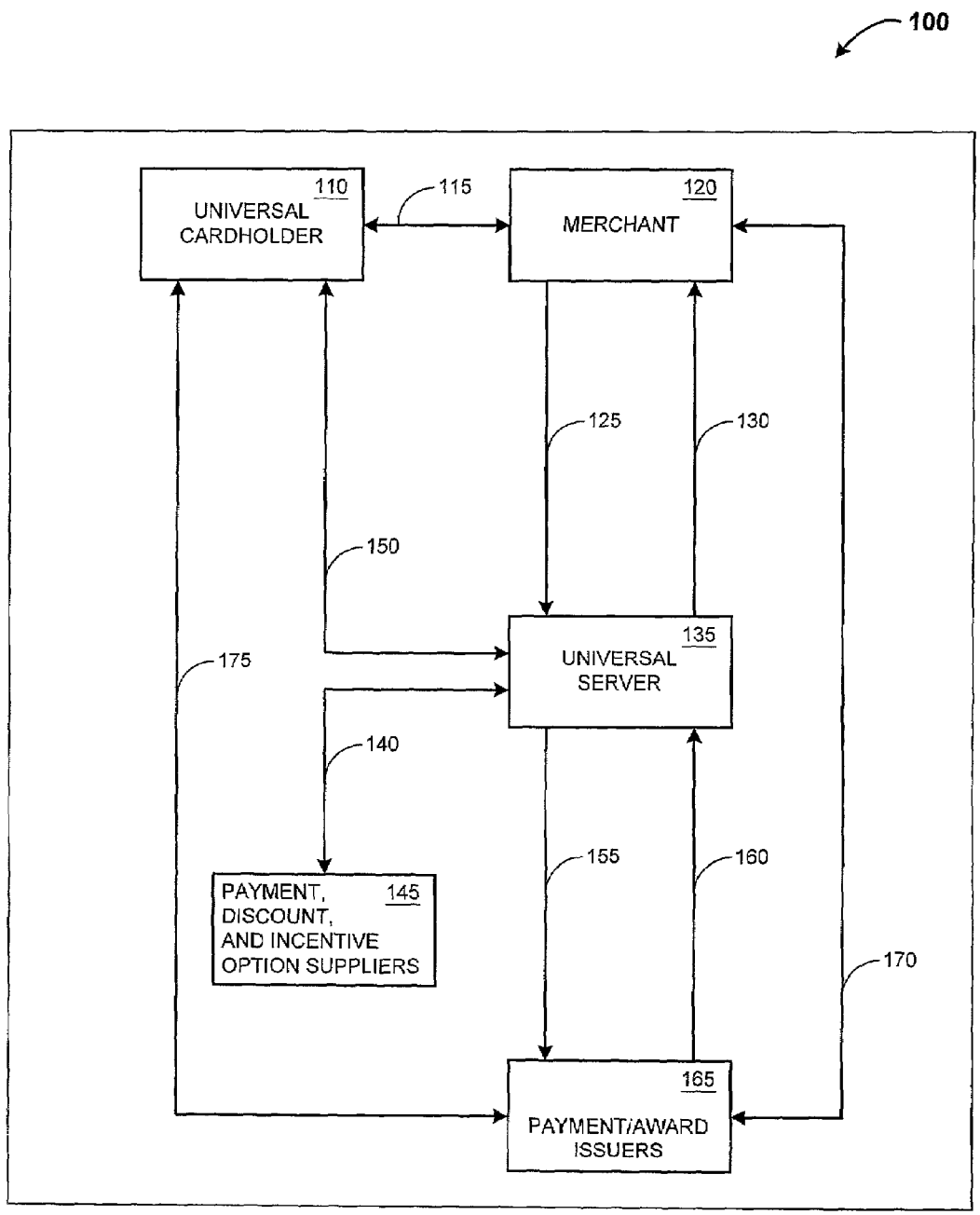
FIG. 1 is a block diagram of a system for establishing and executing payment, discount, and incentive supply and acquisition functions within a transactional processing system.

The present invention is described in detail below with regard to the drawing figures briefly described above. Like parts are referred to by like reference numerals.

Various implementations of the present invention consist of: a method that automatically selects a payment option, or plurality of options, based on evaluating at least one ranked benefit item, said benefit items produced and assembled according to user preferences and including any type of linkage between a benefit item and a payment option; a method that displays a listing of at least one ranked benefit item, said benefit items produced and assembled according to user preferences, where such benefit item includes any type of linkage from the benefit item to at least one payment option or acquisition action; a method that displays a listing of at least one payment option item produced by evaluating a ranked benefit item listing, where such payment option item includes any type of linkage from the payment option item to at least one benefit item, said benefit items produced and assembled according to user preferences; a method that displays a listing of at least one product item produced by evaluating a ranked benefit item listing, where such product item includes any type of linkage from the product item to at least one benefit item, said benefit items produced and assembled according to user preferences, where such benefit item includes any type of linkage from the benefit item to at least one payment option or acquisition action; and, a method that displays a listing of at least one benefit exchange solution produced by evaluating a ranked benefit item listing and as negotiated with other exchange participants. All embodiments may utilise a means for a user to view and select such displayed items and associated linkages, and to transmit appropriate actions and transaction information to related parties to settle a requested transaction. In addition, all embodiments may be performed automatically without user intervention to conduct, select, and transmit appropriate actions and transaction information to related parties to settle a requested transaction.

Referring now to FIG. 1, therein depicted is a block diagram of a system for establishing and executing payment, discount, and incentive (PDI) supply and acquisition functions within a transaction processing system, such as, for example, within a credit card transaction system and a universal server processing system, that includes such elements as accounts, transactions, benefit option structures, and payments and settlements. System 100 is configured to allow universal cardholders (i.e., consumers possessing a universal account), merchants, and option suppliers to use and take advantage of supply and acquisition functions and benefit option identifiers, and appropriate system functions during, for example, point-of-sale or exchange transactions and which can be established and executed by a universal server processing system and a payment/award issuer, such as a credit card issuer, to affect benefit option offers, settlement solutions, transaction-related accounts, the transaction and, possibly, the transaction amount that is ultimately credited or debited either to or from a universal cardholder's payment and award accounts. Supply and acquisition functions and their related identifiers are discussed in detail throughout the remainder of this section.

It should be noted that while a universal account owner may be referred to as a "universal cardholder" in this section, it is contemplated that a universal account identifier may be delivered to a merchant and other parties by means other than a physical "card" or other such material forms of delivery. For example, delivering the universal account identifier by means of a magnetic stripe, smart electronic card, voice response system, touch pad, keypad, optical scanning device, biometric mechanisms, disability-enabled devices, or wireless transmission is certainly envisioned. Regardless of the delivery devices and mediums that are chosen for implementation, system 100 and the present invention certainly contemplate the use of any communications device and medium that will allow a universal account owner to communicate their universal account information to a merchant and other parties for appropriate execution to affect a particular transaction and related accounts.

Although noted, it should be understood that affecting a transaction is intended to also affect accounts to which a particular transaction is to apply. A transaction may be the vehicle by which an account undergoes an operation. For example, the present invention contemplates the execution of an acquisition function, either assembled in an ad hoc fashion or called for by a pre-existing and corresponding function identifier, which results in the universal account owner's incentive collection account being issued two frequent flier airline miles for every dollar of a transaction amount that is charged to their MasterCard credit card account as well as recording option offer and transaction information in various universal server cardholder accounts, system accounts, and also third-party accounts (e.g., the universal account owner's Delta SkyMiles incentive collection account maintained for the account owner by Delta Airlines). In addition, it should be understood that affecting a universal account may also affect transactions to which a particular universal account may apply. An effect on the universal account may be the vehicle by which a transaction becomes subject to an action. For example, upgrading a universal account owner's Visa credit card from a standard membership category to a premium membership category may allow the particular transaction, and consequently the transaction amount, to qualify for reduced or delayed interest charges. It should also be understood that universal server information and accounts may be affected at times other than during point-of-sale or exchange transactions with activities involving such matters as, for example, system maintenance, option and account owner updates, environmental opportunities, post hoc monitoring to enforce past transaction conditions, for example, price-matching guarantees or other time-sensitive terms, etc. These and other processing attributes of the present invention will become readily understood in the following paragraphs.

System 100 allows the use of supply and acquisition functions that permit universal cardholders and option suppliers to not only carry out pre-arranged payment, settlement, and option offer directives and relationships, but also enjoy ad hoc payment, settlement and option offer exchanges and enhanced economic and personal opportunities that benefit those involved in the transaction, especially the universal cardholder. Moreover, system 100 allows the use of supply and acquisition functions to affect transactions and accounts through conventional, widely-deployed point-of-sale processing systems, such as credit card point-of-sale workstations and processing systems, portable and ultra mobile personal computing devices involved with peer-to-peer exchanges, and Internet-related payment processing systems (e.g., Transact from Open Market Incorporated). In addition, system 100 allows the use and execution of functions independently of generic payment and award membership classification data and the like (e.g., Aria Persona award category, Aria Portrait award category).

From a high level, system 100 operates to allow a universal cardholder 110 (i.e., a consumer possessing an account with the present invention) to interact with a merchant 120; a universal server 135; payment, discount, and incentive (PDI) option suppliers 145; and, payment/award issuers 165 in ways not heretofore provided. Universal cardholder 110 and merchant 120 exchange information via link 115. Merchant 120 and universal server 135 exchange information with each other via links 125 and 130, respectively.

Link 115 allows universal cardholder 110 to exchange transaction related information, such as a universal account identifier delivered as a number, with merchant 120. Once received in the course of a transaction (e.g., a point-of-sale transaction), merchant 120 can then re-transmit (possibly via a credit card processor) such universal card number and other transaction information, such as a request to process a payment or refund, product identification codes, and amounts to universal server 135 for appropriate processing. After universal server 135 receives such information, universal server can process the transaction request and amount provided by merchant 120 by communicating with payment, discount, and incentive option suppliers 145 to determine and select appropriate benefit option structures. Universal server 135 continues to process the transaction request in accordance with supply and acquisition functions corresponding to the universal account identifier originally provided by universal cardholder 110, the merchant identifier originally provided by merchant 120, and the corresponding options made available by PDI option suppliers 145. It is important to note that system 100 allows universal cardholder 110 to provide the universal account identifier to merchant 120 and, ultimately, to universal server 135 via a point-of-sale (POS) workstation of the type typically allowing entry of conventional credit card information or even POS workstation types permitting the wireless delivery of account information. As such, system 100 identifies and processes universal account functions without requiring equipment upgrades and without requiring special advance-arrangement plans, other than merchant 120 and universal server 135 establishing conventional payment processing and exchange connections and related functions.

Links 115, 125, 130, 155, 160, and 170 are intended to comprise and utilise conventional payment and settlement processing systems and incentive award processing systems data links, such as those used in credit card transaction systems, as well as any state-of-the-art systems. For example, link 115 may involve a point-of-sale workstation and network, while links 125, 130, 155, 160, and 170 may involve a telecommunications or other network allowing for transaction data communications including the communication of option structure related information. Of course, any information transmission vehicles could be utilised to allow the functionality of system 100. For example, link 115 may involve the use of personal computers connected to the Internet. As another example, system 100 contemplates the use of voice response units (e.g., VRUs maintained by a universal server processing system or credit card issuer or payment/award issuer) that may be operated to allow universal cardholder 110 to enter a universal account identifier into a data processing system maintained by universal server 135 or payment/award issuers 165. Such voice response operation is well known in the transaction processing area especially in the case where personal checks are authorised only after a customer speaks a personal security word into a VRU via a telephone connection. Additionally, other communications mediums such as dedicated telephony call centers having automated and human operations could be setup to handle the communication of transaction and universal account related information between universal cardholder 110, merchant 120, universal server 135, and payment/award issuers 165. It is even conceivable that facsimile communications could be used to communicate such transaction and universal account related information. In addition, of course, system 100 contemplates the use of the Internet and wireless mechanisms as communications mediums that could certainly be deployed for communication of such transaction and universal account related information. The Internet certainly would be preferred in electronic commerce settings in which the present invention is deployed. Wireless communication mediums (e.g., Bluetooth devices, Internet or data-enabled cellular telephones, RIM Blackberry device short messaging and paging services) would also be preferred in electronic commerce settings that feature mobility and personal connectivity capabilities in which the present invention is deployed. Personal, ultra mobile, and wireless connected computing devices are certainly envisioned for the deployment of the present invention especially for inter and intra party exchange-based services. The use of such alternative communication and computing vehicles will be readily appreciated by those skilled in the art.

Links 140, 150, and 175 are intended to comprise and utilise conventional data communication processing system links, such as those used in the Internet or wireless communications (e.g., system-to-system computer networks, personal computer dial-up network connections, wireless digital appliances, paging systems and pager devices, data-enabled cellular telephones), as well as any state-of-the-art system links.

Regardless of the communications mediums and topologies that are chosen for implementation, system 100 and the present invention certainly contemplate the use of any communications medium that will allow a universal account owner, merchant, option suppliers, or payment/award issuers to communicate transaction, universal account related information, and option structures to a universal server processing system for appropriate supply and acquisition function execution in order to affect a transaction and related accounts. In addition, the use of encrypted communications and such related cryptographic methods is envisioned by the present invention to ensure the privacy and security of information and transactions. The use of such cryptographic methods will be readily appreciated by those skilled in the art.

As noted above, system 100 operates to execute supply and acquisition functions to affect transactions and related accounts. In the context of the present invention, a function is an operation of an action, or actions, that may be carried out or executed by a universal server processing system, option supplier, payment/award issuer, or other data processing system to bring about a certain result. That is, by executing a particular function such as a discount function, for example, a discount or percentage off a purchase price can be realised during a transaction that may involve, for example, a credit card or a debit card. Functions according to the present invention include any operation that may affect a transaction to bring about a certain benefit, or multiple benefits. Examples of functions include acquiring discounts, dollars off, product rebates, special interest arrangements (e.g., no interest for six months, etc.), frequent flier airline miles, cash-back, supplying free shipping on transaction amounts over $50.00, supplying cellular telephone airtime minutes, and any other form or item of benefit award or incentive that may be linked to a transaction.

In the context of the present invention, functions may be specified either by their specific and underlying computer programmed and mathematical operations (i.e., the detailed instructions executed or run to effectuate the intended task) or by labels referred to herein as "function identifiers." Functions are created and executed to view, change, and analyse data in different ways. Functions may also be used as the source of records for transaction processing, forms, reports, and data input and output pages. A function is a set of one or more actions that each performs a particular operation, such as opening an account record or the addition of two numbers. An action is the basic building block of a function; a self-contained instruction that can be combined with other actions to build commands. Arguments for an action may be specified. Arguments provide additional information on how to carry out an action, such as which transaction or account data to use. Conditional expressions may also be used to determine whether in some cases an action will be carried out when a function runs. A conditional expression may be evaluated and compared to a specific value 7 for example, using a programming statement of If . . . Then and Select Case statements. If the condition is satisfied, one or more operations are carried out. If the condition is not satisfied, the processing system skips the operations associated with the expression and moves to the next expression. Such processing and logic will be readily apparent to those skilled in the art of computer programming.

The role of a "function identifier" is to act as a tag for a particular function and, in some instances, may actually be configured as a pointer to a function. A function identifier serves to allow data processing systems and database management systems to receive and present the same in a system-friendly way. For example, a data processing system such as universal server 135 can receive a function identifier of "25CBDISCOVER" from a PDI option supplier 145. That function identifier is mapped to a function maintained by a universal server 135 or a related payment/award issuer 165 that will cause a transaction to generate a 2.5% cash back award, based on the transaction amount, to universal cardholder 110 in order to realise a 2.5% rebate on a purchase. Of course, the function corresponding to the function identifier 25CBDISCOVER may involve computer-programmed operations and, in particular, mathematical operations that a universal server processing system or payment/award issuer system executes or runs to effectuate the 2.5% cash back award. The function identifier can be printed on universal cardholder 110's periodic statement as well as a verbose definition of the function.

Another way to look at function identifiers is to say that they are pointers to functions that are used as a form of communicating the nature of the function to which they point. In the context of a data processing or database management system where function identifiers are communicated via data communications networks, function identifiers could be codes that may include alphanumeric strings of characters. In the case that function identifiers are communicated via a network such as the Internet, such function identifiers may take the form of Extensible Mark-up Language (XML) scripts or data entered into Hypertext Mark-up Language (HTML) or Common Gateway Interface (CGI) data entry screens.

Regardless of the communications mediums and encoding methods that are chosen for implementation, system 100 and the present invention certainly contemplate the use of any communications medium and identification methodology that will allow a function or function identifier to be transmitted, received, and interpreted by universal server processing systems, option suppliers, users, and payment/award issuers that will enable recognition and execution of the appropriate function in order to affect transactions and related accounts in a certain way.

In addition to the aforementioned comments about the present embodiment of the present invention, other examples of functions contemplated by the present invention include discounts, dollars off, incentive interest rates (e.g., no interest for six months), rebate due, competitive offers on frequent flier airline miles, reward program points, the exchange of acquired options, etc. It should be noted that this sample of functions does not comprise the entire extent of possible functions available in the present invention.

In addition, it should be noted that the present invention contemplates the use and application of multiple functions to affect a single transaction. For example, it is conceivable that a transaction may be affected by a function specified by a merchant (e.g., 10% off) and a function established by a credit card or payment/award issuer (e.g., $30.00 off). Of course, where such multiple functions are to be applied to affect a particular transaction, there may be preferred orderings in terms of the application of such multiple functions. For example, if a merchant's function is a percentage discount function and the payment/award issuer's function is a dollar cost reduction, it would be preferable to the universal cardholder to have the percentage discount applied first and the dollar cost reduction applied second. Conversely, it would be preferable to the merchant to have the dollar cost reduction applied first and the percentage discount applied second. In either case, the present invention certainly contemplates the application of one or more functions to affect a transaction.

The processing that occurs to allow the application of multiple functions involves iterative and interactive type processing and will be readily appreciated by those skilled in the art of computer programming after reviewing the remainder of this section.

The format and operations related to functions and function identifiers are addressed below in regard to the remaining drawing figures.

Figure 2:
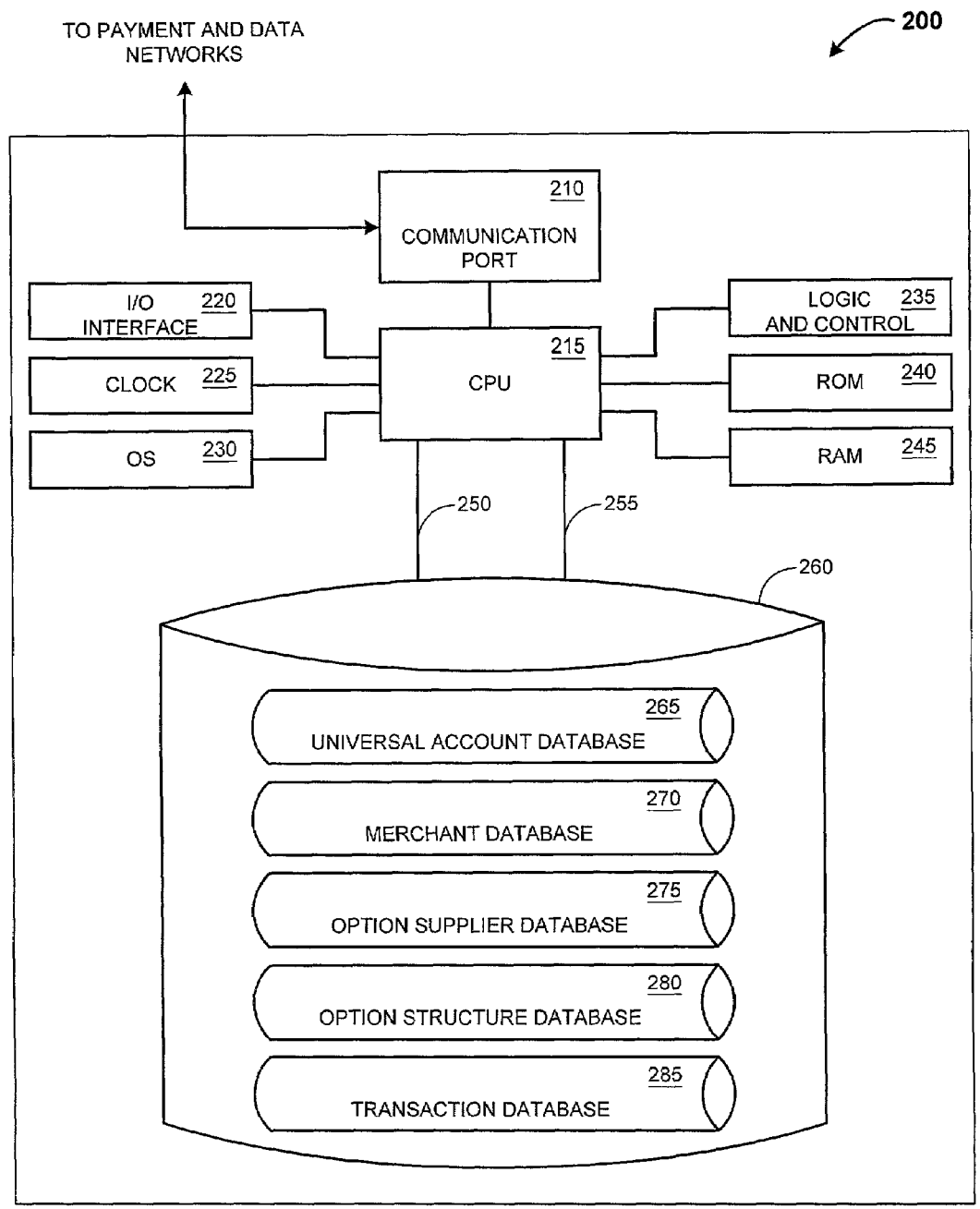
FIG. 2 is a block diagram of a universal server processing system.

Referring now to FIG. 2, therein depicted is a block diagram of a universal server data processing system (also known as an "automatic data processing system" or a "computer system"). In particular, data processing system 200 includes a computer system having a CPU (central processing unit) system 215, I/O (input and output) INTERFACE system 220, a CLOCK system 225, an OS (operating system) system 230, a LOGIC AND CONTROL system 235, a ROM (read only memory) system 240, a RAM (random access memory) system 245, a communications processor and port device 210 (hereinafter abbreviated as "COMM PORT 210"), and a data storage device 260 comprising a universal account database 265, a merchant database 270, an option supplier database 275, an option structure database 280, and a transaction database 285. Of course, these databases may be maintained at one or more physical sites whereby such databases may be said to be distributed databases or to form a distributed database management system. It should be understood that all such database references may be represented by a singular reference to a properly parsed universal account owner database record during situations such as, for example, an exchange transaction or other independent processing activity. Additionally, the aforementioned components are operatively coupled in a conventional way via couplings 250 and 255. Couplings 250 and 255 may be a bus architecture, a network architecture or any other topology that allows high-speed data communications between a CPU 215 and data storage device 260 which may be a fast disk-based data storage device which are well known in the computer industry.

Data processing system 200 is depicted as a general purpose computer system such as one manufactured by SUN Microsystems known in the industry as the SUN SPARC processor (e.g., a SPARC 1000) running an Operating System (e.g., SUN SOLARIS operating system) or by International Business Machines Corporation known in the industry as the NUMA-Q server (e.g., Intel Pentium III) running the Microsoft Corporation Windows NT operating system or by Hewlett-Packard Corporation known in the industry as the HP9000 Superdome server (e.g., HP PA-8600) running the HP-UX UNIX operating system. The database management system software "DBMS" is preferably implemented in a relational database environment such as one produced by ORACLE Corporation known in the industry as the ORACLE 8i relational database management system or by International Business Machines Corporation known in the industry as the DB2 Universal Database or by Microsoft Corporation known in the industry as the SQL Server relational database management system. It is also contemplated that data processing system 200 may be a personal computing system such as one manufactured by Palm Incorporated known in the industry as the Palm VII (e.g., Dragonball processor) operating with appropriate local processing software applications and in conjunction with wireless data connections thus enabling access to distributed computing and storage devices (e.g., databases) as may be required.

The use and operation of the component parts of data processing system 200 including the use and operation of CPU 215, I/O INTERFACE 220, CLOCK 225, OS 230, LOGIC AND CONTROL 235, ROM 240, RAM 245, COMM PORT 210, couplings 250 and 255, and data storage device 260 will be readily apparent to those skilled in the field of computers and the like.

The interconnections of the component parts making up data processing system 200 will be readily known in the art of computer system design and implementation. Moreover, the use of a DBMS like ORACLE 8i, including the maintenance, querying, and manipulation of databases and corresponding tables related to a system such as ORACLE 8i, will be as readily understood by those skilled in the art of database management technologies.

The actual DBMS structure of the databases forming the basis of relevant tables utilised in the context of the present invention (i.e., database tables 265, 270, 275, 280, and 285) will be discussed in detail below with regard to FIGS. 3, 5, 7, 9, and 11.

It should be noted that COMM PORT 210 is configured to communicate via telecommunications links or some other network topology to universal account owners such as universal cardholder 110 (FIG. 1), merchants such as merchant 120 (FIG. 1), option suppliers such as PDI option suppliers 145 (FIG. 1), and payment and award issuers such as payment/award issuer 165 (FIG. 1). Electronic communications in the form of data communications will be readily apparent to those skilled in the art. Of course, it should be noted that COMM PORT 210 could be configured to communicate via a networking topology in an open-standards arrangement or in a closed intranet environment utilising conventional networking protocols such as TCP/IP and the like.

The operations of CPU 215 to bring about system and supply and acquisition function execution and function identifier to function mapping are discussed below in regard to the remaining drawing figures.

Referring now to FIG. 3, therein depicted is a diagram of a universal account database 300 of the type illustrated in FIG. 2 at reference numeral 265 and which is maintained at a universal server as shown in FIG. 1. In particular, universal account database 300 (hereinafter referred to as "table 300") comprises a database management system table that is preferably used in a relational arrangement whereby table 300 is related to other tables in the particular database management system by way of common columns or table fields. In any case, table 300 is maintained in data storage device 260 (FIG. 2) preferably as one or more physical disk files stored at one or more universal servers. Table 300 has a field structure including fields (from table left to right) UNIVERSAL ACCOUNT NUMBER, OWNER NAME, OWNER ADDRESS, OWNER TELEPHONE, DEVICE ACCESS, and PREFERENCES. Of course, table 300's field or column structure is simplified here for purposes of brevity; in actual implementation, many more fields may be used to record other account owner and related information and to record system parameters related to particular records in the database table. The fields form the columns of table 300 and the data records form the rows of table 300. The layout of table 300, including its appearance in FIG. 3, will be readily appreciated by those skilled in the art of database management system design and implementation. It should be noted that the columns and their apparent arrangement in table 300 are merely exemplary to enable one skilled in the art to make and use the present invention; no inferences should be drawn that the table structure (logically or physically) as shown is intended to limit the structure that is ultimately implemented.

The column identified with the label UNIVERSAL ACCOUNT NUMBER stores data representing the account identification codes assigned to the respective universal account owners. The OWNER NAME column stores data representing the name of the universal account owner. The OWNER ADDRESS column stores data representing the address of the universal account owner. The OWNER TELEPHONE column stores data representing a telephone number or other communication device access identifier for contact with the universal account owner. The DEVICE ACCESS column stores data representing a communication device access identifier, possibly a portable device (e.g., cellular telephone number, pager number, Internet IP address), for communication and interaction between the universal server and the universal account owner. The PREFERENCES column stores data representing the option items the universal account owner seeks to acquire during a transaction.

It should also be noted that while table 300, as well as the other tables mentioned below, show pecuniary amounts in terms of U.S. dollars, the present invention and the present embodiment are not so limited. The present invention is adaptable to any form of currency, forms of money, or forms of value. The U.S. dollars are shown and described merely to illustrate the present invention and the present embodiment.

It should be understood that the present invention may accept information for inputting into table 300, as well as the other tables mentioned below, by any means or methods such as, for example, information on paper forms transported by the United States Postal Service to a central data entry site, information conveyed by facsimile machines to receiving machines, electronic presentation and entry systems incorporating the Internet or any electronic communication modalities, information conveyed by voice response units or human service representatives, or data and information accessible by referencing services exposed by computer systems in a computer system-to-system arrangement using, for example, the extensible mark-up language used in computer programming.

In terms of the data and information stored in table 300, three records (i.e., rows) are shown. A first record RC1 has been entered into the database management system and into table 300 to store data related to a universal account owner named GREGORY FXI who maintains the unique universal account identifier and UNIVERSAL ACCOUNT NUMBER 1313-3333-4444-5555. A second record RC2 has been entered into the database management system and into table 300 to store data related to a universal account owner named LINDA JEAN who maintains the unique universal account identifier and UNIVERSAL ACCOUNT NUMBER 1313-4444-5555-6666. A third record RC3 has been entered into the database management system and into table 300 to store data related to a universal account owner named PAUL JAMES who maintains the unique universal account identifier and UNIVERSAL ACCOUNT NUMBER 1313-5555-6666-7777.

In table 300, the universal account numbers for RC1, RC2, and RC3 are industry common sixteen digit credit card account numbers. Accordingly, the first four digits of each of the universal account numbers indicate the financial institution that issued the universal accounts (i.e., the universal account issuer). In this case, RC1 shows a universal issuer having a financial code of "1313." Thereafter, the remaining twelve (12) digits of each universal account number are unique. As such, the sixteen-digit account number uniquely identifies a particular universal account issued by a universal account issuer to a universal account owner. Of course, it should be understood that although a sixteen-digit account number is common in the universal account number field, other universal account number or identifier lengths, symbols, objects, codes, and wavelength spectrum coding frequencies are certainly envisioned by the present invention.

In addition to the format of the UNIVERSAL ACCOUNT NUMBER stored in table 300, it should be understood that the same may store a number or alphanumeric sequence of digits or characters that represent a customer account number. A central authority that implements the current invention to identify registered users and the like may use such a customer account number. Such an arrangement of customer account numbers that may map to credit card, debit card or other financial account numbers will be readily apparent to those skilled in the art of database management systems. In particular, if the account number field or column is intended to maintain customer account numbers that are distinct from financial account numbers and a mapping between the two is desired, a table having at least two columns may be used for the mapping; such a table would include columns for a customer account number and a corresponding customer financial account number.

It should furthermore be noted that while table 300, as well as the other tables mentioned below, show simple descriptive option and preference titles (e.g., lowest rate, cash back), the present invention and the present embodiment use function identifiers and extended operational data that are associated with such descriptive titles in order to positively identify the associated unique functions for execution. The present invention is adaptable to display any option or preference title information to the user for easy recognition while at the same time associating or otherwise mapping the title information with a corresponding function. The simple descriptive option and preference text titles are shown and described merely to illustrate the present invention and the present embodiment.

The fields and columns not specifically mentioned above will be readily apparent to those skilled in the art of database design and implementation. It should be understood that the column structure shown in table 300 is merely exemplary and not intended to restrict the present invention; those skilled in the art of database management system design and implementation may make many changes including the addition or deletion of fields or columns to effectuate particular system functionality and the like.

Figure 4:
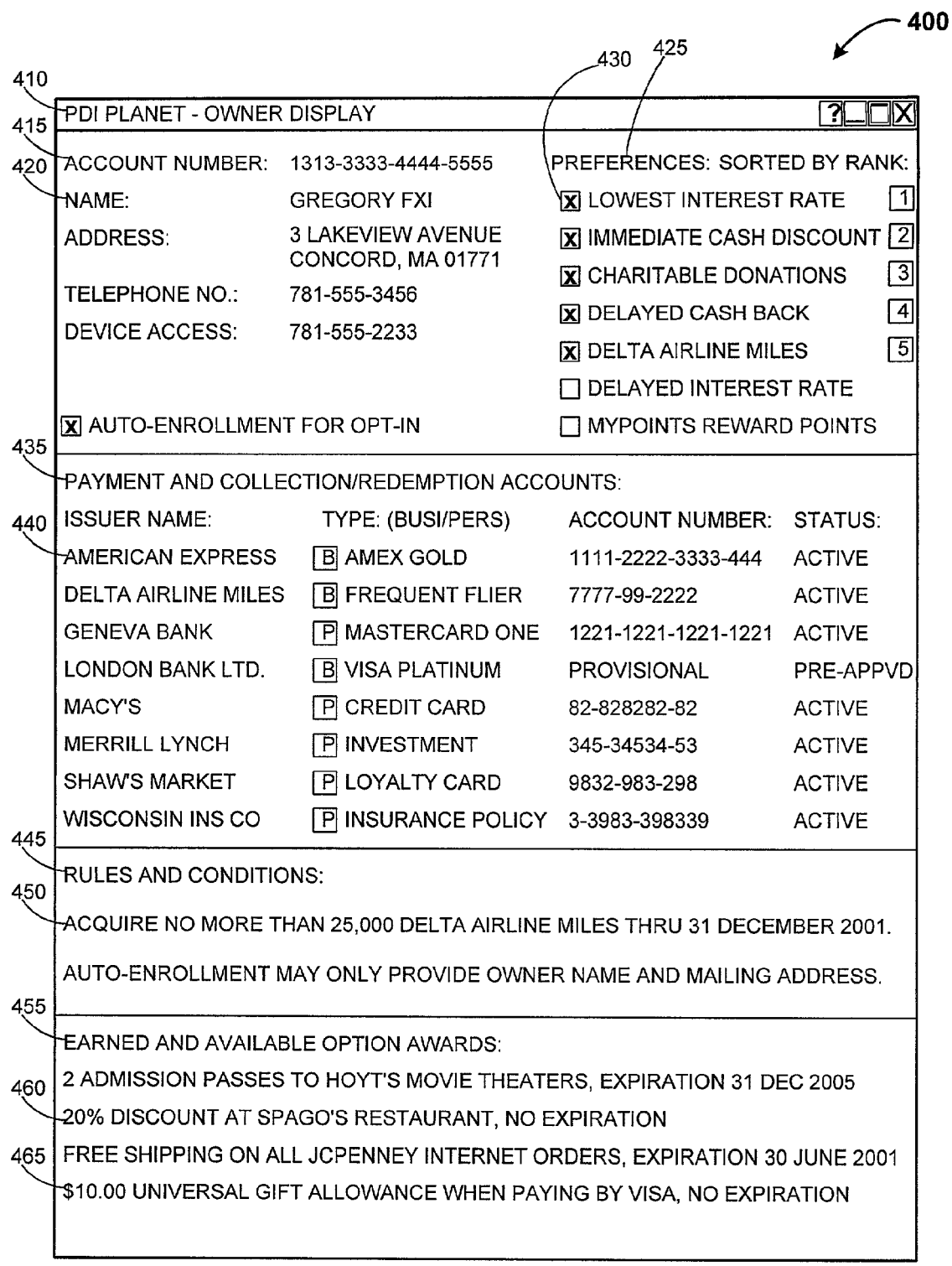
FIG. 4 is an illustration of a universal account owner's database information as depicted in FIG. 3 and according to the present invention.

Referring now to FIG. 4, therein depicted is a universal account owners database information illustrated as a computer system screen display according to the present invention. In particular, screen 400 resembles a typical computer system screen display as a representation of table 300 (FIG. 3) and record RC1 (FIG. 3) preferences and priority rankings, payment and collection/redemption accounts, rules and conditions, and earned and available option awards data in the form of system information and corresponding notices printed on screen 400 to indicate the activities requested, the resources available, and the guidelines of operation to be carried out or executed by universal server 410 in accordance with such system information. As such, screen 400 is a visual display form that is generated in a conventional way by or on behalf of universal server 410 and is usually presented via a computer display terminal or such visual display device to universal account name 420 who is the owner of universal account number 415. Of course, as display systems have advanced, the present invention certainly envisions the day when consumers will regularly view or hear their account information (and computer system screen displays like screen 400) conveniently such as by way of personal digital assistants or wireless appliances (e.g., Palm Pilot devices, electronic pagers, or data-enabled cellular telephones via cellular telephone networks, the Internet, land based telephone network, etc.). Many Internet sites, such as the World Wide Web site Amazon.com, now offer wireless network-based transport of account details and displays. Accordingly, the implementation details necessary to transport or otherwise deliver a screen display like screen 400 to a recipient or account owner conveniently using electronic communication devices producing sight, sound, or touch formats will be readily apparent to those skilled in the art.

A preference section 425 includes information about universal account name 420's option preferences, such as option 430 having a selection mechanism (e.g., a checkbox to select or deselect an option), a descriptive name of LOWEST INTEREST RATE, and a priority rank of 1 (e.g., first preferred option to be acquired if possible). Preference section 425 is reviewed when seeking to acquire options during a transaction in which universal account name 420 may use any of the payment and collection/redemption accounts 435, such as payment account 440 having an issuer name of AMERICAN EXPRESS, a type of AMEX GOLD, an account number of 1111-2222-3333-444, and a status of ACTIVE, at a point-of-sale purchase for example. Before any selection is made from the payment and collection/redemption accounts 435, the rules and conditions section 445 is used to establish any criteria, such as rules and conditions 450 having a condition that no more than 25,000 Delta frequent flier airlines miles are to be acquired between the present time and Dec. 31, 2001, that will be incorporated in the production of acquisition functions to qualify available option offers. In addition to the rules and conditions section 445 that must be evaluated before determinations and selections are made from the payment and collection/redemption accounts 435, the information contained in earned and available option awards section 455 will be reviewed to identify and use any acquired option items, such as the earned and available option award 460 having a 20% discount at Spago's Restaurant for all such Spago transactions at anytime, that may be applied to a related transaction. In particular, universal server 410 has a data processing system wherein functions and mathematical operations are retrieved, assembled, produced, and carried out to affect transactions and accounts by applying the universal account name 420's operational data as stored in table 300 (FIG. 3).

Earned and available option awards section 455 also indicates a new option award, the earned and available option award 465, in the form of operational data for universal account name 420 to use at his next purchase at any merchant. After delivering the universal account identifier to a merchant, a $10.00 universal gift incentive award will be applied and deducted from universal account name 420's purchase amount if a Visa credit card account is delivered to settle the transaction. In this case, the acquired option specified in earned and available option award 465 is one obtained from a credit card issuer, stored by universal server 410, and available to be redeemed as settlement value during a transaction. Since universal account name 420's payment and collection/redemption accounts 435 is listed with a provisional Visa shell account, the availability of a $10.00 incentive award may cause the provisional Visa shell account to become fully activated during the next transaction. Acquired options represented by earned and available option award 460 and the new option award and related functions indicated by earned and available option award 465 will allow payment and award issuers and merchants to realise increased account use and purchasing, respectively.

The earned and available option award 465 could have been received from other sources as well as his credit card issuer. The earned and available option award 465 could have been force issued (i.e., sent without request by the universal cardholder) by a credit card issuer via a billing statement or some other distribution such as via an electronic mail item sent via the Internet. Also, the earned and available option award 465 could have been sent to the universal account owner upon his request from his credit card issuer in exchange for completing a marketing survey or the like or as part of some general reward program.

It is important to note that the way in which the display of operational data (e.g., preferences) is manifested on screen 400 can vary depending on design requirements. For example, if the rules and conditions to be applied to a given transaction involve extensive option issuer terms, numerical limits, and effective start and end dates, then screen 400 may merely show a descriptive option name or function identifier as opposed to the extensive details about the underlying instructions and meticulous application of the function. Additionally, screen 400 could be produced to indicate past transaction activity, competing offers during a payment or award selection event, function identifiers added to descriptive option names, or any other information that is desired and available from table 300 (FIG. 3), other database information tables, or linked information sources.

Referring now to FIG. 5, therein depicted is a MERCHANT database 500 as originally depicted in FIG. 2 at reference numeral 270. In particular, database 500 (hereinafter "table 500") is a relational database table having a column and row arrangement. The columns indicate the fields stored in table 500 and the rows contain the data corresponding to individual records stored in table 500. Table 500 has a field structure including fields (from table left to right) storing merchant information related to MER- CHANT ACCOUNT NUMBER, MERCHANT NAME, MERCHANT ADDRESS, MERCHANT TELEPHONE, DEVICE ACCESS, and ACCEPTED PAYMENTS.

The column identified with the label MERCHANT ACCOUNT NUMBER stores data representing the account identification codes assigned to the respective universal merchants. The MERCHANT NAME column stores data representing the name of the universal merchant. The MERCHANT ADDRESS column stores data representing the address of the universal merchant. The MERCHANT TELEPHONE column stores data representing a telephone number or other communication device access identifier for contact with the universal merchant. The DEVICE ACCESS column stores data representing a communication device access identifier, possibly a portable device (e.g., cellular telephone number, pager number, Internet IP address), for communication and interaction between the universal server and the universal merchant. The ACCEPTED PAYMENTS column stores data representing the methods and types of payment or value the universal merchant will accept during a transaction.

Of course, table 500's field or column structure is simplified here for purposes of brevity; in actual implementation, many more fields may be used to record other merchant data and related information and to record system parameters related to particular records in the database. The layout of table 500, including its appearance in FIG. 5, will be readily appreciated by those skilled in the art of database management system design and implementation. It should be noted that the columns and their apparent arrangement in table 500 are merely exemplary to enable one skilled in the art to make and use the present invention; no inferences should be drawn that the table structure (logically or physically) as shown is intended to limit the structure that is ultimately implemented.

Table 500 shows three records containing information about three different merchants.

Record RM1 stores data related to a merchant having a MERCHANT ACCOUNT NUMBER of 4444-5555, a MERCHANT NAME of Top Software, a MERCHANT ADDRESS of 101 Main Street, Concord, Mass. 01776, a MERCHANT TELEPHONE of 781-555-9876, a DEVICE ACCESS of 781-555-9998, and ACCEPTED PAYMENTS of MC, VISA, DISCOVER. Record RM2 stores data related to a merchant having a MERCHANT ACCOUNT NUMBER of 8888-9999, a MERCHANT NAME of Linens Etc., a MERCHANT ADDRESS of 202 Commerce Way, Acton, Mass. 01818, a MERCHANT TELEPHONE of 617-555-3334, a DEVICE ACCESS of 617-555-1324#9954, and ACCEPTED PAYMENTS of AMEX, MC, MYPOINTS. Record RM3 stores data related to a merchant having a MERCHANT ACCOUNT NUMBER of 5555-7777, a MERCHANT NAME of Phones Plus, a MERCHANT ADDRESS of 303 Store Lane, Boston, Mass. 03838, a MERCHANT TELEPHONE of 617-555-7713, a DEVICE ACCESS of 010.186.066.256, and ACCEPTED PAYMENTS of ALL EXCEPT DINERS.

Of course, it should be understood that although an eight-digit account number is common in the merchant account number field, other number or identifier lengths, symbols, objects, codes, and wavelength spectrum coding frequencies are certainly envisioned by the present invention. In particular, the present invention would certainly be applicable to a merchant account number such as those used by, for example, MasterCard International Incorporated.

In addition to the format of the MERCHANT ACCOUNT NUMBER stored in table 500, it should be understood that the same may store a number or alphanumeric sequence of digits or characters that represent a merchant account number. A central authority that implements the current invention to identify registered merchants and the like may use such a merchant account number. Such an arrangement of merchant account numbers that may map to other merchant account numbers will be readily apparent to those skilled in the art of database management systems. In particular, if the merchant number field or column is intended to maintain merchant account numbers that are distinct from other merchant account numbers and a mapping between the two is desired, a table having at least two columns may be used for the mapping; such a table would include columns for a merchant account number and a corresponding merchant account maintained with another data processing system such as MasterCard International Incorporated.

The fields and columns not specifically mentioned above will be readily apparent to those skilled in the art of database design and implementation. It should be understood that the column structure shown in table 500 is merely exemplary and not intended to restrict the present invention; those skilled in the art of database management system design and implementation may make many changes including the addition or deletion of fields or columns to effectuate particular system functionality and the like.

Referring now to FIG. 6, therein depicted is a merchant's database information illustrated as a computer system screen display according to the present invention. In particular, screen 600 resembles a typical computer system screen display as a representation of table 500 (FIG. 5) and record RM1 (FIG. 5) preferences and priority rankings, merchant processing accounts, rules and conditions, and active and available option awards data in the form of system information and corresponding notices printed on screen 600 to indicate the activities requested, the resources available, and the guidelines of operation to be carried out or executed by universal server 610 in accordance with such system information. As such, screen 600 is a visual display form that is generated in a conventional way by or on behalf of universal server 610 and is usually presented via a computer display terminal or such visual display device to merchant account name 620 who is the owner of universal merchant number 615. Of course, as display systems have advanced, the present invention certainly envisions the day when merchants will regularly view or hear their account information (and computer system screen displays like screen 600) conveniently such as by way of personal digital assistants or wireless appliances (e.g., point-of-sale workstations, Palm Pilot devices, electronic pagers, or data-enabled cellular telephones via cellular telephone networks, the Internet, land based telephone network, etc.). Accordingly, the implementation details necessary to transport or otherwise deliver a screen display like screen 600 to a recipient or account owner conveniently using electronic communication devices producing sight, sound, or touch formats will be readily apparent to those skilled in the art.

A preference section 625 includes information about merchant account name 620's payment acceptance preferences, such as payment acceptance preference 630 having a selection mechanism (e.g., a checkbox to select or deselect a payment acceptance type), a descriptive name of VISA, and a priority rank of 1 (e.g., first payment type to be requested and accepted if possible). Preference section 625 is reviewed when seeking to accept payments during a transaction in which merchant account name 620 may accept any of the payment types that use any of the merchant processing accounts 635, such as merchant processing account 640 having an issuer name of AMERICAN EXPRESS, a type of MERCHANT 2.5%, an account number of 2222-3333-444, and a status of ACTIVE, at a point-of-sale purchase for example. Before any selection is made from the merchant processing accounts 635, the rules and conditions section 645 is used to establish any criteria, such as rules and conditions 650 having a condition that merchant account name 620 will offer no more than 2.5 Delta airline miles for purchase amounts under $5,000.00 through 31 Dec. 2001 when a transaction is paid with a universal account owner's Visa account, that will be incorporated in the production of supply functions to qualify the accepted payment types. In addition to the rules and conditions section 645 that must be evaluated before determinations and selections are made from the merchant processing accounts 635, the information contained in active and available option offers section 655 will be reviewed to identify and provide any existing option structures, such as the active and available option offer 660 issuing a 20% discount on all purchases with the merchant valid only on the day of 21 Jun. 2001, that may be offered to a transaction. In particular, universal server 610 has a data processing system wherein functions and mathematical operations are retrieved, assembled, produced, and carried out to affect transactions and accounts by applying the merchant account name 620's operational data as stored in table 500 (FIG. 5).

Active and available option offers section 655 also indicates a new option offer, the active and available option offer 665, in the form of operational data for merchant account name 620 to use at the next transaction with any consumer who presents his universal card by providing to the universal account owner the option offer identifier for a $10.00 universal gift allowance on purchases over $100.00 when paid with a universal account owner's Visa payment account. In this case, the option offer specified in active and available option offer 665 is one provided by merchant account name 620 or from a credit card issuer/processor, stored by universal server 610, and available to be issued during a transaction. Available option structures represented by active and available option offer 660 and the new option offer and related functions indicated by active and available option offer 665 will allow payment and award issuers and merchants to realise increased account use and purchasing, respectively.

The active and available option offer 665 could have been created by other sources as well as the universal merchant or received from a credit card issuer. The active and available option offer 665 could have been force issued (i.e., sent without request by the universal merchant) by a credit card issuer via an electronic mail item sent via the Internet. Also, the active and available option offer 665 could have been sent to the universal merchant upon his request from one of his merchant processing accounts in exchange for a fee or the like or as part of some general reward program.

It is important to note that the way in which the display of operational data (e.g., preferences) is manifested on screen 600 can vary depending on design requirements. For example, if the rules and conditions to be applied to a given transaction involve extensive option issuer terms, numerical limits, and effective start and end dates, then screen 600 may merely show a descriptive option name or function identifier as opposed to the extensive details about the underlying instructions and meticulous application of the function. Additionally, screen 600 could be produced to indicate past transaction activity, competing offers during a payment or award negotiation event, function identifiers added to descriptive option names, or any other information that is desired and available from table 500 (FIG. 5), other database information tables, or linked information sources.

Referring now to FIG. 7, therein depicted is an OPTION SUPPLIER database 700 as originally depicted in FIG. 2 at reference numeral 275. In particular, database 700 (hereinafter "table 700") is a relational database table having a column and row arrangement. The columns indicate the fields stored in table 700 and the rows contain the data corresponding to individual records stored in table 700. Table 700 has a field structure including fields (from table left to right) storing option supplier information related to OPTION SUPPLIER ACCOUNT NUMBER, SUPPLIER NAME, SUPPLIER ADDRESS, SUPPLIER TELEPHONE, DEVICE ACCESS, and OPTION STRUCTURES.

The column identified with the label OPTION SUPPLIER ACCOUNT NUMBER stores data representing the account identification codes assigned to the respective universal option suppliers. The SUPPLIER NAME column stores data representing the name of the universal option supplier. The SUPPLIER ADDRESS column stores data representing the address of the universal option supplier. The SUPPLIER TELEPHONE column stores data representing a telephone number or other communication device access identifier for contact with the universal option supplier. The DEVICE ACCESS column stores data representing a communication device access identifier, possibly a portable device (e.g., cellular telephone number, pager number, Internet IP address), for communication and interaction between the universal server and the universal option supplier. The OPTION STRUCTURES column stores data representing the option structures the universal option supplier makes available during a transaction.

Of course, table 700's field or column structure is simplified here for purposes of brevity; in actual implementation, many more fields may be used to record other option supplier data and related information and to record system parameters related to particular records in the database. The layout of table 700, including its appearance in FIG. 7, will be readily appreciated by those skilled in the art of database management system design and implementation. It should be noted that the columns and their apparent arrangement in table 700 are merely exemplary to enable one skilled in the art to make and use the present invention; no inferences should be drawn that the table structure (logically or physically) as shown is intended to limit the structure that is ultimately implemented.

Table 700 shows three records containing information about three different option suppliers.

Record RS1 stores data related to an option supplier having an OPTION SUPPLIER ACCOUNT NUMBER of 987654, a SUPPLIER NAME of Visa, a SUPPLIER ADDRESS of 777 Plaza Avenue, New York, N.Y. 10010, a SUPPLIER TELEPHONE of 203-555-7373, a DEVICE ACCESS of 203-555-7327, and OPTION STRUCTURES of AIRLINE MILES. Record RS2 stores data related to an option supplier having an OPTION SUPPLIER ACCOUNT NUMBER of 876543, a SUPPLIER NAME of MasterCard, a SUPPLIER ADDRESS of 555 Credit Lane, New York, N.Y. 10015, a SUPPLIER TELEPHONE of 203-555-5723, a DEVICE ACCESS of 203-555-4231#5363, and OPTION STRUCTURES of MYPOINTS and CASHBACK. Record RS3 stores data related to an option supplier having an OPTION SUPPLIER ACCOUNT NUMBER of 765432, a SUPPLIER NAME of Shaw's Market, a SUPPLIER ADDRESS of 444 Super Way, Hartford, Conn. 10191, a SUPPLIER TELEPHONE of 605-555-8384, a DEVICE ACCESS of 010.036.067.256, and OPTION STRUCTURES of 10% Discount.

Of course, it should be understood that although a six-digit account number is common in the option supplier account number field, other number or identifier lengths, symbols, objects, codes, and wavelength spectrum coding frequencies are certainly envisioned by the present invention. In particular, the present invention would certainly be applicable to an option supplier account number such as those used by, for example, MasterCard International Incorporated.

In addition to the format of the OPTION SUPPLIER ACCOUNT NUMBER stored in table 700, it should be understood that the same may store a number or alphanumeric sequence of digits or characters that represent an option supplier account number. A central authority that implements the current invention to identify registered option suppliers and the like may use such an option supplier account number. Such an arrangement of option supplier account numbers that may map to other option supplier account numbers will be readily apparent to those skilled in the art of database management systems. In particular, if the option supplier account number field or column is intended to maintain option supplier account numbers that are distinct from other option supplier account numbers and a mapping between the two is desired, a table having at least two columns may be used for the mapping; such a table would include columns for an option supplier account number and a corresponding option supplier account number maintained with another data processing system such as MasterCard International Incorporated.

The fields and columns not specifically mentioned above will be readily apparent to those skilled in the art of database design and implementation. It should be understood that the column structure shown in table 700 is merely exemplary and not intended to restrict the present invention; those skilled in the art of database management system design and implementation may make many changes including the addition or deletion of fields or columns to effectuate particular system functionality and the like.

Referring now to FIG. 8, therein depicted is an option supplier's database information illustrated as a computer system screen display according to the present invention. In particular, screen 800 resembles a typical computer system screen display as a representation of table 700 (FIG. 7) and record RS1 (FIG. 7) option structures and priority rankings, option supplier associate accounts, rules and conditions, and active and available option structures data in the form of system information and corresponding notices printed on screen 800 to indicate the activities requested, the resources available, and the guidelines of operation to be carried out or executed by universal server 810 in accordance with such system information. As such, screen 800 is a visual display form that is generated in a conventional way by or on behalf of universal server 810 and is usually presented via a computer display terminal or such visual display device to option supplier account name 820 who is the owner of universal option supplier account number 815. Of course, as display systems have advanced, the present invention certainly envisions the day when option suppliers will regularly view or hear their account information (and computer system screen displays like screen 800) conveniently such as by way of personal digital assistants or wireless appliances (e.g., computer systems, Palm Pilot devices, electronic pagers, or data-enabled cellular telephones via cellular telephone networks, the Internet, land based telephone network, etc.). Accordingly, the implementation details necessary to transport or otherwise deliver a screen display like screen 800 to a recipient or account owner conveniently using electronic communication devices producing sight, sound, or touch formats will be readily apparent to those skilled in the art.

An option structures section 825 includes information about option supplier account name 820's option structure preferences, such as option structure preference 830 having a selection mechanism (e.g., a checkbox to select or deselect an option structure type), a descriptive name of AIRLINE MILES, and a priority rank of 1 (e.g., first option structure type to be offered). Option structures section 825 is reviewed when seeking to offer option structures during a transaction in which option supplier account name 820 may offer any of the items in option structures section 825 as well as forming combinations with any of the option supplier associate accounts 835, such as option supplier associate account 840 having an associate name of AMES DEPT STORE, and an option type of MYPOINTS, at a point-of-sale or other such transaction involving corresponding accounts (e.g., a purchase at an Ames Department Store using a Visa payment account to settle a transaction). Before any selection is made from the option supplier associate accounts 835, the rules and conditions section 845 is used to establish any criteria, such as rules and conditions 850 having a condition that option supplier account name 820 will offer no more than 3.0 Delta airline miles for individual purchase amounts greater than $5,000.00 and less than $1,000,000.00, that will be incorporated in the production of supply functions to qualify the transactions. In addition to the rules and conditions section 845 that must be evaluated before determinations and selections are made from the option supplier associate accounts 835, the information contained in active and available option structures 855 will be reviewed to identify and use any existing option structures, such as the active and available option structure 860 issuing a 20% discount on all purchases valid only on the day of 21 Jun. 2001, that may be offered to a transaction. In particular, universal server 810 has a data processing system wherein functions and mathematical operations are retrieved, assembled, produced, and carried out to affect transactions and accounts by applying the option supplier account name 820's operational data as stored in table 700 (FIG. 7).

Active and available option structures section 855 also indicates a new option structure, the active and available option structure 865, in the form of operational data for option supplier account name 820 to use at the next transaction with any consumer who presents his universal card by providing to the universal account owner the option offer identifier for deducting all shipping charges on all Internet purchases made through 30 Jun. 2001 when paid with a universal account owner's Visa payment account. In this case, the option offer specified in active and available option structure 865 is one provided by option supplier account name 820, stored by universal server 810, and available to be issued during a transaction. Available option structures represented by active and available option structure 865 will allow payment and award issuers to realise increased account usage.

It is important to note that the way in which the display of operational data (e.g., option structures) is manifested on screen 800 can vary depending on design requirements. For example, if the rules and conditions to be applied to a given transaction involve extensive option issuer terms, numerical limits, and effective start and end dates, then screen 800 may merely show a descriptive option name or function identifier as opposed to the extensive details about the underlying instructions and meticulous application of the function. Additionally, screen 800 could be produced to indicate past transaction activity, competing offers during a payment or award negotiation event, function identifiers added to descriptive option names, or any other information that is desired and available from table 700 (FIG. 7), other database information tables, or linked information sources.

Referring now to FIG. 9, therein depicted is an OPTION STRUCTURE database 900 as originally depicted in FIG. 2 at reference numeral 280. In particular, database 900 (hereinafter "stable 900") is a relational database table having a column and row arrangement. The columns indicate the fields stored in table 900 and the rows contain the data corresponding to individual records stored in table 900. Table 900 has a field structure including fields (from table left to right) storing option structure information related to OPTION IDENTIFIER, AWARD NAME, AWARD TYPE, AWARD MINIMUM, AWARD MAXIMUM, AWARD START DATE, AWARD END DATE, and SUPPLY FUNCTION OPERATION.

The column identified with the label OPTION IDENTIFIER stores data representing the identification codes assigned to the respective universal option structure and used by universal account owners, merchants, option suppliers, payment/award issuers, and transactions. The AWARD NAME column stores data representing the option description of the universal option structure. The AWARD TYPE column stores data representing the category of the universal option structure. The AWARD MINIMUM column stores data representing a minimum value that the universal option structure will provide during a transaction. The AWARD MAXIMUM column stores data representing a maximum value that the universal option structure will provide during a transaction. The AWARD START DATE column stores data representing a date, and possibly a time, when the universal option structure will become effective for use in transactions. The AWARD END DATE column stores data representing a date, and possibly a time, when the universal option structure will become terminated for use in transactions. The SUPPLY FUNCTION OPERATION column maintains actions and commands to be carried out (i.e., executed) in conjunction with related arguments and conditional expressions by the universal server processing system (e.g., the entity maintaining the database management system such as universal server FIG. 1 reference numeral 135 in the present embodiment).

Of course, table 900's field or column structure is simplified here for purposes of brevity; in actual implementation, many more fields may be used to record other option structure data and related information and to record system parameters related to particular records in the database. The layout of table 900, including its appearance in FIG. 9, will be readily appreciated by those skilled in the art of database management system design and implementation. It should be noted that the columns and their apparent arrangement in table 900 are merely exemplary to enable one skilled in the art to make and use the present invention; no inferences should be drawn that the table structure (logically or physically) as shown is intended to limit the structure that is ultimately implemented.

Table 900 shows three records containing information about three different option structures.

Record RA1 stores data related to an option structure having an OPTION IDENTIFIER of AIRMILES-DELTA1, an AWARD NAME of Delta Airline Miles 2.5, an AWARD TYPE of Delta Airline Miles, an AWARD MINIMUM of 1.0, an AWARD MAXIMUM of 2.5, an AWARD START DATE of 1 Jun. 2000, an AWARD END DATE of 30 Jun. 2000, and a SUPPLY FUNCTION OPERATION of (IF TRANSAMT<=500000 . . . ). It should be noted that the SUPPLY FUNCTION OPERATION is simplified here for purposes of brevity; in actual implementation, many more actions, each performing a particular operation, may be used to build commands and function derivatives to produce and execute corresponding system and data operations. Record RA2 stores data related to an option structure having an OPTION IDENTIFIER of AIRMILES-DELTA2, an AWARD NAME of Delta Airline Miles 3.75, an AWARD TYPE of Delta Airline Miles, an AWARD MINIMUM of 1.0, an AWARD MAXIMUM of 3.75, an AWARD START DATE of 1 Jan. 2001, an AWARD END DATE of 30 Jun. 2001, and a SUPPLY FUNCTION OPERATION of (IF TRANSAMT>1000000 . . . ). Record RA3 stores data related to an option structure having an OPTION IDENTIFIER of CASHBACK-1, an AWARD NAME of Cash Back Award 12, an AWARD TYPE of Cash Back, an AWARD MINIMUM of 1.0%, an AWARD MAXIMUM of 2.0%, an AWARD START DATE of 1 Dec. 2000, an AWARD END DATE of 31 Dec. 2000, and a SUPPLY FUNCTION OPERATION of (TRANSAMT * 0.01 . . . ).

Accordingly, a system such as system 100 will have the ability to accept, identify, and retrieve the OPTION IDENTIFIER and associated data record and cause the appropriate processing to occur. A database management system envisioned by system 100 will certainly be able to retrieve and map an OPTION IDENTIFIER like "CASHBACK-1" to its corresponding parameters, arguments, rules and conditions, and applicable updates and interactive events related to its data record into appropriate logic for a SUPPLY FUNCTION OPERATION to be established and to further cause analysis of a transaction and to promote additional processing functions to be executed in order for there to be an affect on appropriate accounts and in order to acquire a cash back amount in relation to the underlying purchase for the appropriate amount of the purchase price issued to the universal account owner. Such processing and logic will be readily apparent to those skilled in the art of computer programming and database management system programming.

The present invention also contemplates the notion that the OPTION IDENTIFIER could actually be configured to be a pointer or address to a function operation. Such a configuration will be readily apparent to those skilled in the art.

The other records stored in table 900 will be readily appreciated by those skilled in the art of database design and implementation. It is worth noting, however, that the functions stored in table 900 represent actions to be carried out or executed by a universal server processing system, option supplier, or payment/award issuer, such as a credit card issuer, and include, but are not limited to, frequent flier airline miles, percentage discounts and rebates, dollars-off amounts (e.g., $10.00 off a transaction on a sales amount of $50.00 or more), and possibly, special purchase terms such as no interest periods, no payment periods, etc. In any case, table 900 as used in a processing system such as system 100 will operate to affect actions, transactions, and accounts related thereto.

Of course, it should be understood that other alphabetic, numeric, or identifier lengths, symbols, objects, codes, and wavelength spectrum coding frequencies are certainly envisioned by the present invention for the option identifier. In particular, the present invention would certainly be applicable to an option identifier such as those used by, for example, American Express Company. It is preferred, however, the format that is chosen for the option identifier and related information be one that allows entry and compatibility with, for example, established payment and award processors and computer system data processing systems (e.g., extensible mark-up language XML business format standards).

In addition to the format of the OPTION IDENTIFIER stored in table 900, it should be understood that the same may store a number or alphanumeric sequence of digits or characters that represent an option identifier. A central authority that implements the current invention to identify registered option structures and the like may use such an option identifier. Such an arrangement of option identifiers that may map to other option identifiers will be readily apparent to those skilled in the art of database management systems. In particular, if the option identifier field or column is intended to maintain option identifiers that are distinct from other option identifiers and a mapping between the two is desired, a table having at least two columns may be used for the mapping; such a table would include columns for an option identifier and a corresponding option identifier maintained with another data processing system such as American Express Company.

The fields and columns not specifically mentioned above will be readily apparent to those skilled in the art of database design and implementation. It should be understood that the column structure shown in table 900 is merely exemplary and not intended to restrict the present invention; those skilled in the art of database management system design and implementation may make many changes including the addition or deletion of fields or columns to effectuate particular system functionality and the like.

Figure 10:
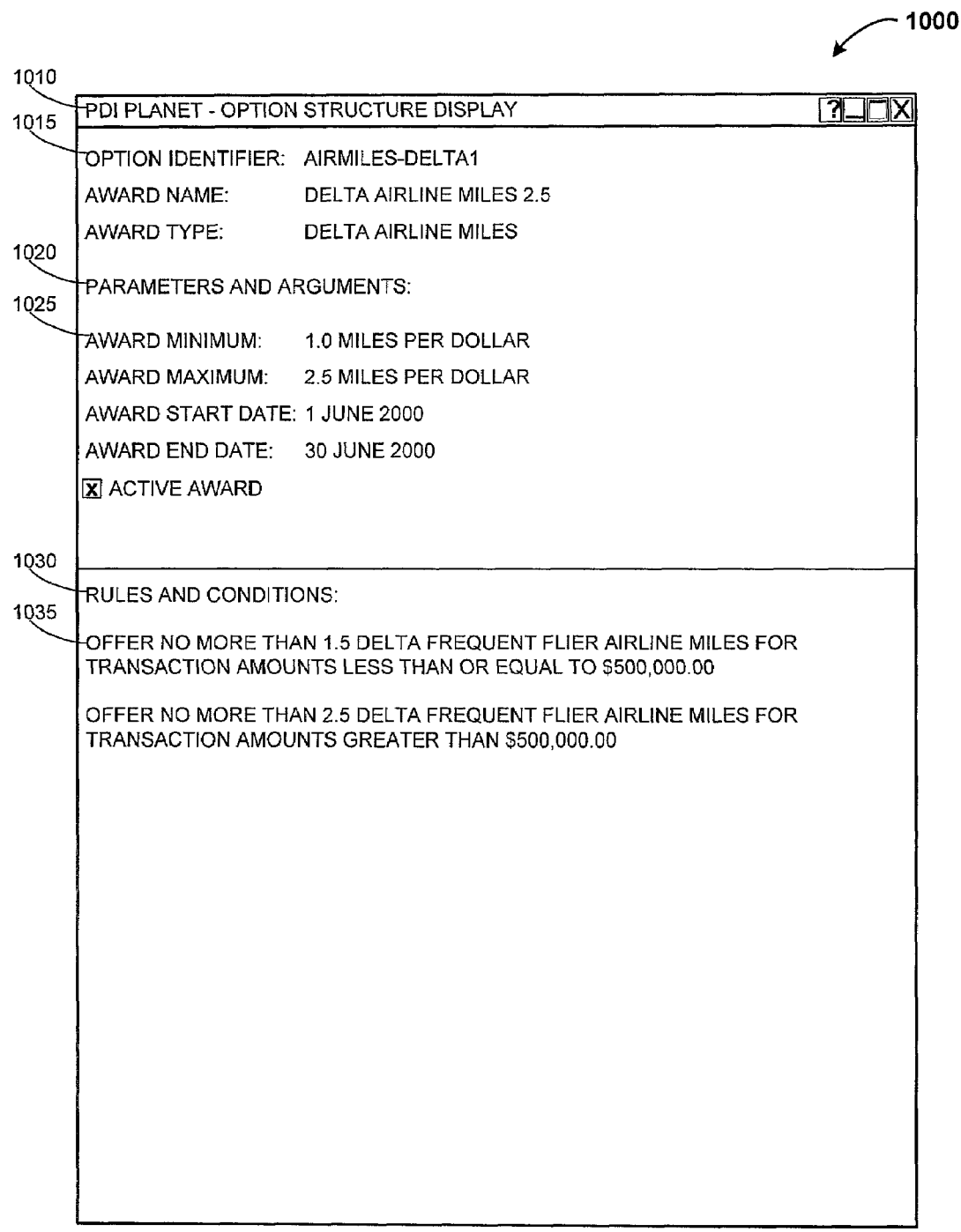
FIG. 10 is an illustration of an option structure's database information as depicted in FIG. 9 and according to the present invention.

Referring now to FIG. 10, therein depicted is an option structure's database information illustrated as a computer system screen display according to the present invention. In particular, screen 1000 resembles a typical computer system screen display as a representation of table 900 (FIG. 9) and record RA1 (FIG. 9) descriptive information, parameters and arguments, and rules and conditions in the form of system information and corresponding notices printed on screen 1000 to indicate the activities requested, the resources available, and the guidelines of operation to be carried out or executed by universal server 1010 in accordance with such system information. As such, screen 1000 is a visual display form that is generated in a conventional way by or on behalf of universal server 1010 and is usually presented via a computer display terminal or such visual display device to universal server 1010 and participating option supplier's who maintain and modify universal option structure 1015. Of course, as display systems have advanced, the present invention certainly envisions the day when universal servers and option suppliers will regularly view or hear their option structure information (and computer system screen displays like screen 1000) conveniently such as by way of personal digital assistants or wireless appliances (e.g., computer systems, Palm Pilot devices, electronic pagers, or data-enabled cellular telephones via cellular telephone networks, the Internet, land based telephone network, etc.). Accordingly, the implementation details necessary to transport or otherwise deliver a screen display like screen 1000 to a recipient or account administrator conveniently using electronic communication devices producing sight, sound, or touch formats will be readily apparent to those skilled in the art.

A parameters and arguments section 1020 includes information about universal option structure 1015's operating parameters and arguments, such as option structure parameter 1025 having a minimum award value of 1.0 Delta airline miles for every dollar of transaction amount. Parameters and arguments section 1020 is reviewed when establishing supply functions and when responding to, or negotiating with, universal transaction and universal account owner acquisition functions by way of universal server 1010 during a transaction in which universal option structure 1015 may be involved and provide appropriate benefits.

The rules and conditions section 1030 is used to establish any conditional expressions or criteria, such as rules and conditions 1035 having a condition that universal option structure 1015 will offer no more than 1.5 Delta airline miles for transaction amounts less than or equal to $500,000.00, that will be incorporated in the production of supply functions to qualify the option offers. In particular, universal server 1010 has a data processing system wherein functions and mathematical operations are retrieved, assembled, produced, and carried out to affect actions, transactions, and accounts by applying the universal option structure 1015's operational data as stored in table 900 (FIG. 9).

It is important to note that the way in which the display of operational data (e.g., rules and conditions) is manifested on screen 1000 can vary depending on design requirements. For example, if the rules and conditions to be applied to a given transaction involve extensive option issuer terms, numerical limits, and effective start and end dates, then screen 1000 may merely show a descriptive option name or function criteria as opposed to the extensive details about the underlying instructions and meticulous application of the function. Additionally, screen 1000 could be produced to indicate past transaction activity, competing offers during a payment or award negotiation event, function identifiers added to descriptive option names, or any other information that is desired and available from table 900 (FIG. 9), other database information tables, or linked information sources.

Referring now to FIG. 11, therein depicted is a TRANSACTION database 1100 as originally depicted in FIG. 2 at reference numeral 285. In particular, database 1100 (hereinafter "table 1100") is a relational database table having a column and row arrangement. The columns indicate the fields stored in table 1100 and the rows contain the data corresponding to individual records stored in table 1100. Table 1100 has a field structure including fields (from table left to right) storing transaction information related to TRANSACTION IDENTIFIER, TRANSACTION TYPE, DATE, TIME, AMOUNT $ (in dollars), AWARD TYPE, CURRENT AWARD, CURRENT OPTION SUPPLIER, and OPTION IDENTIFIER.

The column identified with the label TRANSACTION IDENTIFIER stores data representing the identification codes assigned to the respective transactions and used by universal server processing systems, universal account owners, merchants, option suppliers, payment/award issuers, and other transactions. The TRANSACTION TYPE column stores data related to whether the transaction is a consumer transaction representing activity of a single universal account owner or a universal transaction representing activity involving an aggregation of universal account owners. The DATE column stores data representing a date when the transaction was created or becomes effective for use by the universal server and other parties. The TIME column stores data representing a time when the transaction was created or becomes effective for use by the universal server and other parties. The AMOUNT $ (in dollars) column stores data representing the amount of the transaction. It should be noted that although the field has a title referring to dollars, the present invention is not so limited. The present invention is adaptable to any form of currency, forms of money, or forms of value. The AWARD TYPE column stores data representing the category of an option structure that is preferred in order to satisfy the transaction. The CURRENT AWARD column stores data representing a minimum value that the currently acceptable option structure will provide for a transaction. The CURRENT OPTION SUPPLIER column stores data representing a name, and possibly an account identifier, of the option supplier responsible for the currently acceptable option structure. The OPTION IDENTIFIER stores data representing the option identifier codes (e.g., option identifiers in the present embodiment as shown in FIG. 9) assigned to the respective universal option structures as may be used by universal server processing systems, universal account owners, merchants, option suppliers, payment/award issuers, and transactions.

It should be noted that although single data items are displayed in table 1100 for fields in columns CURRENT AWARD, CURRENT OPTION SUPPLIER, and OPTION IDENTIFIER, the present invention is not so limited. There may be multiple CURRENT AWARDS involved in a transaction as made available by multiple CURRENT OPTION SUPPLIERS which involve multiple OPTION IDENTIFIERS that consequently produce option structure rankings and thus display a ranked list of option structures. Such processing and logic will be readily apparent to those skilled in the art.

Of course, table 1100's field or column structure is simplified here for purposes of brevity; in actual implementation, many more fields may be used to record other transaction data and related information and to record system parameters related to particular records in the database. The layout of table 1100, including its appearance in FIG. 11, will be readily appreciated by those skilled in the art of database management system design and implementation. It should be noted that the columns and their apparent arrangement in table 1100 are merely exemplary to enable one skilled in the art to make and use the present invention; no inferences should be drawn that the table structure (logically or physically) as shown is intended to limit the structure that is ultimately implemented.

Generally, table 1100 shows three records RT1 through RT3. The records stored in table 1100 store information related to, for example, individual point-of-sale or other such transactions involving option structures and option identifiers (e.g., where option identifiers were either presented by an option supplier to a universal server or introduced by a universal server to affect the respective transactions such as by affecting the transaction amount). Of course, as the present invention and embodiment are configured to work within the constraints and capabilities of present day point-of-sale and credit card/debit card transaction processing systems, the present invention would not require table 1100 to store an option identifier in the OPTION IDENTIFIER column; that is, a transaction not involving an option structure will be stored in table 1100 or in some other transaction database table in a conventional and well know way.

Table 1100 shows three records containing information about three different transactions.

More specifically, record RT1 contains information related to a transaction involving a TRANSACTION IDENTIFIER of 122900-0020222 classified as a TRANSACTION TYPE of Consumer that occurred on 29 Dec. 2000 at 11:23 a.m. in the AMOUNT $ amount of $829.00. Additionally, the transaction record indicates that a preferred AWARD TYPE of CASH BACK was sought with a CURRENT AWARD currently acceptable option structure of 1.25% being provided by CURRENT OPTION SUPPLIER Visa using OPTION IDENTIFIER code CASHBACK-1 to indicate the appropriate option structure for the universal server processing system to carry out and execute along with related arguments and conditional expressions. This transaction involved an individual transaction volume such as a transaction amount aggregated over a fixed number of transactions (i.e., one transaction) whereby the option identifier CASHBACK-1 is intended to apply and to affect the transaction and, in particular, the transaction option awards by providing the 1.25% (i.e., indicated as 1.25% cash back to the universal account owner involved in transaction 122900-0020222 as illustrated in related table 900 at record RA3—OPTION IDENTIFIER CASHBACK-1 associated with a SUPPLY FUNCTION OPERATION that when executed produces and allocates a cash back amount). The actions corresponding to providing and allocating 1.25% of the purchase price of $829.00 will be readily apparent to those skilled in the art. However, for purposes of clarity the AMOUNT $ (in dollars) of $829.00 is to be multiplied by 0.0125 to realise a 1.25% cash back amount which will then be allocated to the universal account owner involved in transaction 122900-0020222 according to the transaction amount and thereafter appear on the universal account owner's periodic payment account or collection/redemption account statement. Of course, the present invention contemplates that the option structure corresponding to the particular OPTION IDENTIFIER of CASHBACK-1 could be applied or executed immediately at the universal server processing system possibly without any competitive negotiations involved between the universal server processing system and a Visa processing system and other option suppliers whereby the affected transaction amount of $829.00 would have the cash back option award minimum of 1.0% applied as illustrated in related table 900 at record RA3 AWARD MINIMUM and manifested in the universal server processing system's transaction calculations. Accordingly, the foregoing discussion clearly illustrates the present invention's ability to provide for option structures which may be retrieved, presented, established, negotiated, processed, and executed to affect transactions such as the transaction amounts involved within transactions.

Record RT2 contains information related to a transaction involving a TRANSACTION IDENTIFIER of 122900-0020223 classified as a TRANSACTION TYPE of Consumer that occurred on 29 Dec. 2000 at 11:24 a.m. in the AMOUNT $ amount of $299.74. Additionally, the transaction record indicates that a preferred AWARD TYPE of AIR MILES was sought with a CURRENT AWARD currently acceptable option structure of 2.25 miles for each dollar being provided by CURRENT OPTION SUPPLIER Amex using OPTION IDENTIFIER code FFAM732-2 to indicate the appropriate option structure for the universal server processing system to carry out and execute. This transaction involved an individual transaction volume such as a transaction amount aggregated over a fixed period of time (i.e., one second) whereby the option identifier FFAM732-2 is intended to apply and to affect the transaction and, in particular, the transaction option awards by providing the 2.25 airline miles (i.e., indicated as 2.25 airline miles to the universal account owner involved in transaction 122900-0020223 as associated with a SUPPLY FUNCTION OPERATION that when executed produces and allocates a frequent flier airline mile amount). The operations corresponding to providing and allocating 2.25 airline miles for the purchase price of $299.74 will be readily apparent to those skilled in the art. However, for purposes of clarity the AMOUNT $ (in dollars) of $299.74 is to be multiplied by 2.25 to realise a 2.25:1 airline mile to dollar ratio amount (i.e., 674.415) which will then be allocated to the universal account owner involved in transaction 122900-0020223 according to the transaction amount and thereafter appear on the universal account owner's periodic payment account or collection/redemption account statement. Accordingly, the foregoing discussion clearly illustrates the present invention's ability to provide for functions which may be retrieved, presented, established, negotiated, processed, and executed to affect transactions such as the transaction award values involved within transactions.

Record RT3 contains information related to a transaction involving a TRANSACTION IDENTIFIER of 122900-0020224 classified as a TRANSACTION TYPE of Universal that occurred on 29 Dec. 2000 at 11:25 a.m. in the AMOUNT $ amount of $98,274.65. Additionally, the transaction record indicates that a preferred AWARD TYPE of 0% APR was sought with a CURRENT AWARD currently acceptable option structure of 0% for 3 months being provided by CURRENT OPTION SUPPLIER Discover using OPTION IDENTIFIER code APR726H1 to indicate the appropriate option structure for the universal server processing system to carry out and execute. This transaction involves an aggregate transaction volume such as a transaction amount aggregated over a period of time whereby the option identifier APR726H1 is intended to apply and to affect the transaction and, in particular, the transaction option awards by providing the 0% APR for 3 months (i.e., indicated as 0% APR for 3 months to the universal account owners involved in transaction 122900-0020224 as associated with a SUPPLY FUNCTION OPERATION that when executed produces and allocates a 0% APR for 3 months on the transaction amounts). The appropriate logic and operations corresponding to providing and allocating 0% APR for 3 months to the individual universal account owners will be readily apparent to those skilled in the art. However, for purposes of clarity the 0% APR for 3 months will be allocated to all the universal account owners involved in transaction 122900-0020224 and thereafter appear on the universal account owner's periodic payment account or collection/redemption account statement. Accordingly, the foregoing discussion clearly illustrates the present invention's ability to provide for functions which may be retrieved, presented, established, negotiated, processed, and executed to affect transactions such as the interest accrual and charge dates involved within transactions.

In this way, the present invention, by utilising conventional payment and settlement processing systems and incentive award processing systems in a novel way, will allow universal account owners, merchants, option suppliers, and payment/award issuers to self-specify preferences, transaction traits, and operating parameters at the transaction level thereby mitigating unnecessary business and marketing efforts to promote incentive awards that are not in demand by the marketplace or eliminating the guesswork of metrics (e.g., offering 2 airline miles versus 3 airline miles per dollar when sufficient consumer business can be attracted with 2.31 miles).

Record RT3 in conjunction with table 900, illustrates the flexibility of the present invention in terms of the option identifiers that may be used and processed to ultimately effectuate certain affects on transactions. It should be clear that all that is required of an option identifier is that the same be mapped (e.g., configured as a key in a database system to indicate other related data) to a specific supply function that is to be executed to bring about a certain result. In other words, record RT3 illustrates that a transaction can be processed as usual and can be enhanced by allowing an option identifier to be entered at a universal server processing system and mapped to a corresponding supply function maintained by an option issuer or payment/award issuer to result in a definite and certain affect on the transaction and the accounts to which the transaction relates.

Based on the foregoing specific discussion of table 1100 and, in particular, records RT1, RT2, and RT3, it should be readily appreciated that functions according to the present invention are used to affect transactions and accounts. It should be noted, however, that the actions that must be carried out or executed to bring about the functionality corresponding to particular functions will be readily apparent to those skilled in the art of computer programming. For example, discounts will involve the mathematical multiplication of a transaction amount by a discount factor (e.g., 5% or 10%), whereas dollars-off discounts will usually involve the mathematical subtraction of a specified sum from a transaction amount. Special buying incentives such as reduced interest rate programs will involve the multiplication and compounding of interest at specified rates versus standard applied interest rates. Moreover, the actual functions that are to affect transactions may be set by mechanisms such as pre-purchased discounts as purchasing incentives and the like, and by credit card issuers as incentives to utilise or activate credit card or merchant processing accounts. In any event, the functions contemplated by the present invention are intended to be processed utilising conventional and readily available payment and settlement processing systems and incentive award processing systems that allow for the entry and exchange of alphabetic, numeric, and symbolic data or any combination thereof.

The fields and columns not specifically mentioned above will be readily apparent to those skilled in the art of database design and implementation. It should be understood that the column structure shown in table 1100 is merely exemplary and not intended to restrict the present invention; those skilled in the art of database management system design and implementation may make many changes including the addition or deletion of fields or columns to effectuate particular system functionality and the like.

Referring now to FIGS. 12A-12D, therein depicted are flow charts illustrating a preferred embodiment of a process for processing or otherwise executing incentive and award supply and acquisition functions along with producing, applying, and recording results within a universal server processing system utilising point-of-sale data entry systems, or other data entry mechanisms, such as system 100 depicted in FIG. 1. The process depicted in FIGS. 12A, 12B, 12C, and 12D is, in part, intended to be carried out by the data processing system illustrated as system 200 in FIG. 2 and described above and also is, in part, intended to be carried out by option suppliers (FIG. 1 reference numeral 145) and payment/award issuers (FIG. 1 reference numeral 165) as connected to data processing system 200 illustrated in FIG. 2. The process depicted in FIGS. 12A-12D also is intended to illustrate the steps carried out by a universal cardholder, a merchant, a universal server, option suppliers, and payment/award issuers during a transaction. Moreover, the process depicted in FIGS. 12A-12D contemplates the use and operation of functions based on option identifiers, option structures, account identifiers, and account information that are retrieved or presented and processed during a transaction. Of course, the term "identifiers" in this context is meant to indicate identification codes that correspond to data records establishing, for example, particular supply and acquisition functions to be carried out to affect a transaction in a specified way.

More particularly, the process depicted in FIGS. 12A-12D is intended to enable a system and process to obtain incentives and awards by establishing and executing payment, discount, and incentive supply functions and payment, discount, and incentive acquisition functions that ultimately identify preferred incentives and awards and then determine appropriate payment and redemption accounts for use to acquire and utilise said incentives and awards and then produce relevant items of said payment and redemption accounts for delivery to related parties in a transaction. As a consequence of obtaining incentives and awards, good and valuable consideration is delivered to a creditor or multiple creditors, or an exchange partner or multiple exchange partners, thus affecting and concluding a transaction. By such actions, universal account owners acquire option offers during their transactions for either immediate or delayed use and for appearance of such option structure notices on the universal cardholder's periodic statements.

Processing starts at Step P12-1 and immediately proceeds to Step P12-2 where a universal account owner provides, for example, a merchant with a universal account identifier during the course of a transaction. It should be noted that a universal account owner may deliver their universal account identifier by various methods (e.g., plastic embossed card, magnetic stripe card, merchant scanning of a bar code on media, infrared beam, cellular telephone transmission to a merchant receiving site, etc.). It is also contemplated as another embodiment that a universal account owner may deliver their universal account identifier directly to a universal server processing system along with a merchant or universal account owner agreed-and-generated transaction identifier (it is expected that both parties use the same transaction identifier to reference the same transaction) and the merchant may deliver their merchant identifier along with other related transaction information, such as the transaction amount and the agreed-and-generated transaction identifier, directly to a universal server processing system for correlation and integration in order to execute functions and settle transactions using such separate data communication methods when, for example, merchant data connections to payment processing networks are not available but voice-enabled public switched telephone network connections are available. For example, the universal account owner may call a universal server and input into a voice response unit (VRU) their universal account identifier along with a merchant account identifier, a transaction amount, and other transaction and verification information in order to have appropriate functions executed that will ultimately transfer suitable value to the merchant's account in order to settle a transaction and also allow a merchant to call a universal server and verify by using a VRU that suitable value has been transferred to the merchant's account by the universal account owner. As another example, the merchant may transmit transaction information to a universal server and provide the consumer with a transaction identifier. The consumer may call a VRU with either their cellular phone or any landline telephone and enter their universal account identifier along with the transaction identifier and confirm that the transaction is to be settled. The universal server delivers to the merchant an authorisation code and thus completes the transaction.

Thereafter, processing then proceeds to Step P12-3 where the merchant enters transaction information such as a merchant identifier, a transaction amount, product identifiers, and the universal account identifier into a point-of-sale (POS) workstation or other data entry device as discussed above in regard to FIG. 1 and transmits said information to a universal server.

Next, processing then proceeds to Step P124 where the universal server's central controller or data processing system 200 receives the transaction information entered and transmitted by the merchant during Step P12-3.

Thereafter, at Step P12-5, the universal server processing system will determine if the universal account identifier and the associated account are valid (e.g., is the universal account identifier one that was issued by a universal account issuer, etc.). If not, the transaction will be aborted in a conventional way at Step P12-6.

If the universal account is valid, processing proceeds to Step P12-7, where information related to the universal account owner, merchant, and option suppliers is retrieved from system 200 database storage device 260 (FIG. 2) or from other linked payment and data networks storage devices.

Next, at Step P12-8, the universal server central controller will establish individual and aggregate transaction volume data records that it has received and then partition such information by preferred option items and various attributes and other requirements of the universal account owner, merchant, and option suppliers (e.g., universal account owners seeking airline miles, transaction amounts of universal account owners with a MasterCard, credit rating of account owners, etc.).

Figure 12A:
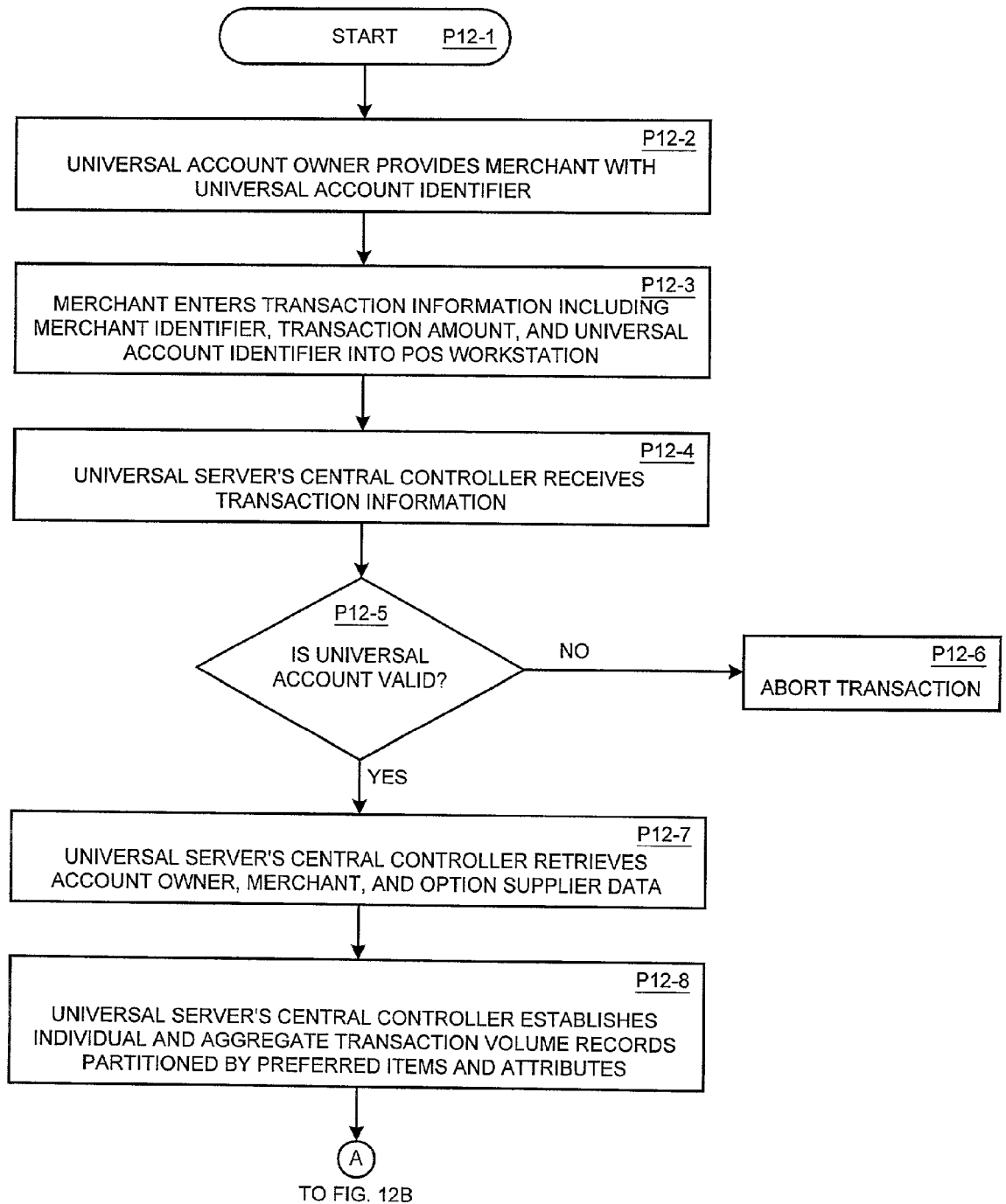
FIG. 12A is a flow chart illustrating a process carried out according to a referred embodiment of the present invention.
Figure 12B:
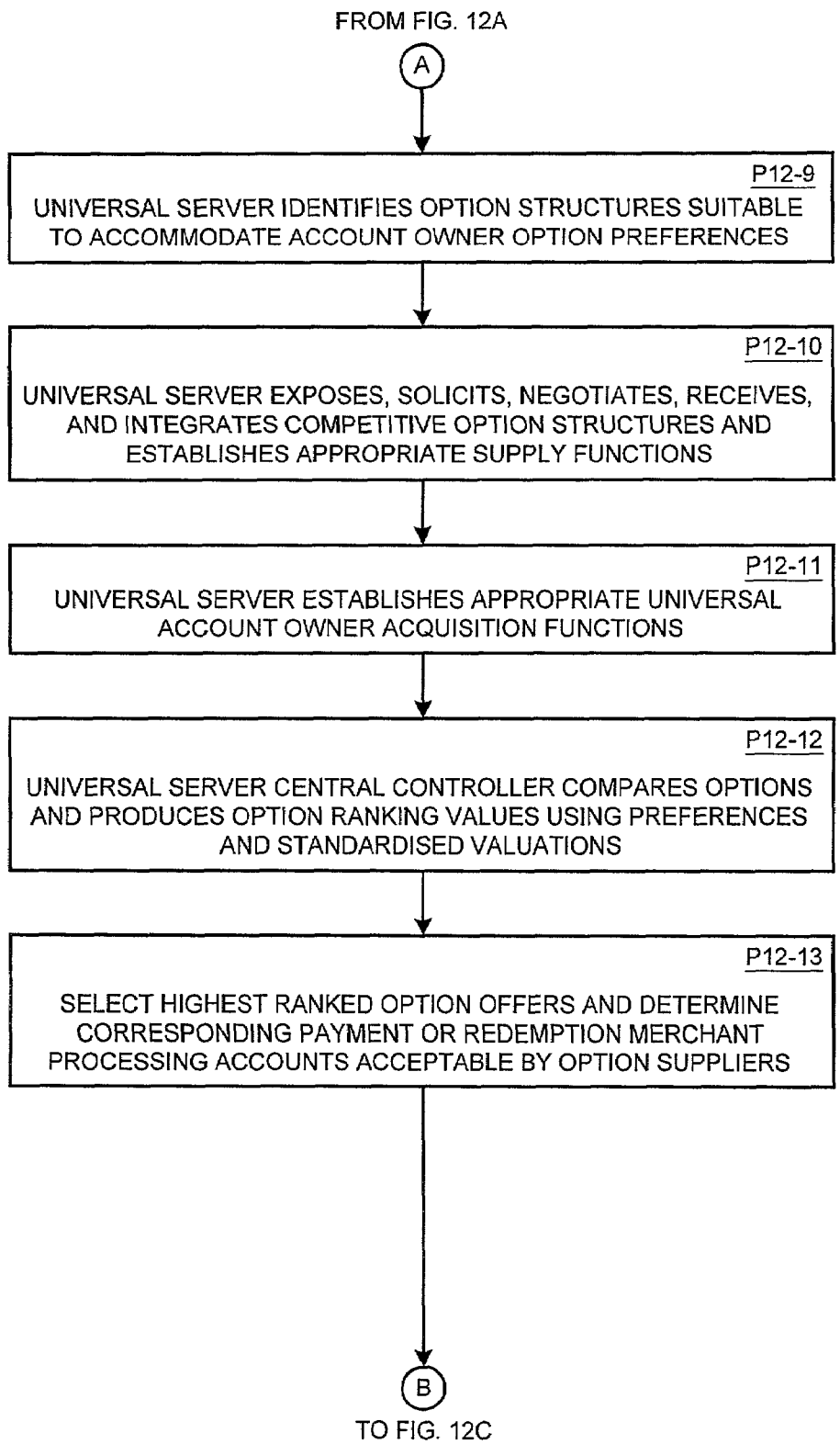
FIG. 12B depicts further steps carried out by the process started in FIG. 12A.

Processing then proceeds to Step P12-9 at the top of FIG. 12B. There, the universal server central controller will review option structure database 280 (FIG. 2) and option supplier database 275 (FIG. 2) and make a determination as to which option structures and option suppliers are suitable to accommodate the universal account owner's option preferences.

Thereafter, at Step P12-10, the universal server central controller will expose, publish, or transmit information (e.g., using the XML programming language and standards-based data definition tags or possibly as entries into database table records) and then solicit or negotiate competitive option structures with related option suppliers that will be received and integrated into system 200 (FIG. 2) in order to establish appropriate supply functions.

At Step P12-11, the universal server central controller establishes appropriate acquisition functions based on the operational data as contained in the universal account owner's database table record and other system database tables.

Processing proceeds to Step P12-12 where the universal server central controller compares available and applicable option structures and then produces option ranking values based on such factors as, for example, requested preferences, best available options, and standardised valuation of disparate options.

Next, at Step P12-13, the universal server central controller selects the highest ranked option offers and then determines the corresponding payment or redemption merchant processing accounts (i.e., FIG. 6 reference numeral 635) that are acceptable for award processing by the option suppliers.

Figure 12C:
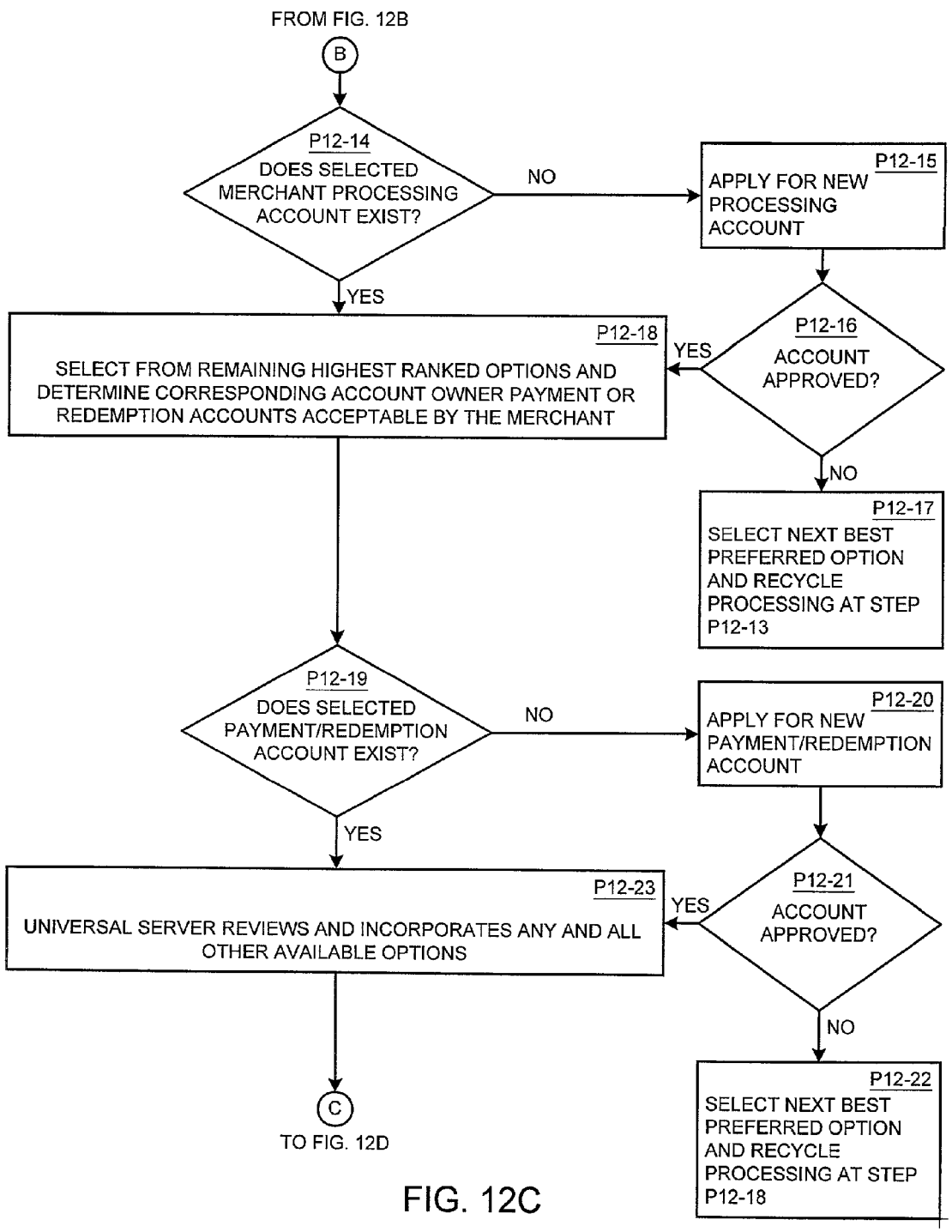
FIG. 12C depicts further steps carried out by the process started in FIG. 12A.

Processing then proceeds to Step P12-14 at the top of FIG. 12C. There, a determination will be made as to whether the merchant has the corresponding payment or redemption merchant processing account. If the merchant has the corresponding accounts, processing will proceed to Step P12-18.

Otherwise, at Step P12-15, if the merchant does not have the corresponding payment or redemption merchant processing account and the merchant has allowed for the automatic application request of merchant processing accounts then, the universal server central controller will either activate a pre-approved merchant processing account or apply for the required merchant processing account. If the merchant does not allow an automatic application to be submitted, then processing will be handled by a fixed cycle of reentry requests continuing at Step P12-13 selecting the next highest ranked option offer until a suitable merchant processing account is determined, or for the transaction to be aborted in a conventional way. At Step P12-16, a determination is made if a new merchant processing account is approved and if an account is approved, processing continues at Step P12-18. Otherwise, processing continues at Step P12-17 where the process will be handled by a fixed cycle of re-entry requests continuing at Step P12-13 selecting the next highest ranked option offer until a suitable merchant processing account is determined, or for the transaction to be aborted in a conventional way.

Thereafter, at Step P12-18, the universal server central controller selects the highest ranked option offers remaining after the appropriate merchant processing accounts have been determined in Steps P12-13 through P12-17 above, and then the universal server central controller determines the corresponding universal account owner payment or redemption accounts (i.e., FIG. 4 reference numeral 435) that are acceptable for option processing by the merchant.

Processing then proceeds to Step P12-19. There, a determination will be made as to whether the universal account owner has the corresponding payment or redemption accounts. If the universal account owner has the corresponding accounts, processing will proceed to Step P12-23.

Otherwise, at Step P12-20, if the universal account owner does not have the corresponding payment or redemption accounts and the universal account owner has allowed for the automatic application request of payment or redemption accounts then, the universal server central controller will either activate a pre-approved payment or redemption account or apply for the required payment or redemption account. If the universal account owner does not allow an automatic application to be submitted, then processing will be handled by a fixed cycle of re-entry requests continuing at Step P12-18 selecting the next highest ranked option offer until a suitable payment or redemption account is determined, or for the transaction to be aborted in a conventional way. At Step P12-21, a determination is made if a new payment or redemption account is approved and if an account is approved, processing continues at Step P12-23. Otherwise, processing continues at Step P12-22where the process will be handled by a fixed cycle of re-entry requests continuing at Step P12-18 selecting the next highest ranked option offer until a suitable payment or redemption account is determined, or for the transaction to be aborted in a conventional way.

Next, at Step P12-23, the universal server central controller will execute a fixed cycle of re-entry requests to determine if there are other available options available to the universal account owner (e.g., FIG. 4 reference numeral 465) such as, for example, in addition to a credit card issuer providing frequent flier airline miles the merchant also is offering a 10% storewide purchase discount on the day of the transaction. It should be noted that option supplier active awards, merchant available awards, and universal account owner earned awards and the associated supply and acquisition functions of said awards may be executed to affect a transaction in multiple ways and such multiple supply and acquisition functions may be executed in any order to realise combined effects. The processing that occurs to allow the application of multiple functions involves iterative and interactive type processing and will be readily appreciated by those skilled in the art of computer programming.

Figure 12D:
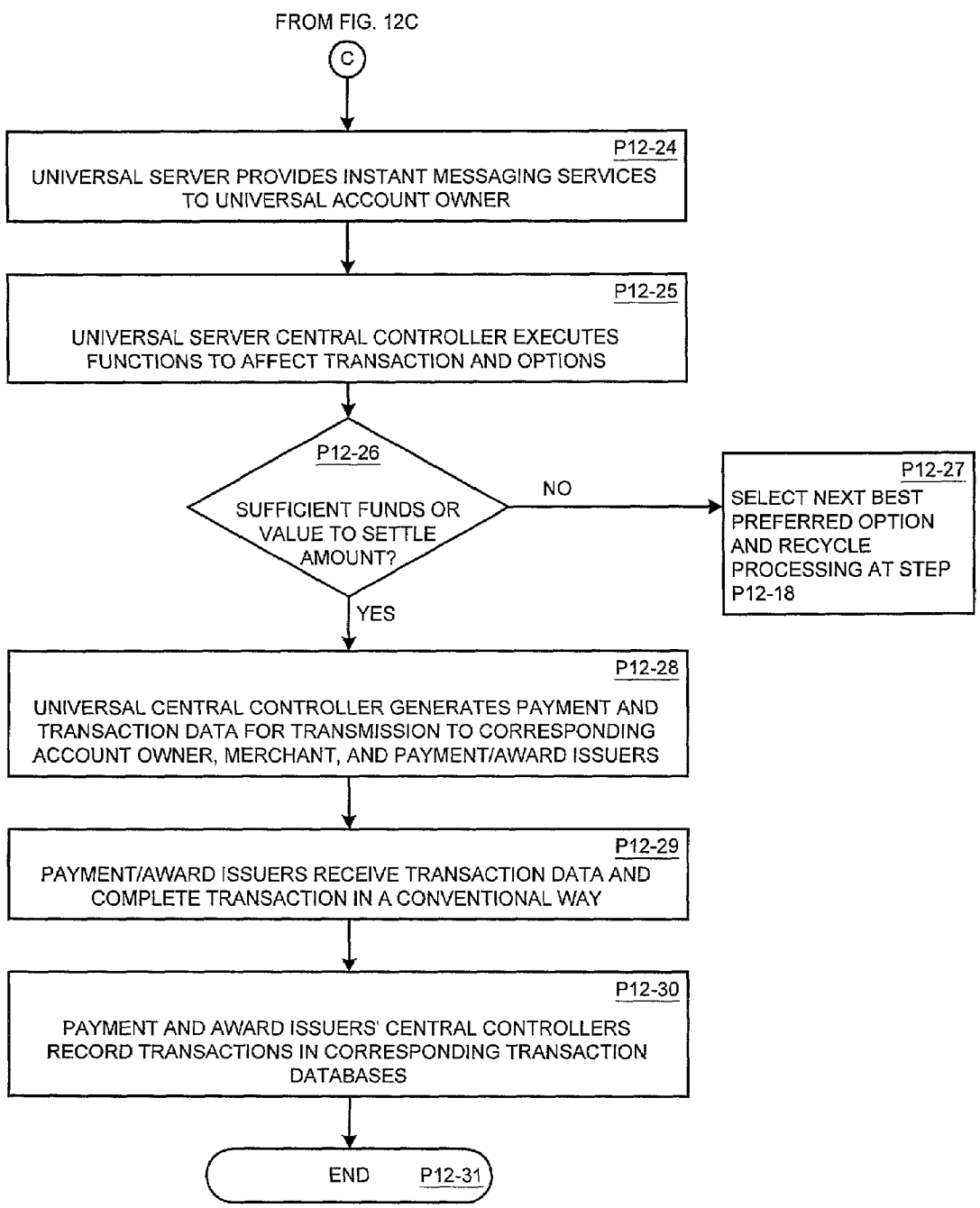
FIG. 12D depicts further steps carried out by the process started in FIG. 12A.
Figure 14:
FIG. 14 is an illustration of an account owner's communication and transaction messaging device display according to the present invention.

Processing then proceeds to Step P12-24 at the top of FIG. 12D. There, the universal server central controller will provide instant messaging services to the universal account owner (e.g., FIG. 1 reference numeral 150), and possibly other related parties. An example of an instant message display according to the present invention is depicted in FIG. 14 and relates to the presentation of a universal account owner notification. Such instant messages may involve such notifications as, for example, instructions to decline the collision damage waiver coverage premium for a rental car contract since the payment account selected will automatically provide such insurance coverage.

If there is an option identifier mapping, as determined from database operations on a database table such as table 900, processing proceeds to Step S12-25, where the universal server's data processing system 200 will execute the function actions corresponding to the option identifier and carry out necessary commands (e.g., mathematical multiplication, etc.) to calculate, for example, a discounted price, or some other effect on the transaction thereby directly affecting the transaction during the POS transaction.

At Step P12-25, the universal server central controller data processing system 200 (FIG. 2) executes corresponding functions and system functions after all available options are committed along with the assemblage of payment methods and offsetting redemption options in order to acquire and apply the committed payments, redemptions, incentives, and options and consequently affect the transaction and accounts. At this point, it should be noted that the universal server could also be a party that may apply a supply function to a given transaction to bring about a certain result. The present invention is not restricted to having only the option suppliers determine to use a supply function or not. Such operations will be apparent to those skilled in the art of computer programming and, in particular, database management system programming.

Thereafter, at Step P12-26, a determination is made as to whether there is sufficient funds or credit available to absorb the net transaction amount after discounts and options have been applied. If not, processing will continue at Step P12-27 where the transaction will be handled by the execution of some fixed cycle of re-entry requests continuing at Step P12-18 to select another payment account identifier until all payment and redemption accounts are depleted. It should be noted that partial amounts may be assigned to payment accounts that do not have a sufficient balance available and the remaining transaction net amount assigned to another payment account. In such cascading fashion, multiple payment accounts may be used to settle one transaction as long as there is sufficient funds, value, or credit available among the collective accounts. If all payment and redemption accounts are depleted with a net transaction amount still unresolved, the transaction would be aborted in a conventional way. Otherwise, if there is sufficient funds, value, or credit available, processing continues at Step P12-28.

At Step P12-28, the universal server central controller generates corresponding payment and transaction data for transmission to the appropriate payment and award issuers selected in previous steps as well as, possibly, the merchant and universal cardholder for notifications and, possibly, interactive services.

Next, at Step P12-29, the payment and award issuers receive the transaction information along with such items as the affected amount and option identifiers and then proceed to complete the transaction in a conventional way (e.g., via credit card transaction systems known in the art). A credit card issuer's data processing system may generate an authorisation code and transaction information and transmit the same and, possibly, the discounted price or the affected transaction amount to the merchant 120's POS workstation (FIG. 1). The merchant receives the authorisation code and transaction information and, possibly, a discounted price and completes the transaction in a conventional way.

At Step P12-30, the payment (e.g. credit card transaction) and award issuer's data processing systems record the transaction and related option identifiers in appropriate transaction databases for later processing during a billing or periodic statement cycle.

Processing ends at Step P12-31.

It is important to note that the process depicted in FIGS. 12A-12D clearly illustrates the ability of the present invention to allow for entry of a benefit option identifier at the time of a transaction by utilising conventional credit card transaction systems, payment and settlement processing systems, and incentive award processing systems and related networks. Moreover, an option identifier entered at the universal server may be either entered by an option supplier (e.g., a merchant that had earlier entered a particular type of option structure into an option structure database table) or by a universal cardholder (e.g., electronic coupon clipping as entered into a universal account owner's database table record) to affect the transaction and, in particular, the transaction amount. The affect on the transaction, as discussed in detail above, may involve a price discount or the like which can occur during the course of the transaction as opposed to realising an effect on a transaction and billing statement later in time.

Figure 13:
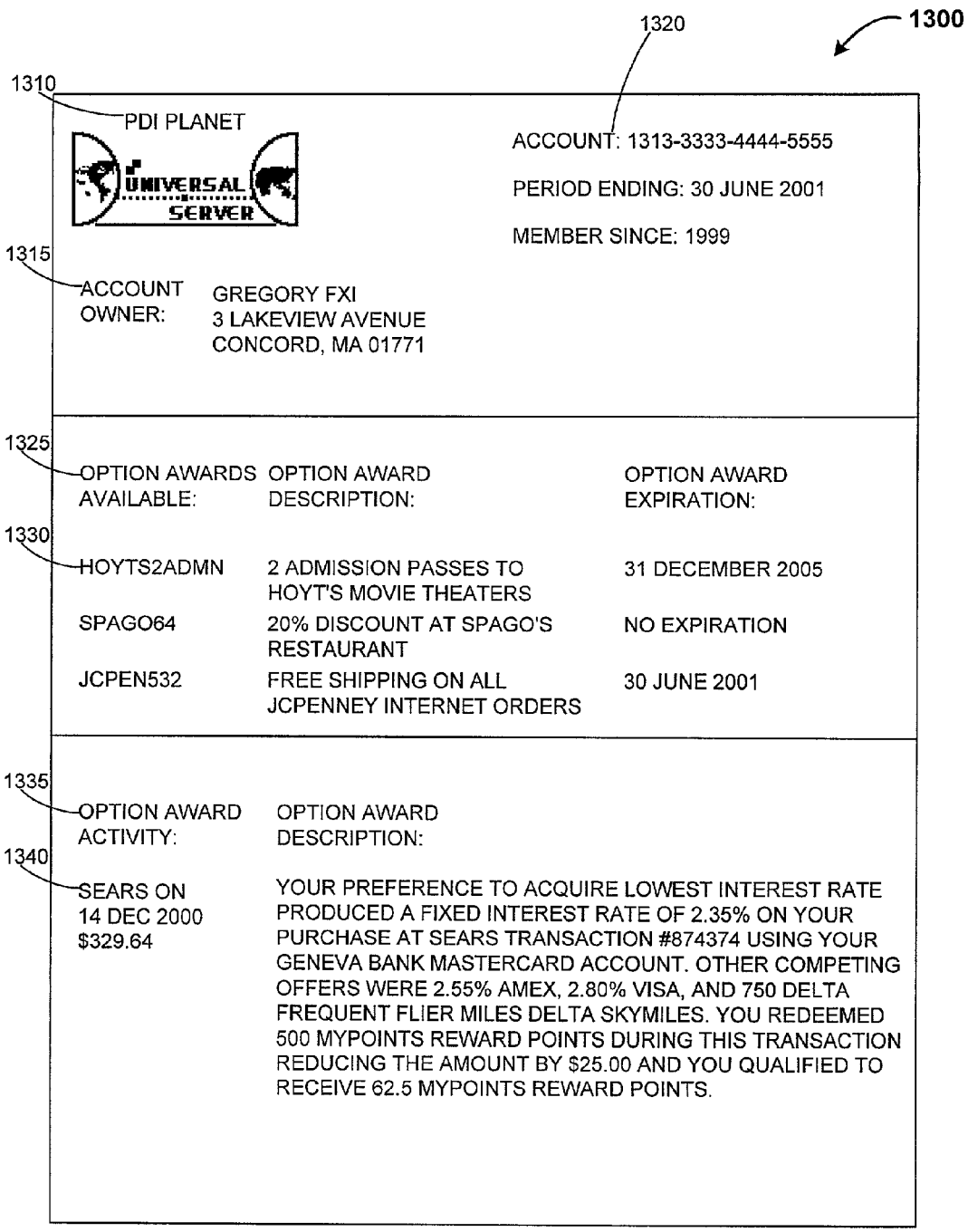
FIG. 13 is an illustration of a universal account owner's periodic information statement according to the present invention.

Referring now to FIG. 13, therein depicted is a universal account owner's periodic information statement according to the present invention. In particular, statement 1300 resembles a typical monthly information statement with the addition of option structure data in the form of identifier information and corresponding notices printed on statement 1300 to indicate the activities carried out or executed by universal server 1310 in accordance with that option information. As such, statement 1300 is a paper form that is generated in a conventional way by or on behalf of universal server 1310 and is usually sent via a mail service to universal account owner 1315 who is the owner of an account 1320. Of course, as statement and billing systems have advanced, the present invention certainly envisions the day when consumers will regularly receive their statements like statement 1300 electronically such as, for example, by way of a network (e.g., via the Internet, the telephone network, etc.). Many banks such as CitiBank now offer private network-based transport of financial account details and statements. Accordingly, the implementation details necessary to transport or otherwise deliver a periodic information statement like statement 1300 to a recipient or account owner electronically will be readily apparent to those skilled in the art.

An option awards available section 1325 includes information about option offers that have been acquired or that are available to the universal account owner 1315. In particular, option identifier 1330 HOYTS2ADMN is available to provide two free pass admissions at a Hoyt's movie theater. Universal account owner 1315 may use any such option offers at his next transaction at any merchant who accepts his universal account to receive the benefits of the applicable option offers. Functions represented by option awards available section 1325 will allow payment issuers (e.g., credit card issuers) and merchants to realise increased card use and purchasing, respectively.

An option award activity section 1335 includes information about a transaction in which universal account owner 1315 used his universal account at a point-of-sale purchase 1340 at a SEARS store having reference transaction number 874374. Moreover, the purchase amount or transaction amount was $329.64 and was affected by an option offer in order to realise a low fixed interest rate of 2.35% APR using the Geneva Bank MasterCard. In addition, other competing option offers at the time of the transaction can be seen in the notice information. The transaction also redeemed 500 MyPoints reward points to realise a discount and acquired 62.5 MyPoints rewards points for the transaction amount.

It is important to note that the way in which the affect of a particular option (e.g., 10% off) is manifested on statement 1300 can vary depending on design requirements. Additionally, statement 1300 could be produced to indicate the original price, the affected price, or any other information that is desired and available from, for example, table 1100 (FIG. 11), other database information tables, or linked information sources.

Referring now to FIG. 14, therein depicted is a communication or message display according to the present invention. In particular, display 1400 resembles a typical handheld (e.g., Palm VII) information display with the addition of option and transaction data in the form of identifier information and corresponding notices output on display 1400 to indicate the settlement solutions and automatically selected and provisional activities for delivery and execution by universal server 1410 in accordance with universal account and option structure information. As such, display 1400 is a visual display that is generated in a conventional way by or on behalf of universal server 1410 and may be sent via wireless transmission services to the universal account owner. Of course, the present invention certainly envisions using other communication services such as, for example, Internet e-mail and audio telephone connections, for the universal account owner to receive notice of automatically selected and provisional use determinations like display 1400. Accordingly, the implementation details necessary to transport or otherwise deliver an information display like display 1400 to an account owner electronically using various mediums will be readily apparent to those skilled in the art.

Information regarding a universal account owner's transaction with merchant 1415 will be communicated using, for example, instant messaging services to the universal account owner upon completion of appropriate supply and acquisition functions being executed by universal server 1410 and prior to actual deliver of payment and redemption accounts, and such relevant account objects and items, to payment and award issuers. It should be noted that a universal account owner may establish settings related to the use of instant messaging services such as, for example, that no instant messaging services are to be used, all account activity is to be communicated, or that only transactions above a certain amount or using certain accounts are to be communicated. Such messaging services provide numerous advantages to the user such as, for example, safeguarding against identity theft and fraudulent payments.

A first preference section 1420 includes information about the universal account owner's first preferred option. In particular, first preference section 1420 lists that airline miles are to be obtained and also lists two option suppliers providing option structures that comply with the universal account owner's acquisition functions. It may be seen that the American Express airline mile offer of 2.8747 miles was determined as the most significant and recommended by universal server 1410 and as such is displayed at the top of the listing and the item is shown as being selected according to option selection 1425. It should be noted that other ranking indicators could also be applied to the displayed items such as, for example, using prefix numerals, letters, or colours. As can be seen, the American Express offer was not the only offer available for use by this transaction. Delta SkyMiles also offered an award of airline miles, but its metric is less than the American Express metric resulting in its non-selection. In addition, other option suppliers provided option offers addressing the second preference section 1430. Since universal server 1410 will attempt to furnish the universal account owner with option offers matching their preferences in priority order, all option offers may be displayed to the universal account owner, but option offers not addressing the highest ranked preferences will be displayed as option not-selected 1435 items. The universal account owner may freely modify the option selection/not-selected indicators (i.e., option selection 1425 and option not-selected 1435) should they choose to do so. If the universal account owner decides to modify any displayed automatic recommendations and selections, then the appropriate display 1400 items that may be affected by the changes (e.g., amount totals) and the overall display would be updated accordingly.

It should be noted that a universal account owner may establish, store, and utilise more than one benefit profile. A business profile option selection 1465 is active for use in this message display. The universal account owner may freely modify the option selection/not-selected profile indicators should they choose to do so. If the universal account owner decides to modify the profile selection indicators, then the appropriate display 1400 items that may be affected by the change (e.g., item selections, amount totals) and the overall display would be updated accordingly.

A redeemable option items section 1440 displays accrued option items that the universal account owner possesses and may utilise in the transaction with merchant 1415. It can be seen that universal server 1410 has identified and recommended the use of both a 10% purchase discount and the redemption of 625 MyPoints reward points to affect the transaction amount.

A transaction as selected section 1445 combines the entire transaction amount effects as selected and provides a consolidated review of the provisional use determinations. The universal account owner may accept the automatic recommendations and selections as presented, and by so doing, the original transaction amount of $145.97 could be reduced by option items available in redemption accounts to a netamount of $112.62 and by delivering the universal account owner's American Express account identifier for payment, then the items to be acquired section 1450 details the option offers that would be obtained.

After the universal account owner has reviewed display 1400, the selected option offers and associated payment and redemption accounts may be advanced for processing by the account owner by pressing command process button 1455, or otherwise advancing the final selections to universal server 1410 for delivery and further processing of the transaction. Should the universal account owner choose to receive further information or assistance with the option offers and other transaction elements, the universal account owner may contact universal server 1410 by pressing command contact button 1460, or otherwise petitioning universal server 1410 to respond for further communications. It should be understood that if the universal account owner indicated that no instant messaging services were to be utilised, then the automatic selections and determined activities of the universal server central controller would be immediately advanced for delivery and further processing of the transaction.

Figure 15A:
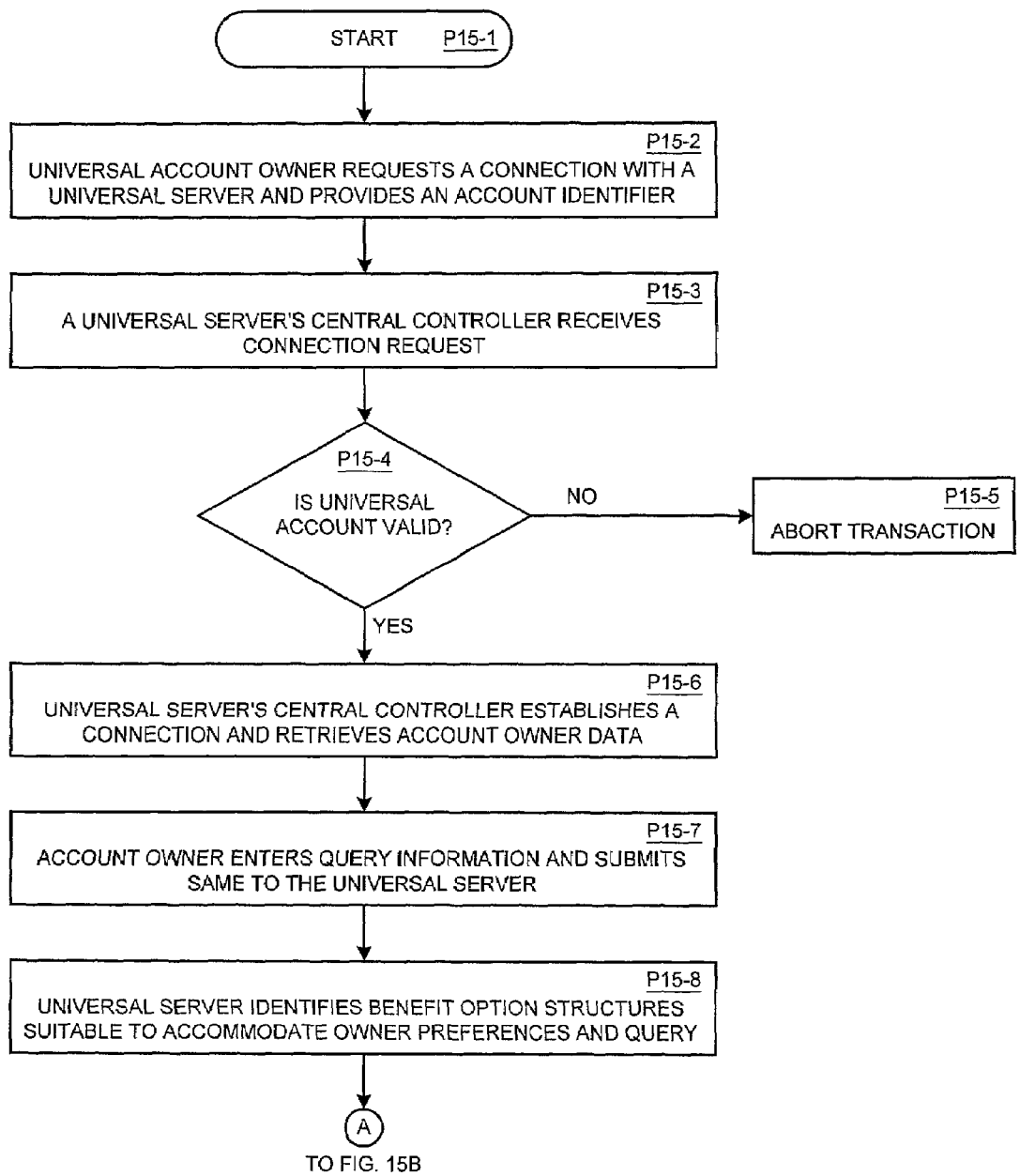
FIG. 15A is a flowchart illustrating a query process carried out according to a preferred embodiment of the present invention.
Figure 15B:
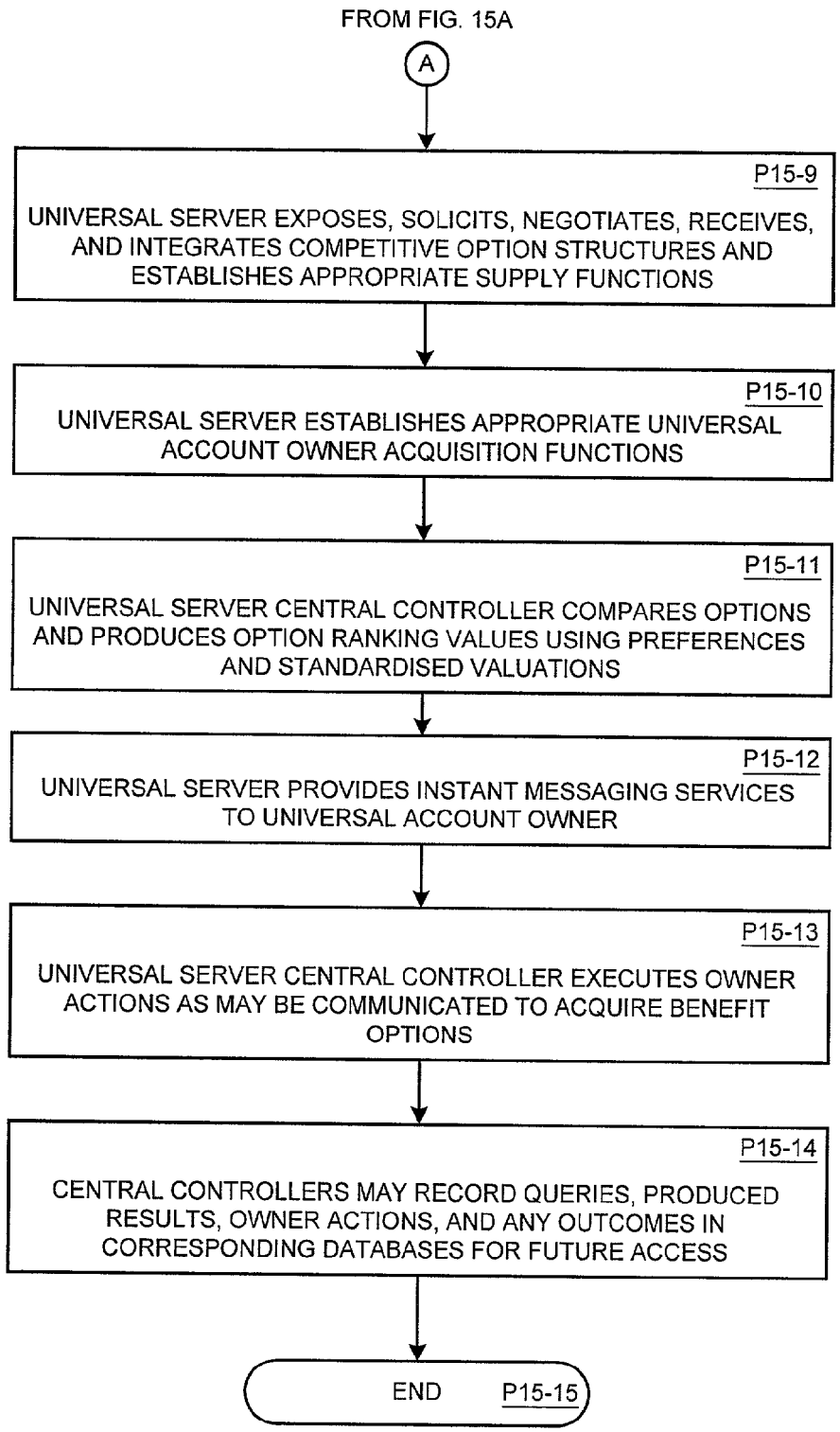
FIG. 15B depicts further steps carried out by the process started in FIG. 15A.

Referring now to FIGS. 15A-15B, therein depicted are flow charts illustrating a preferred embodiment of a query process for processing or otherwise executing incentive and award supply and acquisition functions along with producing, displaying, and recording results within a universal server processing system utilising data entry mechanisms, such as system 100 depicted in FIG. 1, that may be wired or wirelessly connected. The process depicted in FIGS. 15A and 15B is, in part, intended to be carried out by the data processing system illustrated as system 200 in FIG. 2 and described above and also is, in part, intended to be carried out by option suppliers (FIG. 1 reference numeral 145) and payment/award issuers (FIG. 1 reference numeral 165) as connected to data processing system 200 illustrated in FIG. 2. The process depicted in FIGS. 15A-15B also is intended to illustrate the steps carried out by a universal cardholder, a universal server, option suppliers, and payment/award issuers during a query transaction. Moreover, the process depicted in FIGS. 15A-15B contemplates the use and operation of functions based on option identifiers, option structures, account identifiers, and account information that are retrieved or presented and processed during a query transaction.

Of course, the term "identifiers" in this context is meant to indicate identification codes that correspond to data records establishing, for example, particular supply and acquisition functions to be carried out to affect a query transaction in a specified way.

More particularly, the process depicted in FIGS. 15A-15B is intended to enable a system and process to indicate incentives and awards by establishing and executing payment, discount, and incentive supply functions and payment, discount, and incentive acquisition functions that ultimately identify preferred incentives and awards and then determine appropriate linkages and means to acquire and utilise said incentives and awards and then, as may be required, produce relevant items of said produced solutions or payment and redemption accounts for delivery to related parties in a transaction. By engaging such produced solutions, universal account owners are able to perform actions and thus acquire benefit option offers during transactions for either immediate or delayed use and for appearance of such option structure notices on the universal cardholder's periodic statements. For example, a produced benefit solution may indicate that the universal account owner needs to manually indicate on a car rental form that they decline optional collision insurance coverage since the credit card used as payment provides such extended collision coverage.

Processing starts at Step P15-1 and immediately proceeds to Step P15-2 where a universal account owner transmits a request, for example, to establish a connection with a universal server processing system and provides their universal account identifier to initiate a query transaction. It should be noted that a universal account owner may deliver their universal account identifier by various methods (e.g., manual keypad entry, smart electronic card, magnetic stripe card, optically scanned bar code, infrared beam, cellular telephone transmission to a receiving site, etc.) and connect by various means (e.g., the Internet, telephone networks).

For example, the universal account owner may call a universal server and input into a voice response unit (VRU) their universal account identifier along with query transaction information in order to have appropriate functions executed that will produce benefit solutions and ultimately transfer produced solution information to the universal account owner.

Next, processing then proceeds to Step P153 where the universal server's central controller or data processing system 200 receives the query transaction information entered and transmitted by the universal account owner during Step P15-2.

Thereafter, at Step P154, the universal server processing system will determine if the universal account identifier and the associated account are valid (e.g., is the universal account identifier one that was issued by a universal account issuer, etc.). If not, the transaction will be aborted in a conventional way at Step P15-5.

If the universal account is valid, processing proceeds to Step P15-6, where a connection is established and information related to the universal account owner is retrieved from system 200 database storage device 260 (FIG. 2) or from other linked data network storage devices.

Advancing to Step P15-7, the universal account owner enters query transaction information such as, for example, benefit items, location, product identifiers, and dates for transmission to the universal server central controller. Query information may be provided by any available means such as, for example, completing form elements, selecting items displayed on an output screen, or submitting natural language statements. The query information is then submitted to the universal server.

Next, at Step P15-8, the universal server central controller will establish query transaction data records that it has received and then partition such information by preferred option items and various attributes and other requirements of the universal account owner and query requests (e.g., universal account owners seeking airline miles, query transactions that seek equity trading accounts providing airline miles).

Processing then proceeds to Step P15-9 at the top of FIG. 15B. There, the universal server central controller will review option structure database 280 (FIG. 2) and option supplier database 275 (FIG. 2) and make a determination as to which option structures and option suppliers are suitable to accommodate the universal account owner's option preferences and the query transaction requests. Thereafter, the universal server central controller will expose, publish, or transmit information (e.g., using the extensible markup XML programming language and standards-based data definition tags or possibly as entries into database table records) and then solicit or negotiate competitive option structures with related option suppliers that will be received and integrated into system 200 (FIG. 2) in order to establish appropriate supply functions.

At Step P15-10, the universal server central controller establishes appropriate acquisition functions based on the operational data as contained in the universal account owner's database table record, query requests, and other system database tables.

Processing proceeds to Step P15-11 where the universal server central controller compares available and applicable option structures and then produces option ranking values based on such factors as, for example, requested preferences, best available options, and standardised valuation of disparate options.

Processing then proceeds to Step P15-12. There, the universal server central controller will provide instant messaging services to the universal account owner (e.g., FIG. 1 reference numeral 150), and possibly other related parties. An example of an instant message display according to the present invention is depicted in FIG. 16 and relates to the presentation of a universal account owner query notification.

At Step P15-13, the universal server central controller data processing system 200 (FIG. 2) may execute corresponding functions and system functions as instructed by the universal account owner to acquire and apply the produced benefit option solutions and consequently affect related actions and accounts. At this point, it should be noted that the universal server could also be a party that may apply a supply function to a given transaction to bring about a certain result. The present invention is not restricted to having only the option suppliers determine to use a supply function or not. Such operations will be apparent to those skilled in the art of computer programming and, in particular, database management system programming.

At Step P15-14, the universal server central controller and other related data processing systems may record the query transaction and related produced solutions, option identifiers, and universal account owner actions in appropriate transaction databases for later processing and utilisation.

Processing ends at Step P15-15.

It is important to note that the process depicted in FIGS. 15A-15B clearly illustrates the ability of the present invention to allow for entry of a query request transaction by utilising, for example, conventional personal computer systems, wireless devices, and telephone systems and related connection networks. The affect on a query transaction, as discussed in detail above, may involve committing to a present or future action in order to acquire benefits such as a price discount or airline mile awards.

Referring now to FIG. 16, therein depicted is an interactive communication or message display according to the present invention. In particular, display 1600 resembles a typical hand-held (e.g., Palm VII) information display with the addition of query requests, benefit options, and account data in the form of identifier information and corresponding notices output on display 1600 to indicate the determined solutions to a universal account owner's inquiry. As such, display 1600 is a visual display that is generated in a conventional way by or on behalf of universal server 1610 and may be sent via wireless transmission services to the universal account owner. Of course, the present invention certainly envisions using other communication services such as, for example, Internet e-mail and audio telephone connections, for the universal account owner to transmit a query and receive notice of determined solutions like display 1600. Accordingly, the implementation details necessary to transport or otherwise deliver an information display like display 1600 to an account owner electronically using various mediums will be readily apparent to those skilled in the art.

Information regarding a universal account owner's query 1615 to determine available benefits and associated linkages will be communicated using, for example, instant messaging services between the universal account owner and universal server 1610. After receiving query 1615, display 1600 information is produced and transmitted to the universal account owner upon completion of appropriate supply and acquisition functions being executed by universal server 1610.

A first preference section 1620 includes information about the universal account owner's first preferred option. In particular, first preference section 1620 lists that airline miles are to be obtained and also lists two option suppliers providing option structures that comply with the universal account owner's acquisition functions. It may be seen that the Macy's and MasterCard airline mile offer providing a combined 3.50 miles was determined as the most significant and recommended by universal server 1610 and as such is displayed at the top of the listing. It should be noted that other ranking indicators could also be applied to the displayed items such as, for example, using prefix numerals, letters, or colours. As can be seen, the Macy's and MasterCard offer was not the only offer available for use by this query. Filene's and Visa also offered an award of airline miles, but its metric is less than the combined Macy's and MasterCard metric resulting in its secondary display position. In addition, other option suppliers provided option offers addressing the second preference section 1625. Since universal server 1610 will attempt to furnish the universal account owner with option offers matching their preferences in priority order, all option offers may be displayed to the universal account owner.

It should be noted that a universal account owner may establish, store, and utilise more than one benefit profile. A personal profile option selection 1630 is active for use in this message display. The universal account owner may freely modify the option selection/not-selected profile indicators should they choose to do so. If the universal account owner decides to modify the profile selection indicators, then the appropriate display 1600 items that may be affected by the change (e.g., item selections, amount totals) and the overall display would be updated accordingly.

A redeemable option items section 1635 displays earned and stored benefit option items that the universal account owner possesses and may utilise in a transaction with a merchant.

After the universal account owner has reviewed display 1600, the account owner could choose to receive further information or assistance with the benefit option offers and other linked elements. The universal account owner may contact universal server 1610 by pressing command contact button 1640, or otherwise petitioning universal server 1610 to respond for further communications.

Figure 17A:
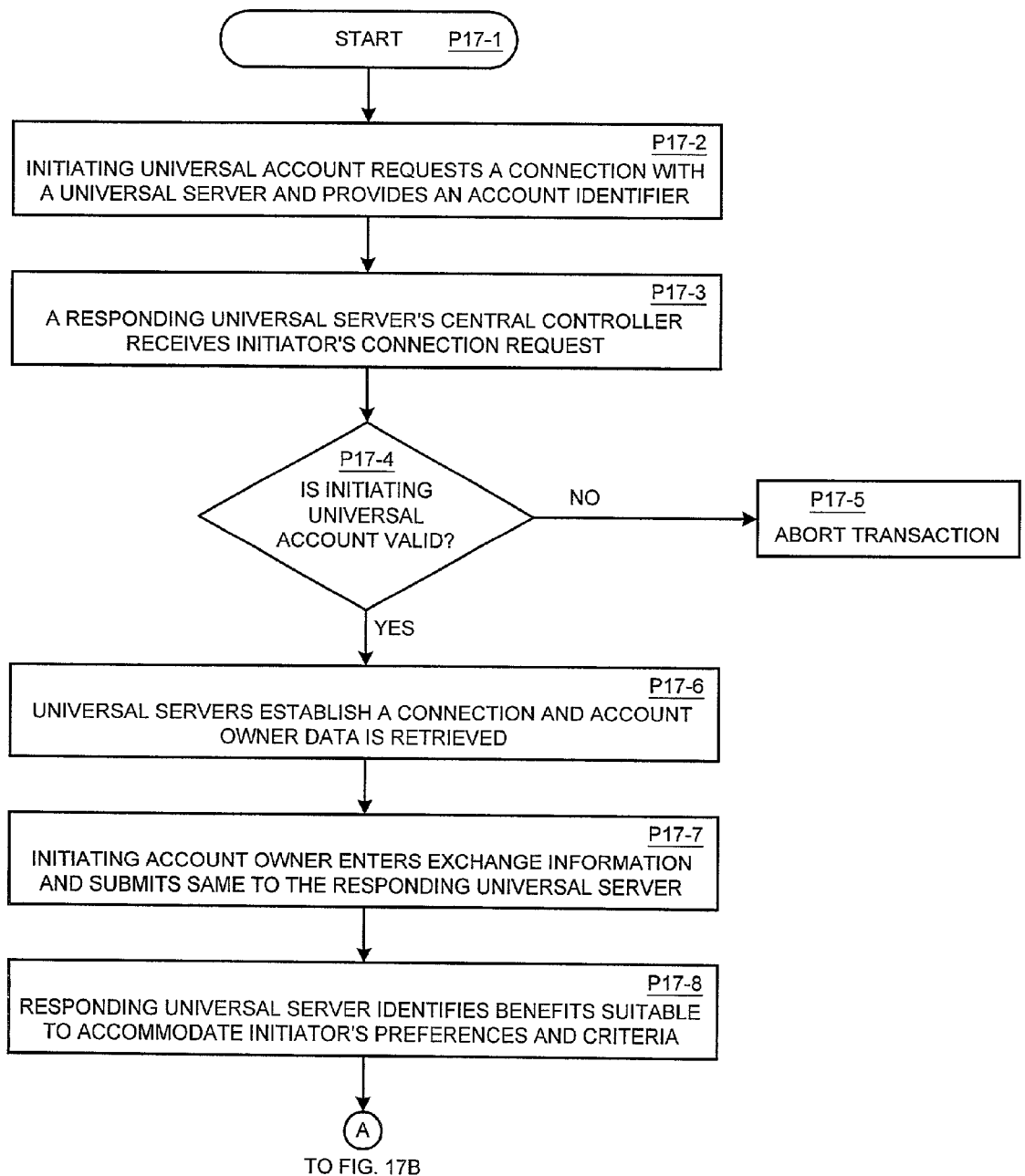
FIG. 17A is a flowchart illustrating an exchange process carried out according to a preferred embodiment of the present invention.
Figure 17B:
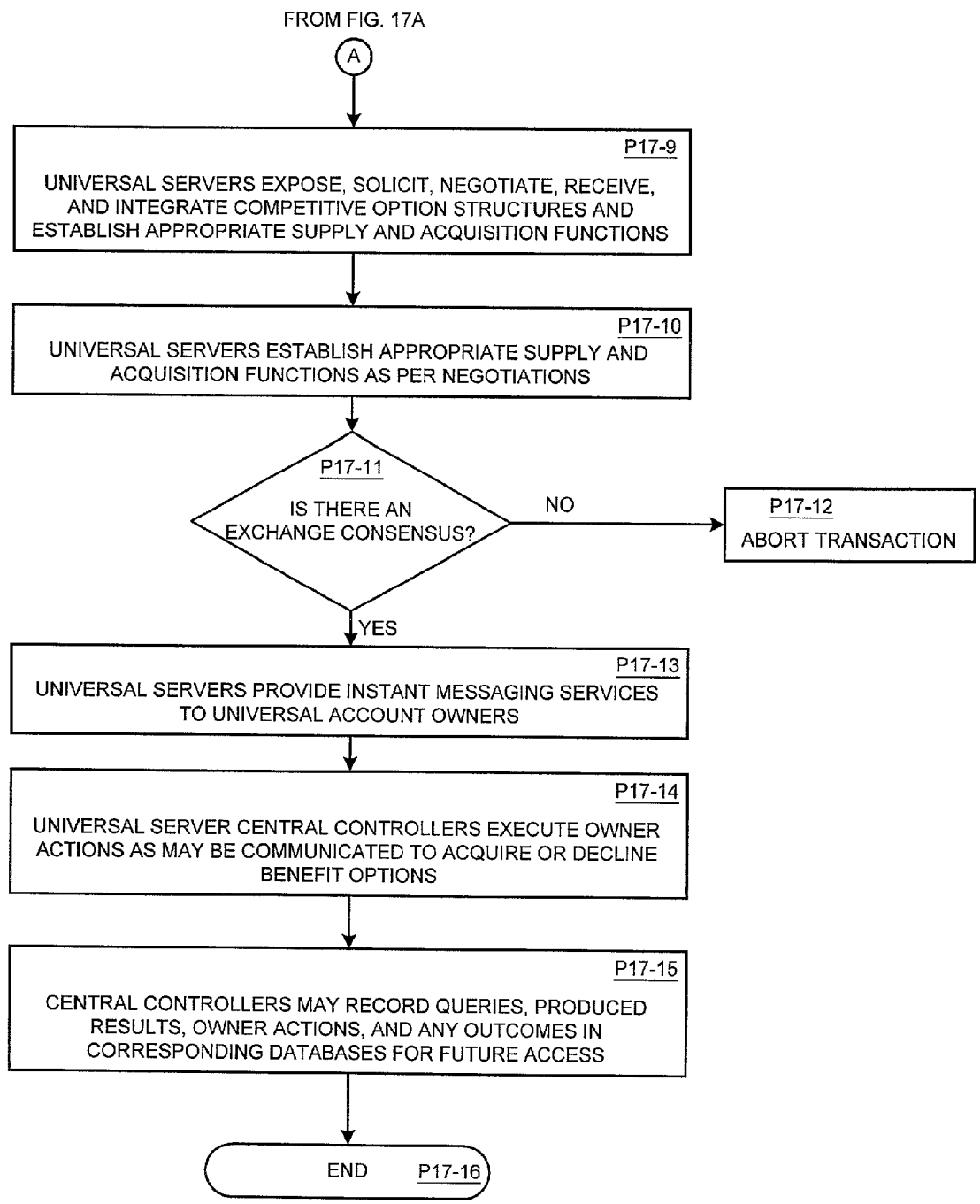
FIG. 17B depicts further steps carried out by the process started in FIG. 17A.

Referring now to FIGS. 17A-17B, therein depicted are flow charts illustrating a preferred embodiment of an exchange process for processing or otherwise executing incentive and award supply and acquisition functions along with producing, displaying, and recording results within a universal server processing system utilising data entry mechanisms, such as system 100 depicted in FIG. 1, that may be wired or wirelessly connected. The process depicted in FIGS. 17A and 17B is, in part, intended to be carried out by the data processing system illustrated as system 200 in FIG. 2 and described above and also is, in part, intended to be carried out by option suppliers (FIG. 1 reference numeral 145) and payment/award issuers (FIG. 1 reference numeral 165) as connected to data processing system 200 illustrated in FIG. 2. The process depicted in FIGS. 17A-17B also is intended to illustrate the steps carried out by universal cardholders, universal servers, option suppliers, and payment/award issuers during an exchange transaction. Moreover, the process depicted in FIGS. 17A-17B contemplates the use and operation of functions based on option identifiers, option structures, account identifiers, and account information that are retrieved or presented and processed during an exchange transaction. Of course, the term "identifiers" in this context is meant to indicate identification codes that correspond to data records establishing, for example, particular supply and acquisition functions to be carried out to affect an exchange transaction in a specified way.

More particularly, the process depicted in FIGS. 17A-17B is intended to enable a system and process to indicate and to exchange incentives and awards by establishing and executing payment, discount, and incentive supply functions and payment, discount, and incentive acquisition functions that ultimately identify preferred incentives and awards and then determine appropriate linkages and means to acquire and utilise said incentives and awards and then, as may be required, produce relevant items of said produced solutions or payment and redemption accounts for delivery to related parties in an exchange transaction. By engaging such produced exchange solutions, universal account owners are able to perform actions, or have actions performed, and thus acquire benefit option offers during exchange transactions for either immediate or delayed use and for appearance of such option structure notices on the universal cardholder's periodic statements. For example, a produced benefit exchange solution may indicate that the initiating universal account owner seeks to exchange 5,000 American Airline frequent airline miles for Delta airline miles, while a responding universal account owner with Delta airline miles may advance an exchange ratio of one Delta mile for two American miles. It should be noted that exchange transactions involving universal accounts may occur with or without human intervention and produce unilateral as well as multi-lateral benefit exchanges.

Processing starts at Step P17-1 and immediately proceeds to Step P17-2 where an initiating universal account owner transmits a request, for example, to establish a connection with a universal server processing system and provides their universal account identifier to initiate an exchange transaction. It should be noted that a universal account owner may deliver their universal account identifier by various methods (e.g., manual keypad entry, smart electronic card, infrared beam, cellular telephone transmission to a receiving site, etc.) and connect by various means (e.g., the Internet, telephone networks).

Next, processing then proceeds to Step P17-3 where a responding universal server's central controller or data processing system 200 receives the exchange transaction information entered and transmitted by the initiating universal account owner during Step P17-2. It should be understood that an exchange transaction may occur between two or more universal account owners and their associate universal accounts or between account owners and award suppliers in a peer-to-peer embodiment of the present invention. The processing that occurs to allow the application of exchange functions involving peer-to-peer connections as well as iterative and interactive type processing will be readily appreciated by those skilled in the art of computer programming.

Thereafter, at Step P17-4, the responding universal server processing system will determine if the initiating universal account identifier and the associated account are valid (e.g., is the universal account identifier one that was issued by a universal account issuer, etc.). If not, the transaction will be aborted in a conventional way at Step P17-5. It should be noted that all universal accounts involved in an exchange transaction will be authenticated in a similar fashion at some time during the exchange activity.

If the initiating universal account is valid, processing proceeds to Step P17-6, where a connection is established and information related to the initiating universal account owner and responding universal account owner is retrieved from system 200 database storage device 260 (FIG. 2) or from other linked data network storage devices.

Advancing to Step P17-7, the initiating universal account owner enters exchange transaction information such as, for example, benefit items, retail outlets, product identifiers, and metrics for transmission to the responding universal server central controller. Exchange information may be provided by any available means such as, for example, completing form elements, selecting items displayed on an output screen, or submitting natural language statements. In addition, exchange information may be automatically supplied by a universal server without human intervention. The exchange information is then submitted to the responding universal server. An example of an exchange directive may be to produce benefit solutions that will exchange an initiator's American airline miles for a respondent's Delta airline miles at no less than a 1-for-1-exchange ratio.

Next, at Step P17-8, the responding universal server central controller will establish exchange transaction data records that it has received and then partition such information by preferred option items and various attributes and other requirements of the initiating universal account owner and exchange requests (e.g., initiating universal account owner seeking Delta airline miles, exchange transaction that seek at least a 1-for-1 exchange ratio).

Processing then proceeds to Step P17-9 at the top of FIG. 17B. There, the responding universal server central controller will review their own individual option structure database 265 (FIG. 2) as well as option structure database 280 (FIG. 2) and option supplier database 275 (FIG. 2) and make a determination as to which option structures are suitable to accommodate the initiating universal account owner's option preferences and the exchange transaction request. It should be noted that combinations of initiating and responding universal account owners are able to interact in exchange transactions in multiple ways to produce interdependent agreements and responses. Thereafter, the initiating and responding universal server central controllers will expose, publish, and transmit information that will solicit and negotiate competitive option structures that will be received and integrated into the exchange transaction and affect actions in order to establish appropriate supply and acquisition functions and thus produce an equilibrium between supply and demand if possible.

At Step P17-10, the universal server central controllers establish appropriate supply and acquisition functions based on the negotiated operational data as established during Step P17-9. Processing compares available and applicable option structures and then produces option ranking values based on such factors as, for example, requested preferences, best available options, and standardised valuation of disparate options.

Next, at Step P17-11, the universal server central controllers will determine if a consensus and agreement has been achieved during Step P17-9 and Step P17-10. If no agreement has been achieved, the transaction will be aborted in a conventional way at Step P17-12.

Processing then proceeds to Step P17-13. There, the universal server central controllers may provide instant messaging services to the universal account owners (e.g., FIG. 1 reference numeral 150), and possibly other related parties. An example of an instant message display according to the present invention is depicted in FIG. 18 and relates to the presentation of a universal account owner exchange notification. It should be noted that if an exchange transaction is performed in an automated way, messaging services may not necessarily be involved along with associated human interventions and actions. For example, if two standalone universal server central controllers (e.g., Palm Series VII devices) become engaged in an automated exchange transaction by way of being in close proximity to each other, an exchange transaction may become engaged, negotiations performed, and settlements produced without any overt notifications until a latter time when possibly requested by an account owner.

At Step P17-14, the universal server central controllers' data processing system 200 (FIG. 2) may execute corresponding functions and system functions as instructed by the universal account owners, if human intervention is active, or by automated actions, if human intervention is not active, to acquire or decline the produced benefit option exchange solutions and consequently affect related actions and accounts.

At Step P17-15, the universal server central controllers and other related data processing systems may record the exchange transaction and related produced exchange solutions, option identifiers, and universal account owner actions in appropriate transaction databases for later processing and utilisation.

Processing ends at Step P17-16.

It is important to note that the process depicted in FIGS. 17A-17B clearly illustrates the ability of the present invention to allow for entry of an exchange request transaction by utilising, for example, conventional personal computer systems, wireless devices, and telephone systems and related connection networks. The affect on an exchange transaction, as discussed in detail above, may involve committing to a present or future action in order to acquire benefits such as a price discount or airline mile awards.

Referring now to FIG. 18, therein depicted is an interactive communication or message display according to the present invention. In particular, display 1800 resembles a typical hand-held (e.g., Palm VII) information display with the addition of exchange requests, benefit options, and account data in the form of identifier information and corresponding notices output on display 1800 to indicate the determined solutions to a universal account owner's exchange request. As such, display 1800 is a visual display that is generated in a conventional way by or on behalf of universal server 1810 and may be sent via wireless transmission services to the universal account owner. Of course, the present invention certainly envisions using other communication services such as, for example, Internet e-mail and audio telephone connections, for the universal account owner to transmit an exchange request and receive notice of determined solutions like display 1800. Accordingly, the implementation details necessary to transport or otherwise deliver an information display like display 1800 to an account owner electronically using various mediums will be readily apparent to those skilled in the art. It should be noted that display 1800 will appear when universal account owners indicate that exchange transactions are to be displayed or involve human intervention, and that display 1800 is not required in automated exchange transactions.

Information regarding a universal account owner's exchange request 1815 is published or otherwise exposed to determine available benefits and associated linkages and as such will be communicated using, for example, messaging services between universal account owners possibly using universal server 1810 as a central staging forum and transport. It should be noted that two or more independent or standalone universal servers could perform the functions of a staging forum if a central facility was not available or requested.

After receiving exchange request 1815, display 1800 information is produced and transmitted to the universal account owner upon completion of appropriate supply and acquisition functions being executed by universal server 1810. Additionally, those universal account owners with exchange offers being advance to the exchange initiator could also have displayed information regarding the exchange transaction. Exchange request 1815 may include alternate items 1820 that would be accepted for exchange along with associated terms and conditions to guide the exchange actions.

A first preference section 1825 includes information about the universal account owner's first preferred exchange option. In particular, first exchange preference section 1825 lists that airline miles are to be obtained and also lists two universal account owners providing option structures that comply with the initiating universal account owner's exchange functions. It may be seen that the Anonymous—FL offer providing 1.2 Delta miles was evaluated as the most significant with a standard value or ranking 1830 of 28.95 and recommended by universal server 1810 and as such is displayed at the top of the listing. The standard value or ranking indicator 1830 is produced by the universal server central controller after applying mathematical operations and possibly universal owner handicap values to various benefit items in order to evaluate similar or disparate offers and display a generic value metric for the user. It should be noted that other ranking indicators could also be applied to the displayed items such as, for example, using prefix numerals, letters, or colours. As can be seen, the Anonymous—FL offer was not the only offer available for use by this query. Paul James—MA also offered an award of airline miles, but its metric is less than that of Anonymous—FL metric resulting in its secondary display position. In addition, other universal account owners and option suppliers provided option offers addressing the second alternate preference section 1835. Since universal server 1810 will attempt to furnish the initiating universal account owner with exchange option offers matching their preferences in priority order, all exchange option offers may be displayed to the universal account owner.

After the universal account owner has reviewed display 1800, the account owner could choose to receive further information or assistance with the benefit option offers and other linked elements. The universal account owner may contact universal server 1810 by activating embedded links within the displayed items (e.g., Hyper Text Markup Language tags and anchors) or processing the exchange offers by pressing command process button 1840, or otherwise petitioning universal server 1810 to respond for further communications. It should be noted that there would be appropriate means to allow for multiple universal servers involved in an exchange transaction to be displayed and suitable means for contacting such servers to be available to the user.

It is also contemplated that a portable computing device may be synchronised either automatically or on-demand by a universal account owner with a universal server central controller system, such synchronisation not necessarily being performed during a transaction, by means of such related network systems in order to gain updated account owner, incentive, and award information and thus possess the ability during a future transaction to be able to perform the evaluation of incentives and awards for acquisition, use, and exchange by executing standalone processing of supply and acquisition functions to automatically select appropriate payment and award accounts for delivery to a creditor should the universal account owner or the creditor not be able to, or decides not to be, connected to a universal server central controller on an immediate basis, and thus not be included with other universal transactions at the universal server central controller. Such standalone ability will allow available incentives and awards, as may be stored on a portable computing device, to be reviewed, acquired, and exchanged by using various means such as, for example, displaying appropriate payment and award accounts, and such relevant account objects and items, for delivery into a transaction by any available means such as, for example, displaying a bar code of a credit card account or a bar code of a discount coupon on the portable computing device display screen or transmitting such information by available wireless communication modalities, for example infrared frequencies, or by direct-connection, for example, by inserting a device into a docking cradle or receptor. It is contemplated that such independent processing may be instantiated for logistical and legal causes such as, for example, non-contractual liability in cross-border disputes or other laws governing jurisdiction in cross-border disputes with the concept of borders encompassing both electronic and physical incarnations.

While various embodiments of a preferred embodiment have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Accordingly, having fully described the present invention by way of example with reference to the attached drawing figures, it will be readily appreciated that many changes and SQ modifications may be made in the form and steps thereof and to the invention and to any of the exemplary embodiments shown and described herein without departing from the spirit or scope of the invention which is defined in the appended claims.

What is claimed is:

1. An incentive-controlled method for use in the acquisition and/or exchange of user-declared preferred benefits, said method employing computer means having data storage means and network communications means and comprising the steps of:
   (a) receiving a request to produce an incentive-controlled transaction solution for an identified user having at least one declared and ranked benefit preference;
   (b) Conducting a real time scan of benefit resources, said resources comprising at least one previously unknown resource proffering at least one benefit element to said user, upon receipt of said request to produce an incentive-controlled transaction solution;
   (c) dynamically matching said user's said at least one declared benefit preference to the result of said real time scan; and
   (d) Automatically effecting an incentive-controlled transaction solution adapted to maximize the implementation of said user's said at least one declared benefit preference.

2. The method of claim 1 comprising the further step of determining a transaction solution associated with at least one of said matched benefit elements.

3. The method of claim 2 wherein calculating operations based on established value standards are employed in determining the value rankings of said matched benefit elements and said transaction solution.

4. The method according to claim 2 comprising the further steps of evaluating said matched benefit elements and determining at least one of said matched benefit elements as providing said user with the benefit of highest value to said user.

5. The method according to claim 4 wherein said benefit of highest value to said user is obtained from the combination of a plurality of said matched benefit elements comprising one or more transaction settlement means employed in any order.

6. The method of claim 4 wherein said step of evaluating said matched benefit elements is undertaken by the user upon disclosure of said matched benefit elements to said user.

7. The method of claim 4 wherein said step of determining said benefit of highest value to said user is performed automatically without user intervention.

8. The method of claim 2 further comprising the steps of:
(a) identifying at least one provider of said transaction solution; and,
(b) initiating and consummating a transaction with said at least one provider of said transaction solution.

9. The method of claim 2 further comprising the step of automatically establishing such electronic and logical linkages as may be required to enable said user to process said transaction solution and to acquire said at least one benefit element associated with said transaction solution.

10. The method of claim 2 further comprising the additional steps of automatically securing and/or activating transaction settlement means and of satisfying applicable conditions to process said transaction solution to acquire for said user the said at least one benefit element associated with said transaction solution.

11. The method of claim 2 wherein said step of determining a transaction solution comprises a selection by said user from at least one proposed transaction solution disclosed to said user.

12. The method of claim 2 further comprising the step of determining at least one incentive-controlled transaction solution to a payment transaction.

13. The method of claim 12 further comprising the step of disclosing, to at least one payment service provider able to provide at least one of said matched benefit elements, such user information and such payment transaction information as said at least one payment service provider may require as conditions for authenticating said transaction and authorising payment of said payment transaction and issuing said at least one benefit element to said user.

14. The method of claim 12 further comprising the step of disclosing, to at least one benefit provider able to provide at least one of said matched benefit elements, such user information and such payment transaction information as said at least one benefit provider may require as conditions for authenticating said transaction and issuing said at least one benefit element to said user.

15. The method of claim 2 further comprising the step of determining at least one incentive-controlled transaction solution to a query from a user concerning a contemplated acquisition of goods or services.

16. The method of claim 15 further comprising the step of disclosing to said user said at least one transaction solution responsive to said query.

17. The method of claim 15 further comprising the step of disclosing said contemplated acquisition query to at least one provider of goods or services, whereby said at least one provider is caused to commit to the consummation of a transaction on terms providing for the issuance of at least one identified benefit element to said user.

18. The method of claim 15 further comprising the step of disclosing a binding commitment from said user to said at least one provider to consummate said provider-committed transaction according to said identified benefit-issuance terms.

19. The method of claim 2 further comprising the step of determining at least one incentive-controlled transaction solution to a benefit element exchange transaction between at least two identified users.

20. The method of claim 19 further comprising the step of disclosing at least one benefit element exchange solicitation from a first identified user to at least one other user.

21. The method of claim 20 further comprising the steps of:
(a) said first user receiving an affirmative response to said solicitation from at least one other user;
(b) disclosing at least one proposed benefit element exchange solution between said users; and,
(c) consummating a benefit element exchange transaction between said first user and said at least one other user.

22. The method of claim 21 wherein said transaction is consummated employing pre-programmed instructions enabling its consummation without the transaction-specific participation of at least one user party to said transaction.

23. The method of claim 21 wherein said transaction is consummated employing user intervention and instructions enabling its consummation with the transaction-specific participation of at least one user party to said transaction.

24. The method of claim 1 further comprising the additional steps of creating an aggregated catalog of declared and ranked benefit preferences input from a plurality of requests involving a plurality of identified users and of operating on said aggregated catalog of benefit preferences to effect a dynamic enhancement in the value of at least one of said matched benefit elements to at least one of said identified users.

25. A system for creating and employing incentive-controlled transaction solutions by dynamically selecting the means for processing a transaction based on user-declared preferred benefits, said system comprising:
(a) a processor;
(b) an input device connected to said processor;
(c) an output device connected to said processor;
(d) a clock device connected to said processor;
(e) a logic and control device connected to said processor;
(f) a memory connected to said processor storing instructions to control the operation of said processor;
(g) a communications device connected to said processor;
(h) a data storage device connected to said processor;
(i) the processor operative with the instructions in memory to:
    i. record data of users, benefit elements, transaction solutions, and transactions;
    ii. record the user entry and ranking of at least one declared benefit preference;
    iii. receive requests to process transactions;
    iv. enable information to be available to users;
    v. Perform a real time scan of benefit resources, including at least one previously unknown benefit resource proferring at least one benefit element to a user upon submitting a request to process a transaction, upon system receipt of a request to process a transaction concerning said user;
    vi. conduct automatic evaluations and rankings of at least one available benefit element based on a said user's declared and ranked benefit preferences and on a said scanning of benefit resources;

vii. produce at least one incentive-controlled transaction solution;

viii. conduct automatic evaluations and rankings of at least one transaction solution based on a user's declared and ranked benefit preferences and on a said scanning of benefit resources;

ix. process transaction solutions with and without user intervention;

x. disclose information to users;

xi. consummate transactions; and, xii. receive, record, evaluate, and store user information and transaction activity.

26. A system for creating and employing incentive-controlled transaction solutions by dynamically selecting the means for processing a transaction based on user-declared preferred benefits, said system comprising:

(a) means for recording data of users, benefit elements, transaction solutions, and transactions;

(b) means for recording the user entry and ranking of at least one declared benefit preference;

(c) means for receiving requests to process transactions;

(d) means for enabling user access to information;

(e) Means for processing a transaction adapted to dynamically match a user's at least one declared benefit preference against a real time scan of benefit resources, including at least one previously unknown benefit resource proferring at least one benefit element to said user upon submitting a request to process a transaction, upon system receipt of a request to process a transaction concerning said user;

(f) means for conducting automatic evaluations and rankings of at least one available benefit element based on a said user's declared and ranked benefit preferences and on a said scanning of benefit resources;

(g) means for producing at least one incentive-controlled transaction solution;

(h) means for conducting automatic evaluations and rankings of at least one transaction solution based on a user's declared and ranked benefit preferences and on a said scanning of benefit resources;

(i) means for processing transaction solutions with and without user intervention;

(j) means for disclosing information to users;

(k) means for consummating transactions; and, (l) means for receiving, recording, evaluating, and storing user information and transaction activity.

27. A computer-readable storage medium encoded with computer executable instructions to create and employ incentive-controlled transaction solutions by dynamically selecting the means for processing a transaction based on user-declared preferred benefits, said computer executable instructions, when executed by the computer, perform the steps of:

(a) recording data of users, benefit elements, transaction solutions, and transactions;

(b) recording the user entry and ranking of at least one declared benefit preference;

(c) receiving requests to process transactions;

(d) enabling user access to information;

(e) processing a transaction including dynamically matching a user's at least one declared benefit preference against a real time scan of benefit resources, including at least one previously unknown benefit resource proferring at least one benefit element to said user upon submitting a request to process a transaction, upon system receipt of a request to process a transaction concerning said user;

(f) processing automatic evaluations and rankings of at least one available benefit element based on a said user's declared and ranked benefit preferences and on a said scanning of benefit resources;

(g) enabling the production of at least one incentive-controlled transaction solution;

(h) processing automatic evaluations and rankings of at least one transaction solution based on a user's declared and ranked benefit preferences and on a said scanning of benefit resources;

(i) processing transaction solutions with and without user intervention;

(j) disclosing information to users;

(k) consummating transactions; and, (l) receiving, recording, evaluating, and storing user information and transaction activity.

* * * * *